(12) United States Patent
Wood et al.

(10) Patent No.: US 8,129,450 B2
(45) Date of Patent: Mar. 6, 2012

(54) ARTICLES HAVING A POLYMER GRAFTED CYCLODEXTRIN

(75) Inventors: Willard E. Wood, Arden Hills, MN (US); Timothy H. Bohrer, Chicago, IL (US); Stanley R. Kellenberger, Appleton, WI (US); Neil J. Beaverson, Vadnais Heights, MN (US)

(73) Assignee: Cellresin Technologies, LLC, St. Paul, MN (US)

( * ) Notice: Subject to any disclaimer, the term of this patent is extended or adjusted under 35 U.S.C. 154(b) by 839 days.

(21) Appl. No.: 11/761,105

(22) Filed: Jun. 11, 2007

(65) Prior Publication Data

US 2007/0264520 A1    Nov. 15, 2007

Related U.S. Application Data

(60) Continuation-in-part of application No. 11/429,579, filed on May 5, 2006, now Pat. No. 7,605,199, which is a division of application No. 10/672,297, filed on Sep. 25, 2003, now Pat. No. 7,166,671.

(60) Provisional application No. 60/432,523, filed on Dec. 10, 2002.

(51) Int. Cl.
*C08L 23/02* (2006.01)
*C08L 23/26* (2006.01)

(52) U.S. Cl. .......... 524/48; 525/54.21; 525/54.23; 525/54.24; 525/264; 525/207; 525/178; 525/285

(58) Field of Classification Search ............ 524/48, 524/54; 525/54.21, 54.23, 54.24, 64, 207, 525/187
See application file for complete search history.

(56) References Cited

U.S. PATENT DOCUMENTS

| | | |
|---|---|---|
| 3,318,972 A | 5/1967 | Kern Mertzweiller et al. |
| 3,365,750 A | 1/1968 | Donald |
| 3,400,190 A | 9/1968 | Donald |
| 3,440,686 A | 4/1969 | Corbett |
| 3,476,627 A | 11/1969 | Squires |
| 3,477,099 A | 11/1969 | Lee et al. |
| 3,479,425 A | 11/1969 | Lefevre et al. |
| 3,524,795 A | 8/1970 | Peterson |
| 3,557,265 A | 1/1971 | Chisholm et al. |
| 3,583,032 A | 6/1971 | Stafford |
| 3,929,542 A * | 12/1975 | Gehrig et al. ............ 156/167 |
| 4,045,833 A | 9/1977 | Mesek et al. |
| 4,068,666 A | 1/1978 | Shiff |
| 4,100,324 A | 7/1978 | Anderson et al. |
| 4,190,477 A | 2/1980 | Ossian et al. |
| 4,203,435 A | 5/1980 | Krull et al. |
| 4,275,811 A | 6/1981 | Miller |
| 4,321,977 A | 3/1982 | Tenn |
| 4,382,507 A | 5/1983 | Miller |
| 4,387,188 A | 6/1983 | Statz |
| 4,405,667 A | 9/1983 | Christensen et al. |
| 4,407,873 A | 10/1983 | Christensen et al. |
| 4,407,874 A | 10/1983 | Gehrke |
| 4,407,897 A | 10/1983 | Farrell et al. |
| 4,410,578 A | 10/1983 | Miller |
| 4,720,415 A | 1/1988 | Vander Wielen et al. |
| 4,722,815 A | 2/1988 | Shibanai |
| 4,725,657 A | 2/1988 | Shibanai |
| 4,753,832 A | 6/1988 | Brown et al. |
| 4,777,088 A | 10/1988 | Thompson et al. |
| 4,789,575 A | 12/1988 | Gibbons et al. |
| 4,818,464 A | 4/1989 | Lau |
| 4,833,202 A | 5/1989 | Dunn, Jr. |
| 4,835,025 A | 5/1989 | Thompson et al. |
| 4,859,513 A | 8/1989 | Gibbons et al. |
| 4,880,701 A | 11/1989 | Gibbons et al. |
| 4,888,222 A | 12/1989 | Gibbons et al. |
| 4,921,733 A | 5/1990 | Gibbons et al. |
| 4,929,476 A | 5/1990 | Gibbons et al. |
| 4,940,464 A | 7/1990 | Van Gompel et al. |
| 4,940,612 A | 7/1990 | Gibbons et al. |
| 4,940,621 A | 7/1990 | Rhodes et al. |
| 4,950,510 A | 8/1990 | Massouda |
| 4,981,739 A | 1/1991 | Gibbons et al. |

(Continued)

FOREIGN PATENT DOCUMENTS

CA    2063453    11/1991

(Continued)

OTHER PUBLICATIONS

Partial File history (from Nov. 4, 2010 to Apr. 14, 2011) for co-pending U.S. Appl. No. 11/761,017, filed Jun. 11, 2007, entitled "Grafted Cyclodextrin", which claims priority to the same parent application (U.S. Appl. No. 10/672,297, now U.S. Pat. No. 7,166,671) as the present application (41 pages).
"Fiber Systems Technology Primer, An Introduction to Spunbond and Meltblown," *Nordson Fiber Systems*, pp. 1-13 (Date Printed Jul. 28, 2006).
Ahmed, E. et al., "Flavor and Odor Thresholds in Water of Selected Orange Juice Components," *J. Agric. Food Chem.*, vol. 25, No. 1, pp. 187-191 (1978).
Cancio, L. et al., "The Evolution of Microporous Film," *Nonwovens World*, vol. 13, No. 5, pp. 65-70 (Oct.-Nov. 2004).
Chung, T., "Functionalization by Post-polymerization Processes," *Functionalization of Polyolefins*, Chapter 5, pp. 65-78 (Copyright 2002).
De Roover, B. et al., "Molecular Characterization of Maleic Anhydride-Functionalized Polypropylene," *Journal of Polymer Science: Part A: Polymer Chemistry*, vol. 33, pp. 829-842 (1995).

(Continued)

*Primary Examiner* — Irina S Zemel
(74) *Attorney, Agent, or Firm* — Pauly, DeVries Smith & Deffner, LLC

(57) ABSTRACT

Durable and disposable articles are provided which include a thermoplastic polymer composition, which includes a blend of a polymer and a modified polymer. The modified polymer has covalently bonded pendant substituents derived from cyclodextrin. The articles can be a films, coatings, nonwoven webs, or monolithic articles. An article can have the polymer composition as one part of the article, such as in one distinct area of the article, or on the surface of the article, for example as a coating or surface film. The article can be, for example, a multilayer barrier film, a nonwoven sheet or pad, an absorbent article, or a storage container.

62 Claims, 7 Drawing Sheets

U.S. PATENT DOCUMENTS

| | | | |
|---|---|---|---|
| 4,983,431 A | 1/1991 | Gibbons et al. | |
| 5,001,176 A | 3/1991 | Nakazima | |
| 5,019,073 A | 5/1991 | Roessler et al. | |
| 5,084,352 A | 1/1992 | Percec et al. | |
| 5,106,562 A | 4/1992 | Blemberg et al. | |
| 5,108,844 A | 4/1992 | Blemberg et al. | |
| 5,126,348 A | 6/1992 | McMurray | |
| 5,142,750 A | 9/1992 | Dyer et al. | |
| 5,173,481 A | 12/1992 | Pitha et al. | |
| 5,190,711 A | 3/1993 | Blemberg | |
| 5,213,881 A | 5/1993 | Timmons et al. | |
| 5,236,642 A | 8/1993 | Blemberg et al. | |
| 5,262,404 A | 11/1993 | Weisz et al. | |
| 5,276,088 A | 1/1994 | Yoshinaga | |
| 5,306,533 A | 4/1994 | Robichaud et al. | |
| 5,322,877 A | 6/1994 | Moriyama et al. | |
| 5,381,914 A | 1/1995 | Koyama et al. | |
| 5,433,982 A | 7/1995 | Yamada et al. | |
| 5,486,166 A | 1/1996 | Bishop et al. | |
| 5,492,947 A | 2/1996 | Wood et al. | |
| 5,508,075 A | 4/1996 | Roulin et al. | |
| 5,509,915 A | 4/1996 | Hanson et al. | |
| 5,516,766 A | 5/1996 | Weisz et al. | |
| 5,538,655 A | 7/1996 | Fauteux et al. | |
| 5,573,934 A | 11/1996 | Hubbell et al. | |
| 5,576,145 A | 11/1996 | Keil et al. | |
| 5,603,974 A | 2/1997 | Wood et al. | |
| 5,616,353 A | 4/1997 | Wright et al. | |
| 5,635,550 A | 6/1997 | Dehennau et al. | |
| 5,656,368 A | 8/1997 | Braun et al. | |
| 5,695,839 A | 12/1997 | Yamada et al. | |
| 5,696,186 A | 12/1997 | Videau | |
| 5,698,370 A | 12/1997 | Keil et al. | |
| 5,714,445 A | 2/1998 | Trinh et al. | |
| 5,725,917 A | 3/1998 | Parks | |
| 5,760,016 A | 6/1998 | Djedaini-Pilard et al. | |
| 5,773,518 A | 6/1998 | Keil et al. | |
| 5,776,842 A | 7/1998 | Wood et al. | |
| 5,816,487 A | 10/1998 | Skinner | |
| 5,837,339 A | 11/1998 | Wood et al. | |
| 5,843,066 A * | 12/1998 | Dobrin | 604/385.21 |
| 5,874,419 A | 2/1999 | Herrmann et al. | |
| 5,882,565 A | 3/1999 | Wood et al. | |
| 5,904,929 A | 5/1999 | Uekama et al. | |
| 5,916,883 A | 6/1999 | Shalaby et al. | |
| 5,928,745 A | 7/1999 | Wood et al. | |
| 5,939,060 A | 8/1999 | Trinh et al. | |
| 5,942,452 A | 8/1999 | Daponte et al. | |
| 5,964,973 A | 10/1999 | Heath et al. | |
| 5,973,064 A | 10/1999 | Zhao et al. | |
| 6,001,343 A | 12/1999 | Trinh et al. | |
| 6,042,723 A | 3/2000 | Duval et al. | |
| 6,045,812 A | 4/2000 | Richard et al. | |
| 6,096,668 A | 8/2000 | Abuto et al. | |
| 6,110,158 A | 8/2000 | Kielpikowski | |
| 6,110,548 A | 8/2000 | Kinsey | |
| 6,114,262 A | 9/2000 | Groh et al. | |
| 6,149,993 A | 11/2000 | Parks et al. | |
| 6,177,607 B1 | 1/2001 | Blaney et al. | |
| 6,191,209 B1 | 2/2001 | Andrews et al. | |
| 6,193,827 B1 | 2/2001 | Parks et al. | |
| 6,204,256 B1 | 3/2001 | Shalaby et al. | |
| 6,207,599 B1 | 3/2001 | Coolen et al. | |
| 6,211,139 B1 | 4/2001 | Keys et al. | |
| 6,218,013 B1 | 4/2001 | Wood et al. | |
| 6,229,062 B1 | 5/2001 | Mandell et al. | |
| 6,238,284 B1 | 5/2001 | Dittgen et al. | |
| 6,248,363 B1 | 6/2001 | Patel et al. | |
| 6,264,864 B1 | 7/2001 | Mackay | |
| 6,267,985 B1 | 7/2001 | Chen et al. | |
| H2011 H | 1/2002 | Freiburger et al. | |
| 6,348,258 B1 | 2/2002 | Topolkaraev et al. | |
| 6,372,317 B1 | 4/2002 | Denney et al. | |
| 6,379,753 B1 | 4/2002 | Soane et al. | |
| 6,420,285 B1 | 7/2002 | Newkirk et al. | |
| 6,465,066 B1 | 10/2002 | Rule et al. | |
| 6,469,078 B1 | 10/2002 | Simon et al. | |
| 6,478,174 B1 | 11/2002 | Grazia et al. | |
| 6,497,950 B1 | 12/2002 | Haile et al. | |
| 6,559,081 B1 | 5/2003 | Erspamer et al. | |
| 6,583,331 B1 | 6/2003 | McCormack et al. | |
| 6,608,237 B1 | 8/2003 | Li et al. | |
| 6,613,703 B1 | 9/2003 | Yahiaoui et al. | |
| 6,632,209 B1 | 10/2003 | Chmielewski | |
| 6,663,584 B2 | 12/2003 | Griesbach, III et al. | |
| 6,663,611 B2 | 12/2003 | Blaney et al. | |
| 6,682,512 B2 | 1/2004 | Uitenbroek et al. | |
| 6,689,378 B1 | 2/2004 | Sun et al. | |
| 6,709,746 B2 | 3/2004 | Wood et al. | |
| 6,720,279 B2 | 4/2004 | Cree et al. | |
| 6,722,106 B2 | 4/2004 | Bartel et al. | |
| 6,764,566 B1 | 7/2004 | Griesbach, III et al. | |
| 6,765,125 B2 | 7/2004 | Abuto | |
| 6,774,188 B1 | 8/2004 | Robert et al. | |
| 6,806,313 B2 | 10/2004 | Couturier | |
| 6,832,418 B2 | 12/2004 | Hartgrove et al. | |
| 6,846,532 B1 | 1/2005 | Bensur | |
| 6,851,462 B2 | 2/2005 | Frank et al. | |
| 6,894,085 B2 | 5/2005 | Beaverson et al. | |
| 6,911,572 B1 | 6/2005 | Bruhn et al. | |
| 6,953,510 B1 | 10/2005 | Mackay et al. | |
| 6,972,010 B2 | 12/2005 | Pesce et al. | |
| 6,974,890 B1 | 12/2005 | Porsö et al. | |
| 6,994,698 B2 | 2/2006 | Leak et al. | |
| 7,001,661 B2 | 2/2006 | Beaverson et al. | |
| 7,008,207 B2 | 3/2006 | Bansal et al. | |
| 7,019,073 B2 | 3/2006 | Etherton et al. | |
| 7,032,362 B2 | 4/2006 | Dierl et al. | |
| 7,056,310 B2 | 6/2006 | Tanaka et al. | |
| 7,138,452 B2 | 11/2006 | Kim et al. | |
| 7,166,671 B2 | 1/2007 | Wood et al. | |
| 7,183,359 B2 | 2/2007 | Hanna et al. | |
| 7,365,123 B2 | 4/2008 | Wood et al. | |
| 7,385,004 B2 | 6/2008 | Wood | |
| 2003/0113525 A1 | 6/2003 | Beaverson et al. | |
| 2003/0207056 A1 | 11/2003 | Wood et al. | |
| 2004/0037983 A1 | 2/2004 | Reighard et al. | |
| 2004/0110901 A1 | 6/2004 | Wood et al. | |
| 2005/0043482 A1 | 2/2005 | Etherton et al. | |
| 2005/0053784 A1 | 3/2005 | Wood et al. | |
| 2005/0131119 A1 | 6/2005 | Wood | |
| 2005/0261426 A1 | 11/2005 | Wood et al. | |
| 2006/0182917 A1 | 8/2006 | Wood et al. | |
| 2006/0183856 A1 | 8/2006 | Wood et al. | |
| 2006/0183857 A1 | 8/2006 | Wood et al. | |
| 2006/0205873 A1 | 9/2006 | Wood et al. | |
| 2007/0264520 A1 | 11/2007 | Wood et al. | |
| 2008/0032110 A1 | 2/2008 | Wood et al. | |

FOREIGN PATENT DOCUMENTS

| | | |
|---|---|---|
| CA | 2 333 131 A1 | 12/1999 |
| DE | 198 25 486 A1 | 2/2000 |
| EP | 0 270 309 A1 | 6/1988 |
| EP | 0 483 380 A1 | 5/1992 |
| EP | 1 114 583 A2 | 7/2001 |
| EP | 1 559 746 A1 | 8/2005 |
| JP | 02263643 | 10/1990 |
| JP | 3-100065 | 4/1991 |
| JP | 8-100027 | 4/1996 |
| JP | 1996100027 | 4/1996 |
| JP | 2001348766 | 12/2001 |
| WO | WO-0032854 | 6/2000 |
| WO | WO-0066187 | 11/2000 |
| WO | WO 01/02489 A1 | 1/2001 |
| WO | WO-01110929 | 2/2001 |
| WO | WO 01/83877 * | 11/2001 |
| WO | WO-2005019337 | 3/2005 |

OTHER PUBLICATIONS

Maltby, A. et al., "Fatty acid amides as torque release additives for beverage container closures," *CAD RETEC 2002 Conference sponsored by the Society of Plastics Engineers, Inc.*, Toronto, Canada, 12 pages (Sep. 30-Oct. 2, 2002).

Nachtigall, S. et al., "A Factorial Design Applied to Polypropylene Functionalization with Maleic Anhydride," *Polymer Engineering and Science*, vol. 39, No. 4, pp. 630-637 (Apr. 1999).

Ramirez, M. et al., "AFM Characterization of Surface Segregated Erucamide and Behenamide in Linear Low Denisty Polyethylene Film," *NANO Letters*, vol. 2, No. 1, pp. 9-12 (2002).

Rawls, A. et al., "Evaluation of Surface Concentration of Erucamide in LLDPE Films," *Journal of Vinyl & Additive Technology*, vol. 8, No. 2, pp. 130-138 (Jun. 2002).

Sankhe, S. et al., "Characterization of Erucamide Profiles in Multilayer Linear Low-Density Polyethylene and Propylene-Ethylene Copolymer Films Using Synchrotron-Based FT-IR Microspectroscopy," *Applied Spectroscopy*, vol. 56, No. 2, pp. 205-211 (2002).

Schmidt, O., "Spunbond Manufacture Process Optimisation by Melt Filtration," *Gneuss Kunststofftechnik GmbH*, pp. 1-14 (Apr. 2005).

Zhang, R. et al., "Effect of the Initial Maleic Anhydride Content on the Grafting of Maleic Anhydride onto Isotactic Polypropylene," *J. Polym. Sci. Part A: Polym. Chem.*, vol. 43, pp. 5529-5534 (2005).

Zweifel, H. ,"Lubricants," *Plastics Additives Handbook*, 5th Edition, pp. 514-543 (2001).

European Search Report mailed Jul. 28, 2008.

Japanese Office Action dated Aug. 11, 2009 from the Japanese Patent Office in JP Patent Application No. 2003-397846, mailed Aug. 24, 2009 (5 pages).

Berejka, "Electron Beam Grafting of Polymers." Ionicorp, Huntington, New York, pp. 85-89, *Advances in radiation chemistry of polymers*, IAEA, Nov. 2004.

Rosiak, "Radiation Polymerization in Solution." Institute of Applied Radiation Chemistry, Technical University of Lodz, Lodz, Poland, pp. 41-60, *Advances in radiation chemistry of polymers*, IAEA, Nov. 2004.

File history (as of Nov. 3, 2010) for co-pending U.S. Appl. No. 11/761,017, filed Jun. 11, 2007, entitled "Grafted Cyclodextrin", which claims priority to the same parent application (U.S. Appl. No. 10/672,297, now U.S. Pat. No. 7,166,671) as the present application (213 pages).

File History (as of Nov. 3, 2010) for co-pending U.S. Appl. No. 11/403,457, filed Apr. 13, 2006, entitled "Grafted Cyclodextrin", which claims priority to the same parent application (U.S. Appl. No. 10/672,297, now U.S. Pat. No. 7,166,671) as the present application (251 pages).

"Plexar® PX5125 Extrudable Tie Layer Resin Anhydride Modified LLDPE," *Lyondell Chemical Company*, 1 page (Dec. 31, 1994).

European Search Report dated Jan. 29, 2010 from the European Patent Office in EP Patent Application No. 09173916.9, which corresponds to U.S. Appl. No. 10/672,297, filed Sep. 25, 2003, which is a parent application to the present Application No. 11/403,480 (3 pages).

Le Thuaut et al., "Grafting of Cyclodextrins onto Polypropylene Nonwoven Fabrics for the Manufacture of Reactive Filters. I. Synthesis Parameters", Journal of Applied Polymer Science, 77:2118-2125 (2000).

Extended European Search Report, dated Mar. 3, 2011, European Patent Application No. 10010696.2, (5 pages).

Partial File history (from Apr. 14, 2011 to Aug. 24, 2011) for co-pending U.S. Appl. No. 11/761,017, filed Jun. 11, 2007, entitled "Grafted Cyclodextrin", which claims priority to the same parent application (U.S. Appl. No. 10/672,297, now U.S. Pat. No. 7,166,671) as the present application (37 pages).

Partial File History (From Apr. 14, 2011 to Aug. 24, 2011) for co-pending U.S. Appl. No. 11/403,457, filed Apr. 13, 2006, entitled "Grafted Cyclodextrin", which claims priority to the same parent application (U.S. Appl. No. 10/672,297, now U.S. Pat. No. 7,166,671) as the present application (10 pages).

Office Action dated May 24, 2011 for co-pending Canadian Patent Application No. 2,452,293, filed Dec. 5, 2003 entitled "Grafted Cyclodextrin" (4 pages).

Hoh, "Ionomers", The Wiley Encyclopedia of Packaging Technology, Second Edition, A Wiley-Interscience Publication, John Wiley & Sons, Inc. pp. 527-529 (1997).

Moad, "Chemical modification of starch by reactive extrusion", Progress in Polymer Science, vol. 36:218-237 (2011).

Selke et al., "Plastics Packaging: Properties, Processing, Applications, and Regulations", 2nd Edition, Hanser Publishers, Munich, pp. 3, 15, 92, 96-97, 119, 189-190, 201, 227 and 337 (2004).

"Honeywell A-C® Maleated Polyolefins: Adhesives and Sealants", http://www51.honeywell.com/sm/acwax/common/documents/PP_Acwax_maleated_polyolefins_Literature_document.pdf (2 pgs.) (Oct. 2006).

Partial File history (from Aug. 24, 2011 through Oct. 4, 2011) for co-pending U.S. Appl. No. 11/403,457, filed Apr. 13, 2006, entitled "Grafted Cyclodextrin", which claims priority to the same parent application (U.S. Appl. No. 10/672,297, now U.S. Pat. No. 7,166,671) as the present application (24 pages).

Partial File history (from Aug. 24, 2011 through Oct. 4, 2011) for co-pending U.S. Appl. No. 11/761,017, filed Jun. 11, 2007, entitled "Grafted Cyclodextrin", which claims priority to the same parent application (U.S. Appl. No. 10/672,297, now U.S. Pat. No. 7,166,671) as the present application (8 pages).

* cited by examiner

DIMENSIONS OF CYCLODEXTRINS

ARTICLES HAVING A POLYMER GRAFTED CYCLODEXTRIN

CROSS-REFERENCE TO RELATED APPLICATIONS

This application is a continuation-in-part application of U.S. Ser. No. 11/429,579, filed May 5, 2006, now U.S. Pat. No. 7,605,199, which is a divisional application of application U.S. Ser. No. 10/672,297, filed Sep. 25, 2003, now U.S. Pat. No. 7,166,671, which claims priority under 35 U.S.C. §119(e) to provisional application U.S. Ser. No. 60/432,523, filed Dec. 10, 2002, which applications are incorporated herein by reference.

BACKGROUND

The disclosure relates to polymer materials having a cyclodextrin-grafted (polyolefin-CD) polymer, wherein the polymer materials have a variety of end uses. The disclosure also relates to polymeric materials in the form of fibers, films, webs, flexible, rigid, or semi-rigid sheets, chips, coatings, woven or nonwoven fabrics, foams, and other useful forms of polymers having grafted cyclodextrin. The disclosure also relates to useful articles made from or incorporating the useful polymers, such as packing or packaging materials, closures, containers, personal care absorbent articles, apparel, household items, pet care products, medical products, filter products, and like articles.

There is considerable need for improved polymer materials and articles therefrom that provide superior properties, such as in the food packaging field where the packaged food products would, for example, have longer shelf-life stability under a wide range of storage conditions and a wide range of food products.

There is also a considerable need for improved polymer materials and articles there from that provide for these superior properties and additionally do not cause environmental and/or health concerns due to migration of materials from the polymer. For example, in an application such as a barrier layer in a disposable diaper, migration of low molecular weight additives may cause concern because they contact skin and may be absorbed by the body. Additionally, additives to polymeric matrixes may leach into the environment and cause concern as an air or water contaminant.

SUMMARY

The disclosure relates to functional polymer compositions and structures which contain a cyclodextrin (CD) moiety attached to the polymer. More particularly, this disclosure relates to polyolefins or other useful synthetic polymers comprising a reaction product of a functionalized polymer and cyclodextrin in which the cyclodextrin is grafted onto the functionalized polymer. The disclosure also relates to blends of the grafted polymer and at least one unmodified polymer. A traditional mixing apparatus can be used to accomplish the grafting reaction. In the grafting reaction, a functional group present on the cyclodextrin, such as an hydroxyl, reacts with a reactive functional group on the polymer, such as an anhydride or epoxide, to form a covalent bond between the cyclodextrin and the polymer. For example, a primary hydroxyl on the cyclodextrin reacts with a maleic anhydride (MA) moiety of a MA functionalized polyolefin under conditions that convert substantially all anhydride groups to a half-ester. It has unexpectedly been found that by such conversion it is possible to significantly change the transport properties of low molecular weight organic compounds in conventional polyolefin polymers where at least some of the polymers have pendant cyclodextrins. The disclosure also provides a process for producing the product of the functionalized polyolefin and the cyclodextrin by, for example, melt grafting in a customary compounding apparatus, such as an extruder or like melt mixer, to form a compatible cyclodextrin/polyolefin composition.

Cyclodextrin grafted polymer compositions, according to the present disclosure, are useful in preparing, for example, extruded or molded structures such as thin films, laminates, flexible packages, semi-rigid films, semi-rigid containers, rigid containers, fibers, non-woven fabrics, non-woven webs or sheets, and like structures. The compositions according to the present disclosure may also be useful for providing coatings deposited by coating a solution of the functionalized polymer and subsequently removing the solvent. For instance, these compositions provide functional properties for a sealant layer in flexible food packaging, a beverage contact layer for cartons and bottles, plastic closures and sealing element layers for bottle and jars, a layer in plastic fuel tanks, and polymers used to manufacture fiber, textile, or non-woven fabric compositions, for use, for example, in disposable diapers and like personal care absorbent articles.

The polymer compositions and articles incorporating the polymer compositions or prepared there from mitigate regulatory concerns because the cyclodextrin is covalently bonded to the polymer. Thus, for example, food safety or contamination concerns related to possible cyclodextrin migration are eliminated. The disclosure provides structural materials having significant functional property improvements and which materials and properties are compatible with source reduction, in-plant scrap recycle, and post-consumer recycling.

The polymer compositions of the disclosure also provide a functionalized polymer, such as a polyolefin material, having greater crystallinity and higher surface energy, which changes can alter the partitioning of compounds in direct contact with the polymer especially nonpolar compounds (e.g., alkanes, aromatics, terpenes and sesquiterpenes).

DETAILED DESCRIPTION OF THE INVENTION

Figures 1A, 1B, 1C:
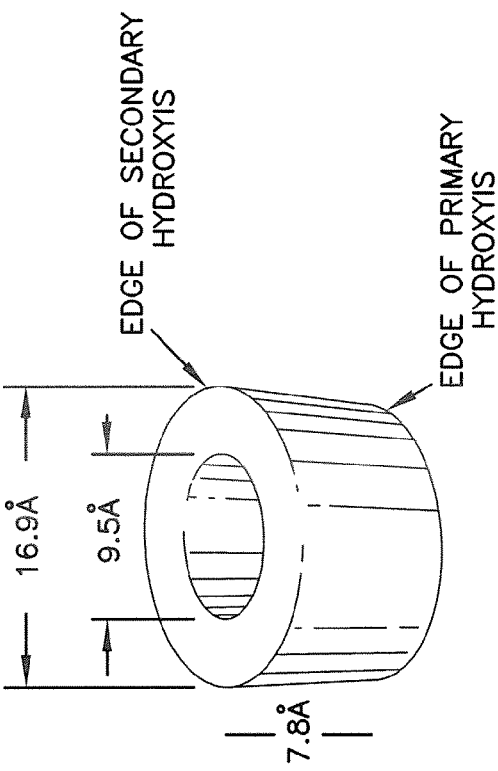
FIG. 1 is a graphical representation of the dimensions of a cyclodextrin molecule without derivatization. The central pore comprises the hydrophobic space, central pore or volume within the cyclodextrin molecule that can act as a site for inclusion of a permeant or contaminant. In the FIGURE, α, β, or γ-cyclodextrin is shown. Such cyclodextrins have hydroxyl groups formed on the perimeter of the molecule that are available for reaction with, for example, anhydride or epoxide groups on functionalized polyolefins.

The disclosure provides compositions comprising a cyclodextrin (CD) covalently bonded to a polystyrene (a polystyrene-CD) or a polyolefin (a polyolefin-CD). A CD can be reacted after polymerization with a functionalized polyolefin or polystyrene. Polyolefins are particularly useful as they can have a variety of reactive functional groups can be used to covalently bind a CD. In embodiments, a polymer can be modified or functionalized with a reactive moiety, such as an epoxide or an anhydride, to add suitably chemically reactive moieties to the polymer, for example, using a peroxide reagent. The modified or functionalized polymer can then be further modified to append one or more CD moieties to the functionalized polymer. In other embodiments, a styrene-maleic anhydride (SMA) copolymer can be employed; in other embodiments, a polyolefin can be employed. Blends of grafted polymers with unmodified polymers can encompass a broad range of materials; any polymeric material that is compatible with a CD grafted polymer of the invention can be included in a blend of the invention.

Cyclodextrin is a cyclic oligomer of α-D-glucose formed by the action of certain enzymes such as cyclodextrin glycotransferase (CGTase). Three cyclodextrins (alpha, beta, and gamma) are commercially available consisting of six, seven, and eight α-1,4-linked glucose monomers, respectively. The most stable three-dimensional molecular configuration for these oligosaccharides is a toroid with the smaller and larger opening of the toroid presenting primary and secondary hydroxyl groups. The specific coupling of the glucose monomers gives the CD a rigid, truncated conical molecular structure with a hollow interior of a specific volume.

Commercial polymer functionalization can be achieved, for example, using solution, melt and solid state routes known in the art. The process covalently bonds monomers onto vinyl polymers or onto polyolefin polymers including, for example, copolymers of olefins with other monomers, such as vinyl monomers, which predominately constitute the olefin portion. Polyolefins useful in this disclosure include, for example, poly(ethylene) or PE, poly(propylene) or PP, poly(ethylene-co-propylene) or PEP, ethylene/methyl acrylate copolymer, ethylene/ethyl acrylate copolymer, ethylene-α-octene copolymer, ethylene-butene copolymers, and like polymers and copolymers. The polyolefins can be functionally modified with unsaturated compounds such as unsaturated anhydrides and carboxylic acids. Additionally, there can be modified terpolymers of, for example, ethylene-acrylate (ethyl or butyl)-maleic anhydride, ethylene-methyl acrylate-glycidyl methacrylate, and like polymers. In embodiments, any packaging grade of a vinyl polymer can be used.

The modified polymers of the invention can be derived in some embodiments from a polymer having a melt index of about 0.7 to 1,500 g-10 min$^{-1}$. In other embodiments, the modified polymers of the invention can be derived from a polymer having a melt index of about 1 to about 1,200 g-10 min$^{-1}$.

Functionalized polymers, such as functionalized polyolefins, have extensive industrial applications such as coextrusion tie resins in multi-layer films and bottles for the food industry, compatibilizers for engineering polymers and plastic fuel tank tie resins for the automotive industry, flexibilization and compatibilization of halogen free polymers for cables, for filler materials used in roofing construction, and like applications. Functionalized polyolefins useful in the present disclosure include, for example, maleated polyethylene and polypropylene (OREVAC™ and LOTRYL™ from Atofina Chemicals Inc. of Philadelphia, Pa., PLEXAR® and INTEGRATE® resins from Equistar Chemicals L.P of Houston, Tex., FUSABOND® resins from DuPont Co. of Wilmington, Del., OPTM resins from Mânas of Ankara, Turkey, ADMER resins from Mitsui Chemicals of Rye Brook, N.Y., and EXXELOR™ from Exxon/Mobil Corp. of Irving, Tex.), maleic anhydride functionalized ethylene vinyl acetate copolymers (EVA-MA, such as Orevac™ EVA-MA from Atofina or Fusabond® C series EVA-MA from DuPont); EPDM (such as ethylene-propylene-butadiene or ethylene-propylene-1,4-hexadiene polymers) ethylene/1-butene copolymers, ethylene/1-hexene copolymers, ethylene/1-octene copolymers, ethylene-n butyl acrylate-maleic anhydride copolymers, ethylene-ethylacrylate-maleic anhydride terpolymers, or copolymers of ethylene and glycidyl methacrylate Other polymers, that are not olefinic, can also be employed in embodiments of the invention. For example, styrene-maleic anhydride (SMA) copolymers are a particularly useful group of reactive copolymers. SMA copolymers are available as, for example, Hiloy SMA copolymers from A. Schulman Inc. of Akron, Ohio, Prevex® SMA from General Electric Co. of Fairfield, Conn. and Dylark® SMA from NOVA Chemicals of Calgary, Alberta Moon Township, Pa.

Ethylene-propylene-1,4-hexadiene polymer can be represented as:

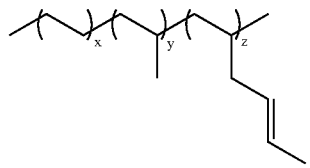

wherein x, y and z can be selected to obtain, for example, about 70 to 90 wt % ethylene, about 10 to 30 wt % propylene and up to about 5 wt % 1,4-hexadiene. $R_1$ and $R_2$ may be similar groups, H, or end groups.

The copolymerization of styrene with maleic anhydride to form SMA copolymer provides a material with a higher glass transition temperature than polystyrene and is chemically reactive as it provides maleic anhydride functionality. SMA copolymers are often used in blends or composites where interaction or reaction of the maleic anhydride provides for desirable interfacial effects. SMA is utilized in the automotive industry for the injection molding and thermoforming of interior parts. The superiority of SMA over polystyrene is due to its higher heat deflection temperature, which is required for automotive use. SMA copolymers have also been extensively used as binder polymers due to the reactive maleic anhydride moieties, which can easily be functionalized with a group or groups to provide tailorable surface energy and chemical compatibility. For example, Keil et al., U.S. Pat. Nos. 5,576,145, 5,698,370, and 5773518 disclose an SMA based binder polymer in which the maleic anhydride residues are monoesterified to between about 50 and about 65 mole percent of an alkyl, aryl, cycloalkyl, alkaryl, or arylalkyl alcohol having a molecular weight greater than 100 as a means of providing interlayer adhesion between two incompatible polymers.

Typical properties of SMA copolymers are shown in Table 1.

TABLE 1

Typical physical properties of commercially available SMA copolymers

| Property | Typical Value |
|---|---|
| Density | 1.07 g/cc |
| Water Absorption | 0.3% |
| Linear Mold Shrinkage | 0.005 cm/cm |
| Mechanical Properties | |
| Hardness, Rockwell M | 110 |
| Tensile Strength, Yield | 40 MPa |
| Elongation at Break | 40% |
| Tensile Modulus | 2 GPa |
| Flexural Modulus | 2.5 GPa |
| Flexural Yield Strength | 60 MPa |
| Izod Impact, Notched | 2 J/cm |

TABLE 1-continued

Typical physical properties of commercially available SMA copolymers

| Property | Typical Value |
|---|---|
| Thermal Properties | |
| CTE, linear 20° C. | 80 μm/m-° C. |
| Thermal Conductivity | 0.17 W/m-K |
| Deflection Temperature at 1.8 MPa (264 psi) | 120° C. |

Another useful polymer that can be grafted with CD to form a CD grafted polymer of the invention is polypropylene. Commercially, maleic anhydride bonded to polypropylene is available, for example, from Honeywell Performance Products of Heverlee, Belgium or the Sigma Aldrich Company of St. Louis, Mo. However, maleic anhydride is also easily added to polypropylene, e.g. in an extrusion reaction by adding maleic anhydride to a molten extrusion stream of polypropylene. In such reaction schemes, CD can advantageously be added further down in the extrusion path, where it can react with the maleic anhydride groups on the modified polypropylene. The general reaction scheme of incorporating maleic anhydride into polypropylene using a radical source such as hydrogen peroxide is shown below.

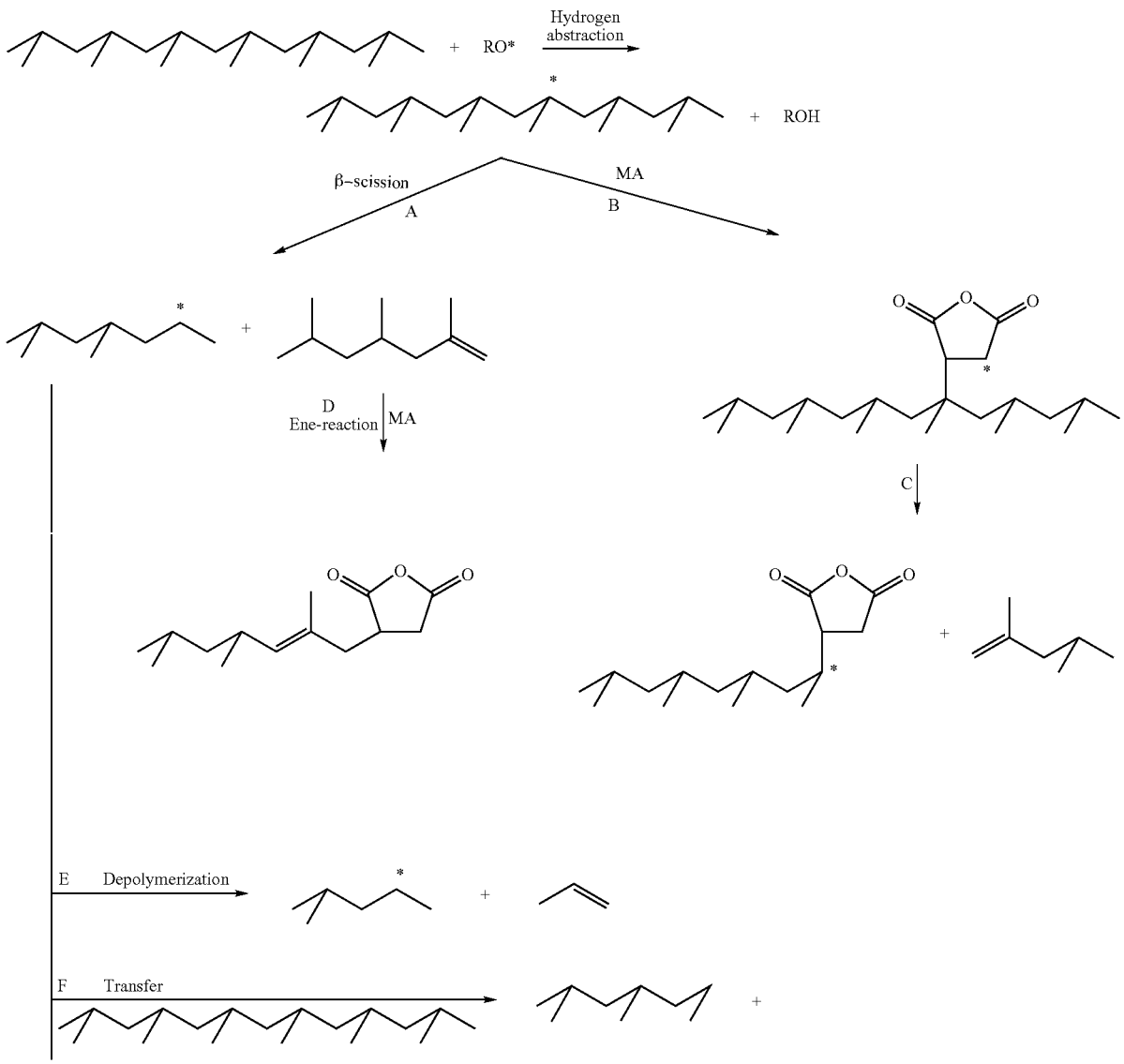

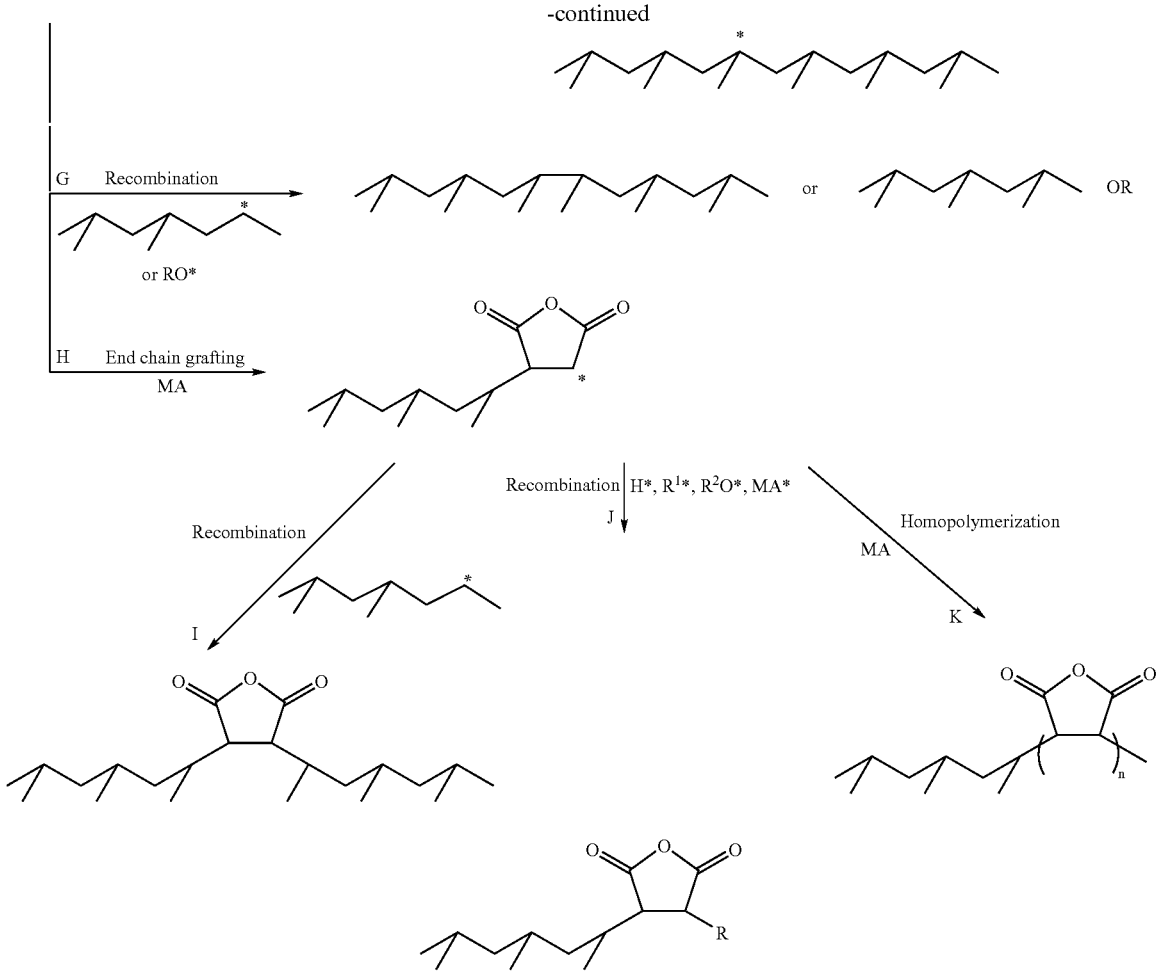

Different reaction pathways for polypropylene in the presence of maleic anhydride and a radical source can correspond to different experimental conditions. The first steps of grafting mechanism are relatively well established and can be summarized as follows: Homolytic scission of each organic peroxide molecule produces two radicals. The decomposition rate (or half-life time of the peroxide) depends only on the temperature. Polypropylene pending hydrogen is abstracted by a radical attack which results in a new radical onto polypropylene. Hydrogen abstraction from one of the tertiary carbons of the polypropylene is generally mentioned for radical stability considerations.

Different possibilities exist for the second steps. They are described in the following, referring to the above reaction scheme. The radical onto a polypropylene chain can lead to a β-scission (reaction pathway A) or to a maleic anhydride grafting (reaction pathway B). The β-scission is a fast intramolecular reaction and seems predominant in the melt state in the presence of organic peroxide. Nevertheless, in reaction B, maleic anhydride grafting of these primary radicals, thus before β-scission, is sometimes suggested. However, it seems that grafting in solution, or in solid state could favor this mechanism. Reaction C seems unlikely as a consequence of the stability of the anhydride radical but sequence B+C is, in fact, undistinguishable from sequence A+H. Reaction D, which could lead to the grafting of maleic anhydride by ene-reaction, has also been studied. Severe conditions are needed to favor this reaction: very low polypropylene molecular mass (high concentration of double bond chain ends), very high concentration of maleic anhydride, high temperature and pressure, and long reaction time is typically required. Even maleic anhydride grafting onto polyisoprene by ene-reaction needs severe conditions and leads to moderate yields. Depolymerization (reaction E) becomes significant at temperatures above 300° C. Transfer and recombination (reactions F and G) are not well characterized or understood in the literature, but can occur. Maleic anhydride end chain grafting (reaction H) is generally suggested as a possible reaction pathway. Recombinations (reactions I and J) and grafting of poly(maleic anhydride) (reaction K) are not widely accepted mechanisms.

The compositions with pendent CD moieties of the disclosure can be coated, extruded, laminated, woven, or molded into a variety of useful films, sheets, fibers, nonwoven webs, monolithic structures, or other shapes using conventional processing technology. As used herein, "monolithic structures" means a solid, uniform article. Nonlimiting examples of monolithic structures include an i-beam, a door frame, a cap for a bottle, a nonporous film, or an appliance casing. In addition to making an article having the olefinic compositions with pendent CD moieties of the disclosure dispersed substantially throughout the article, the article can have discrete areas where the olefinic compositions with pendent CD moieties are deposited, or where they migrate during manufacture. For example, an article may have a coating or film comprising olefinic compositions with pendent CD moieties disposed on the surface of the monolithic article, or on part of the surface of the article. Alternatively, the article can have one or more discrete parts other than a surface wherein the olefinic compositions with pendent CD moieties reside.

Various polymers can be envisioned in blends with CD grafted polymers of the invention; in other embodiments a polymeric article can be coated with a solvent borne or extrusion coated CD grafted polymer of the invention. Alternatively, a polymeric article can be topped with a film or nonwoven layer of CD grafted polymeric material of the invention. The chemical composition of polymers that can be blended with a CD grafted polymer or copolymer are not limited by the scope of this disclosure, but instead can be any polymeric material that is compatible in a solution or melt with a CD grafted copolymer of the invention, wherein the blend has useful physical properties for the application that is the end result of the use of the blend. For example, nylon, polyethylene, polyesters, polypropylene, polystyrene, polyurethanes, poly-α-olefins such as polybutadiene and poly-α-octene, and polyamides such as nylon-6 and nylon-6,6, polyureas, polycarbonates, polyethers, polyketones, poly(vinyl chloride), fluoropolymers, and silicone polymers are commonly used polymers in forming useful articles. Similarly, many commercially useful copolymers, terpolymers, and the like can be blended with CD grafted polymers of the invention. For example, acrylonitrile-butadiene-styrene (ABS), poly(ethylene oxide)-co-(propylene oxide), ethylene-vinyl acetate copolymers, poly (ether-ether-ketone) and the like are useful copolymers and terpolymers for various end use applications. The materials with which the CD grafted polymers of the invention can be blended, coextruded, or topcoated are limited only by compatibility of the CD grafted polymer with the other polymer(s) and other similar processing or compatibility limitations that can exist.

In some embodiments of the mixture of CD grafted polymer blended with an unmodified thermoplastic resin, where 100 parts by weight of unmodified thermoplastic resin is used, about 0.50 to 25 parts by weight can be the grafted polymer having CD grafted thereto. In these embodiments, the unmodified thermoplastic resin can have a melt index of about 0.5 to 1500 g-10 min$^{-1}$, and the modified polymer can be derived from a polymer having a melt index of about 0.7 to 1,500 g-10 min$^{-1}$, or about 1 to 1,200 g-10 min$^{-1}$.

One class of useful polymers that can be incorporated into a blend with, or topically coated with, CD grafted polymers of the invention is polyesters. Polyesters are a generally useful class of polymers from which many containers, nonwoven fabrics, and various other articles are made. Uses of polyesters include applications set forth in copending U.S. patent application Ser. No. 10/163,817. One useful polyester material that can be incorporated into a blend with, or topically coated with a coating of, CD grafted polymers of the invention is polylactic acid, or polylactide (PLA). PLA is a biodegradable, thermoplastic, aliphatic polyester derived from renewable resources and having a general repeat unit of —CH(R)—C(O)—O—. It is most commonly formed from starting materials such as corn starch or sugarcane. Bacterial fermentation is used to produce lactic acid, which is oligomerized and then catalytically dimerized to make a lactide monomer for ring-opening polymerization. It can be easily produced in a high molecular weight form through ring-opening polymerization using most commonly a stannous octoate or tin (II) chloride ring opening catalyst. PLA can be processed like most thermoplastics into fiber (for example using conventional melt spinning processes) and film. NatureWorks LLC, a wholly owned subsidiary of Cargill Corporation, produces PLA under the trade name NatureWorks® polymer. Other companies from which PLA can be obtained include Toyota (Japan), Hycail (The Netherlands), and Galactic (Belgium).

Because it is biodegradable, PLA can be employed in the preparation of bioplastic for such articles as food packaging, loose fill packaging, and disposable articles such as tableware. PLA can also be made into fibers. Fibers and nonwoven textiles of PLA can be used in upholstery, disposable garments, awnings, feminine hygiene products, and disposable diapers. Many of these same applications can also benefit from blending, coating, or other means of incorporating CD grafted polymers or copolymers of the invention for the purpose of scavenging odor causing chemicals.

In embodiments, the present disclosure provides a disposable article comprising a fabric, the fabric comprising a woven or nonwoven web, the web comprising a fiber comprising a thermoplastic polymer composition comprising a blend of a polyolefin resin and a chemically-modified polyolefin resin or a blend of thermoplastic resins (e.g., PE, PP, PET and polylactic acid (PLA)), the modified polyolefin resin comprising, for example, a polymethylene backbone comprising randomly substituted covalently bonded groups comprising a cyclodextrin compound. The grafted cyclodextrin is substantially free of a compound in the central pore of the cyclodextrin ring.

In embodiments, the present disclosure provides a disposable article comprising a nonwoven web comprising a spunbond fabric, a meltblown fabric, an electrospun fabric, and combinations thereof. Examples of spunbond fabric and meltblown fabric are known in the art, and may be spunbond-meltblown-spunbond (SMS), spunbond-meltblown-meltblown-spunbond (SMMS), and like permutations or combinations.

Nonwoven webs of the disclosure can be fashioned into sheets or fabrics using any suitable method. Nonwoven fabrics and articles prepared there from can be categorized, for example, by their end use, such as disposable or durable product articles. It will be appreciated that such categorizations may be arbitrary and that such categories may include articles in either or both categories, and can depend, for example, on the user's discretion to determine useful service life, reuse or recycle opportunities, wear-and-tear assessment, or like considerations. Thus, durable paper formulations can be used in disposable garments and like articles. Likewise, disposable web or fabric compositions or formulations can be used in the manufacture of durable product articles. Examples of traditional disposables include, for example, disposable baby diaper products, feminine hygiene products, adult incontinence products, and the like. Disposables can be prepared using, for example, spunbond webs, meltblown webs, air-laid, wet-laid, carded thermal bonded webs, carded chemically bonded webs, film, and like methods. Spunbond and SMS fabrics can be used for example in healthcare products, such as surgical pack items and medical protective apparel. Spunbonds can be used, for example, in fabric softener sheets, and like sheets or wipes. Durable fabric and durable article end uses include, for example, a variety of filtration products, and building and construction products, where nonwovens can be used, for example, in geotextiles and roofing products. Modified bitumen products that include a spunbond carrier are popular for residential and commercial roofing. Automobile primary carpet backing, carpet tiles, seat lining/padding, and roof headliners can use spunbond materials, which can provide excellent working properties such as moldability, high dimensional stability, and high heat stability.

A variety of product applications or uses exist for the nonwoven fabric articles of the disclosure. Product fabric applications can include, for example, disposable diapers and incontinence garments, or components thereof, such as cloth-like backsheet, leg cuff, and cover stock components. Another product application or use for the nonwoven fabric articles of the disclosure include durable papers or wraps, for example, for use in the home building or construction industry, such as is currently fashioned from Tyvek® polyethylene flash spun fabric. Another product application or use for the nonwoven fabric and articles of the disclosure include disposable, protective apparel such as a hazardous-material suit or like apparel, such as can be currently fashioned from Tyvek® polyethylene or polypropylene flash spun fabric, or like materials. Still another product application or use for the nonwoven fabric and articles of the disclosure include household or pet care articles, such as bedding, pillows, furnishings, and like articles which can employ, for example, polypropylene spunbond, polyester spunbond, and like prepared materials. Still yet another product application or use for the nonwoven fabric and articles of the disclosure include geotextiles or a geotextile component comprising, for example, a heavy-weight polypropylene and polyester spunbond, alone or in combination with needlepunch polypropylene and woven fabrics. Yet another product application or use for the nonwoven fabric and articles of the disclosure includes furniture or a furniture component comprising, for example, a polypropylene spunbond fabric, a polypropylene needlepunch fabric, or a polyester spunbond fabric. Yet another product application or use for the nonwoven fabric and articles of the disclosure includes a filter or a filter component comprising, for example, spunbond fabric, meltblown fabric, or combinations thereof, and which article or component can be used in liquid filtration or air filtration applications. Still another product application or use for the nonwoven fabric and articles of the disclosure includes a surface covering, such as a wall or floor covering, or a surface covering component comprising, for example, residential, commercial, institutional, automotive, and like situational carpets made from, for example, trim heavyweight polyester (PET) spunbond fabrics, carpet underlays or carpet backings consisting of, for example, PET, polyamide, or polypropylene spunbond fabrics. Other product application or use for the nonwoven fabric and articles of the disclosure includes a surface covering, such as a roof or roofing material, or a roof or roofing material component, comprising, for example, polyester spunbonds. Another product application or use for the nonwoven fabric and articles of the disclosure includes a medical product, or a medical product component comprising, for example, a fabric including a spunbond and spunbond/meltblown composite.

Meltblown and spunbond nonwovens fiber technology heats and extrudes polymers including, for example, biodegradables (e.g., polylactic acid—PLA), nylon, polyethylene, polyesters, polypropylene, and polyamides through a specialized die onto a forming table to create a web. Meltblown webs can be used for applications such as filtration, insulation, absorption, and liquid barriers. A system operator can vary the fiber and pore size of the meltblown web to accommodate the customer's absorption and filtration specifications. End products or articles employing or incorporating meltblown fabrics include, for example, dust masks, surgical masks, diapers, battery separators, liquid and air filters, and like products or articles. Spunbond fabrics can be used in a variety of useful applications including, for example, diapers, filtration, insulation, carrier web, textile, geotextile products, and like applications with various end products such as surgical apparel, diapers, battery separators, carpet backing, roofing, liquid and air filters, and like articles. A "geotextile" is generally defined as any permeable textile material used to increase soil stability, provide erosion control or aid in drainage. Typical applications for non-woven geotextiles include aggregate drains, asphalt pavement overlays, and erosion control. See for example, US Fabrics, Inc. (www.usfabricsinc.com).

As in the meltblown process, the spunbond system operator can vary the fiber diameter and pore sizes of the web to meet a broad range of containment properties. In addition, spunbond fabric can be manufactured to accommodate required strength characteristics. Meltblown and spunbond webs can be used together as a composite fabric, providing control over absorption and filtration characteristics, as well as strength. Composite webs comprising combinations of spunbond and meltblown webs also have a variety of applications and end uses. SMS (spunbond-meltblown-spunbond) and SMMS (spunbond-meltblown-meltblown-spunbond) technologies for baby diapers include, for example, standing leg gathers, soft outer cover, stretchable fastening tapes, and stretchable outer covers, panels and the like.

Nonwoven fiber technology incorporating the polymer compositions of the disclosure provide a cost-efficient way to create a broad range of products that can filter and absorb very precisely. Uses include, but are not limited to, for example, surgical masks, battery separators, liquid and air filters, diapers, carpet backing, roofing, silt fencing used around construction sites to manage erosion, mats that absorb oil spills and like uses. See for example, "Fiber Systems Technology Primer, An Introduction to Spunbond and Meltblown," Nordson Fiber Systems (available at: www.nordson.com, Jul. 28, 2006); and "Spunbond Manufacture Process Optimisation by Melt Filtration" by Dr. Oliver Schmidt, Gneuss Kunststofftechnik GmbH (available at: www.nonwovens-industry.com, Jul. 28, 2006).

Table 2 lists several common methods for nonwoven web manufacture and typical or approximate fiber diameters provided by or employed by these methods. It is generally recognized that as the fiber diameter selected decreases in size the surface area of the resulting web increases in proportion to the square of the fiber diameter.

TABLE 2

Methods for nonwoven web manufacture and representative fiber diameters generated using them.

| Method/Fiber Type | Fiber size (diameter); bundle size |
| --- | --- |
| Electrospinning | 10 to 2000 nm; Low fiber bundles |
| Meltblowing | 500 nm to 10 microns; High fiber bundles |
| Flash spinning | 2-15 microns; High fiber bundles |
| Spunbonding | 10-35 microns; Low to medium fiber bundles |
| Bicomponent Spunbond | 200 nm to 100 microns; Low to medium fiber bundles |

Spunmelt processes are used in the manufacture of spunbond (SB) nonwovens, and the meltblown (MB) nonwovens, and combinations of the two, and are made by extruding molten polymer through spinnerets to form fibers. Spunmelt current predominates in the medical drape and gown market providing a diversified product spectrum from a range of micro fibers. In electrospinning, nonwoven fabrics of submicron fibers are drawn from a viscous polymer (solution or melt) stream delivered through a millimeter-scale nozzle with an electric field.

Flash spinning (FS), electrostatic spinning (ES) SB, and MB are among the more popular processes for producing microfiber nonwovens. Although these processes are very different from one another, they all share the same character of making a fibrous product from a polymer in one-step.

Fibers produced from a SB technology can have an average fiber diameter, in the upper limit of a microfiber concept of, for example, from about 15 to about 35 microns. Recent development in bicomponent SB, combined with other technology, such as water soluble components, can provide even finer SB fibers.

MB processing can also make microfibers on the micron or sub-micron scale. MB microfibers can be engineered for a broad spectrum of applications, such as medical fabrics, filter media, protective clothes, and absorbent products. The MB process can be exploited in a variety of aspects, including use of specialty polymers, developing unique fiber and web structures, bicomponent, and microfiber composites.

Microfibers are often used in composite structures to balance properties. The composite can be, for example, spunbond/melt blown/spunbond (SMS), where the SB layers serve as the external skeleton to provide the strength and the support, whereas MB layers can contribute, for example, filtration and barrier characteristics. The technology allows the SB and/or MB section to include more than one layer for special applications, such as SMMS, SSMMS, and like structures.

SMS or SMMS fabrics have been widely used in products that require high barrier properties that are critical for applications in such fields as hygienic and medicine. The barrier properties of those materials are highly dependent on the performance of both 'M' and 'S' layers. In general, the finer the fiber sizes and the higher the weight of the 'M' layer, the greater the barrier properties the SMS or SMMS fabrics will possess.

Microfiber nonwoven composites having specialty chemical treatments can provide useful fabrics in the medical field. Combinations of SB and MB microfiber technologies and optionally treatment technologies can be used to further improve or add other functional properties, such as protection and comfort.

Increased demand for high levels of protection and comfort, and new industrial standards, have caused microfiber nonwovens to steadily replace traditional medical textiles globally. Microfiber nonwovens and their composites have been used in the medical field for several decades. These products find application in hospitals and other healthcare institutions in the form of, for example, drapes, gowns, caps, masks, bandages, sterilization wraps, and like uses. Although different products must deliver different functionalities (e.g., absorbency and repellency), the following can be significant property considerations in the selection of most nonwovens in the medical field: barrier properties; breathability for gown application; drapeability; strength; and tactile softness.

Cotton-surfaced nonwovens in which carded bleached cotton/PP staple fiber webs (e.g., 60/40:cotton/PP) or hydroentangled 100% cotton can be used, for example, to make face masks. The cotton surface of the cotton-surfaced nonwovens is ideally worn against the face for greater comfort. The cotton surface may further comprise antimicrobial agents and/or fluorochemical repellents to enhance the ability of the face mask to filter, repel, or kill bacteria and viruses.

In embodiments, spunlaced fabrics can be made of combinations of wood pulp and synthetic fiber layered composites. Tissue paper can be layered on top of a carded web prior to hydroentanglement. The fabric can have one side that is rich in wood pulp fiber. Additional chemical treatment can be added to the wood pulp fibers to achieve desired barrier properties.

In addition to CD grafted polymer, the articles of the disclosure can include, in various embodiments, an absorbent core; a mixture of natural and synthetic fibers; an acquisition layer; a means of odor control; a metallocene catalyzed olefin resin; a reactive absorbent or super absorbent polymer; one or more ultra-thin layer(s); an antimicrobial treatment; reactive fibers; scavenging fibers (e.g., zeolite, activated charcoal, and like scavengers); biodegradable polymer materials such as polylactic acid; a reduced basis weight; or combinations thereof. The articles of the disclosure may have a range of properties imparted to them, such as breathability; stretchability; shape or body-conforming capability; cloth-like aesthetics and feel; rigidity; high strength; transparency or opacity; a smooth or patterned surface; and the like.

In addition to the abovementioned fiber applications, including methods and materials, the webs and fabrics fashioned there from can comprise bicomponent fibers. Bicomponent fiber technology enables manufacturers to, for example: reduce cost; improve strength and softness; produce ultra-fine fibers; provide improved loft, crimp, or both; and like process and product improvements. Typical bicomponent fiber products include, for example, sheath and core, side-by-side, and splittables (also known as segmented pie). One type of bicomponent fiber is a known material in which the fiber contains an amount of polymer having a relatively high melting point and a second amount of a polymer having a relatively low melting point. In the formation of a web or layer of a web, the fiber is heated to a temperature such that the low melting point polymer can melt, fuse and bind the layer or web into a mechanically stable, unitary mass. The relatively high melting point polymer component can provide mechanical strength and stability to the layer or web.

Bicomponent fibers can thus allow the fabrication of thermally bonded webs, thus providing additional strength, cohesiveness, and robustness of nonwoven webs made from them. Where such properties are desired, use of bicomponent fiber is often sufficient to impart these properties and no further binders or procedures are required to provide the web with additional cohesiveness, strength, etc.

Some embodiments of the invention may also comprise nanofibers. Nanofibers can be formed, for example, by electrospinning, where fibers are spun with diameters of from about 10 nm to several hundred nm. The resulting fiber properties can depend on, for example, field uniformity, polymer viscosity, electric field strength, the distance between nozzle and collector, and like considerations.

Another process to make nanofibers is to employ a bicomponent fiber having an "Islands-in-the-Sea" morphology. Bicomponent fibers of 1-3 denier with from about 240 to about 1,120 filaments are known in the art, wherein the primary fiber material is surrounded by a dissolvable polymer. Dissolving the outer "sea" polymer leaves a matrix of nanofibers, which can be further separated by stretching or mechanical agitation. The polymer ratio is generally 80% islands (nanofilaments) and 20% sea. The fiber morphology tends to provide an irregularly shaped fiber once the dissolvable portion is removed. In some embodiments of the invention, the abovementioned nanofibers may be made by using a bicomponent fiber having the polyolefin-CD polymers of the disclosure in the island portion. The small size and irregular morphology of the resulting nanofibers can provide more effective treatment applications because of their higher surface area compared to smooth, larger diameter fibers. Applications that may benefit from fibers of this type can be, for example, submicron particle filtration, insulation, and fluid wicking applications.

Web production methods useful for fiber and fabric preparation can include any other suitable method, such as spunlace, porous film, co-form, bonded-carded, needle punch, airlaid, wetlaid, and like methods, or combinations thereof. Spunlace processing, also known as hydroentangling, involves mechanically wrapping and knotting fibers in a web through the use of high velocity jets of water. Spunlaced nonwovens work well for wipes because they are soft, strong, easy to handle, and provide good absorption. In embodiments, methods useful for fiber and fabric preparation can additionally include any other suitable processing methods, for example, thermo-bonding, chemical or resin bonding, and like methods. In some embodiments, fibers, fabrics and absorbent materials of the invention can include other suitable functional or performance additives or treatments, for example, an antimicrobial, an anti-static agent, a flame retardant, a fluorochemical, a wetting agent, an ultraviolet stabilizer, a laminate, a binder or an adhesive, a hot melt adhesive, a filler, a silane coupling agent, and like additives or treatments, or combinations thereof. In embodiments, depending upon its disposition and purpose in the fiber or final article, an additive can be included, for example, in a masterbatch, added directly to an extruder, applied topically to a fiber or web surface, and like inclusion methods, or combinations thereof. In embodiments, a binder or an adhesive can include, for example, an acrylic, a hot melt, a latex, a polyvinyl chloride, a pressure sensitive adhesive, a styrenated acrylic, styrene butadiene, vinyl acetate, ethylene vinyl acetate, vinyl acrylic, a melt-fusible fiber, a partially meltable bicomponent fiber (e.g., PE/PP, PE/PET, specially formulated PET/PET), and like materials, or combinations thereof.

In some embodiments, the present disclosure provides a disposable article comprised of a nonwoven web, where the nonwoven web comprises a thermoplastic polymer composition comprising:
  a) a blend of a polyolefin resin and a functionally modified polymer; and
  b) a cyclodextrin bonded to the functionally modified polymer; and optionally
  c) an effective amount of metal carboxylate groups on the resin,
where the cyclodextrin compound is substantially free of an inclusion complex in the central pore of the cyclodextrin. The aforementioned thermoplastic polymer composition is disclosed in copending application U.S. Ser. No. 11/136,084, filed May 23, 2005, entitled "AMPHOTERIC GRAFTED BARRIER MATERIALS," the disclosure of which application is incorporated by reference herein in its entirety. See also commonly owned U.S. Pat. No. 6,894,085, entitled "BARRIER MATERIALS WITH NANOSIZE METAL PARTICLES," the disclosure of which application is incorporated by reference herein in its entirety.

In other embodiments, the present disclosure provides a disposable article comprising a fabric formed from or by incorporating any of the aforementioned nonwoven web fibers. The fabric can be used to make or can be incorporated in, for example, an absorbent article for human or animal use, for example, at least one of:
  an incontinent under garment;
  a sanitary napkin;
  a wipe sheet;
  a tissue sheet;
  an underarm shield;
  and like absorbent articles;
  or combinations thereof.

In embodiments, the present disclosure provides a disposable article comprising a food package formed from or by incorporating any of the aforementioned nonwoven web fibers. The fibers can be used to make or can be incorporated in, for example, a fabric, a sheet, a liner, and like structures or layers which can be incorporated in, for example, a food package, or food package component, for example, at least one of:
  a tray;
  a lid;
  a packing liner;
  a barrier layer;
  a scavenger layer;
  and like food package components;
  or combinations thereof.

In embodiments, the present disclosure provides a disposable article comprised of a fabric, the fabric being fashioned into, for example, a medical article, or medical article component, such as:
  a mask;
  a garment;
  a drape;
  a bandage;
  a wound dressing;
  a bedding material;
  and like medical articles;
  or combinations thereof.

In embodiments, the present disclosure provides a disposable article comprised of a fabric, the fabric being fashioned into, for example, a clothing article, or clothing article component, such as,
  a garment;
  a chemically resistant garment;
  a protective work garment;
  a garment liner;
  a garment accessory;
  a garment accessory liner;
  a foot wear liner;
  and like articles or components,
  or combinations thereof.

A garment accessory includes, for example, a hat, a scarf, a necktie, a glove, a mitten, a hanky, a handbag, a purse, a wallet, a watch band, a backpack, a lunch pail, and like articles. A foot wear liner includes, for example, a shoe liner, a boot liner, a support liner or insole insert, a sandal liner, and like articles.

In embodiments, the present disclosure provides a disposable article comprised of a fabric, the fabric being fashioned into, for example, a household article, or household article component, such as,
  a bedding material;
  a furniture liner;
  a carpet backing;
  a refuse lid liner;
  a refuse container;
  a refuse container liner;
  a storage container:
  and like articles or components,
  or combinations thereof.

In embodiments, the present disclosure provides a disposable article comprised of a fabric, the fabric being fashioned into, for example, a pet care article, or pet care article component, such as,
  a bedding material;
  a wipe sheet;

a towel;
a mat;
a collar;
a garment;
a foot wear or paw wear liner, such as a "bootie" or sock which can be integral to or separable from the wear article;
a cage liner;
and like articles or components,
or combinations thereof.

A bedding material for human or animal use can include, for example, a mattress cover, a mattress pad, a pillow case, a bed sheet, and like materials or articles.

In embodiments, the present disclosure provides a disposable article comprised of a fabric, the fabric being fashioned into, for example, a filter or filter component, such as: a gaseous filter such as a furnace filter or a vacuum cleaner filter; a liquid filter such as a filter for oil, gasoline, diesel fuel, water, or bodily fluids; and like articles or components or combinations thereof.

"About" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

"Optional" or "optionally" means that the subsequently described event or circumstance may but need not occur, and that the description includes instances where the event or circumstance occurs and instances in which it does not. For example, "A optionally B" means that B may but need not be present, and the description includes situations where A includes B and situations where A does not include B.

"Includes" or "including" or like terms means "includes but not limited to."

The present invention may suitably comprise, consist of, or consist essentially of, any of the disclosed or recited elements. Thus, the invention illustratively disclosed herein can be suitably practiced in the absence of any element which is not specifically disclosed herein.

Preparative Processes

Compositions of this disclosure may be prepared using, for example, reactive extrusion by feeding a dry cyclodextrin, or derivative thereof, (<0.10% moisture), a functionalized polyolefin and optionally a second polyolefin, into an extruder at temperatures such that the cyclodextrin reacts with the functionalized polyolefin as the molten polymer and cyclodextrin are transported through the extruder to form a reaction product containing, for example, an ester group which covalently bonds the cyclodextrin to the polyolefin. The ratio of functionalized polyolefin to non-functionalized polyolefin can be adjusted for a specific application and conversion process. In embodiments, the present disclosure is directed to a stoichiometric reaction product of a cyclodextrin and a polymer grafted linking agent (i.e., anhydride, epoxide, etc.), resulting in a modified polymer especially suited as a masterbatch which can be subsequently let down with one or more non-functionalized thermoplastic polymers or thermoplastic elastomers at a weight ratio of one part of the masterbatch composition to between one and fifty parts of non-functionalized polymer. In other words the blend of polymer and master batch, or functionalized polymer, after blending can contain about 0.02 to 50 wt % of the CD functionalized polymer, in certain applications the polymer can contain about 0.1 to 10 wt % of the functionalized polymer or about 0.5 to 5 wt % of the functionalized polymer. The stoichiometric ratio for melt grafting can be calculated on a gram-mole (gram-formula-weight) basis where one (1) gram-mole of CD ($\alpha$, $\beta$ or $\gamma$) is equivalent to one (1) gram-mole of the grafted anhydride, glycidyl or carboxylic acid moiety.

Maleic anhydride, which can be used to graft CD to the backbone of a polyolefin or polystyrene, can be readily prepared by rearranging and dehydrating fumaric acid as shown:

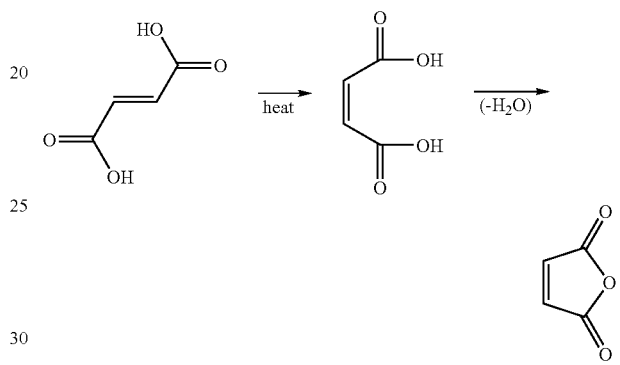

Although not limited by theory, the following are possible mechanisms related to forming the grafted polymers of the disclosure. Maleic anhydride can be grafted onto the olefinic polymer by an "ene" reaction in which olefinic character of the polymer reacts with maleic anhydride to add the anhydride to the polymer chain. The reaction is exemplified in the model structure as follows, wherein the model polymer comprises the polymerized reaction product of at least one hexadiene group:

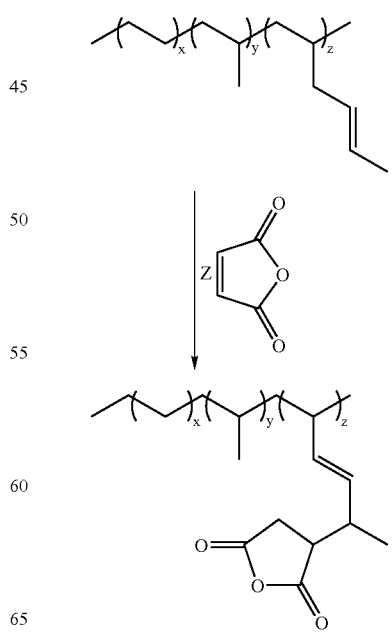

Maleic anhydride can be grafted onto a polymer by homolytic cleavage of a polyolefin with any suitable free radical agent to form a free radical (—CH$_2$CH$_2$CH$_2$CH$_2$.) that can combine with maleic anhydride before termination to form the grafted anhydride. The free radical mechanism is exemplified as follows:

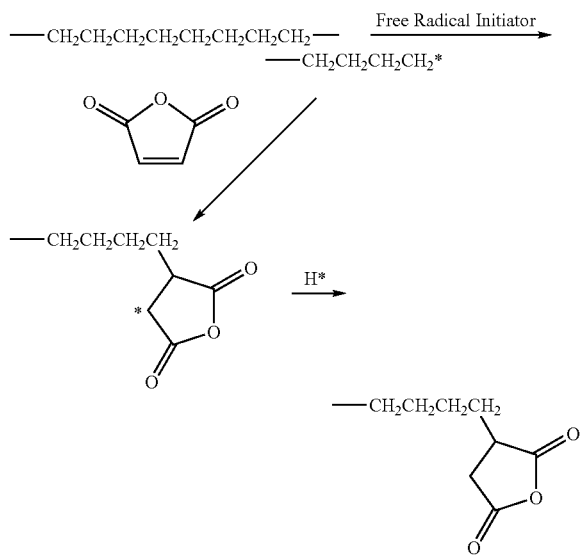

The result of the reaction is a grafted anhydride material. The reaction can occur at either a saturated or unsaturated polymer backbone carbon or at a saturated or unsaturated carbon in a group pendant to the polymer backbone, such as an alkyl substituent. An alternative or competing graft pathway can occur via hydrogen atom abstraction from the olefinic polymer backbone carbon or a suitably reactive pendant group by a free radical agent followed by addition or combination of the resulting backbone or pendant group free radical with the anhydride to form a grafted anhydride product.

The grafting reaction may be carried out using any of a number of techniques known in the art. For example, the polyolefin and maleic anhydride may be reacted in solution, after which CD is added to the solution and reacted with maleic anhydride. Alternatively, solution reaction may be carried out with CD and a maleic anhydride functionalized polymer by employing a commercially available maleic anhydride functional polymer. Alternatively, a polymerization reaction may be carried out to form a polyolefin wherein glycidyl acrylate or methacrylate is incorporated into the monomer mix, and a solution reaction is subsequently carried out whereby CD is reacted with the epoxy group of the glycidyl moiety.

The reaction between CD and a polymer backbone may also take place without solvent, by addition of CD to a molten polymer. The CD grafting process of the disclosure can be carried out, for example, in any conventional batch mixer, a continuous or semi-continuous twin screw, or single screw extruder, capable of melting and homogeneously mixing the components of the process to produce a covalently bonded CD. A preferred twin-screw compounder can be configured with multiple barrel segments for inline additive compounding and devolatilization. A feeder, preferably a gravimetric feeder, can be used to feed the functionalized polyolefin into the first barrel zone of the extruder. A second additive feeder, either gravimetric or volumetric, can be used to feed dry cyclodextrin upstream of the dispersive barrel segment. Care must be taken during the compounding process to prevent atmospheric moisture sorption by the CD. The twin-screw compounder is setup with multiple kneading sections. For example, the kneading sections are spaced along the screw so the initial kneading section melts the resin and mixes it, and the subsequent kneading sections allows dispersive mixing with minimal shear of resin. The conveying section in the first zone has increasing element pitch followed by dispersive screw elements. Following the dispersive section, a short section is used to convey the melt without increasing temperature and again is followed by distributive mixing elements before the composition exits the compounder. Alternatively, the cyclodextrin can be metered into the first barrel zone along with the functionalized resin pellets from the gravimetric feeder. In this case, the barrel segments may be reduced and the dispersive mixing barrel elements moved up. The resin may be devolatilized in either configuration by drawing a vacuum in a downstream barrel segment before the resin is pumped out through a strand die. The molten polymer strands can be run into a water bath and two air wipes before entering the strand cutter. A goal of the compounding step is to minimize moisture introduction while ensuring a consistent feed of the cyclodextrin with good dispersion within the functionalized resin component.

In some embodiments, a functionalized polyolefin/CD master batch can be preferably prepared using cyclodextrin material having reduced or low moisture content. When a masterbatch composition is produced, it can pick up some water in the water bath and may require drying, for example, in a hot air fluidized bed, an air oven, a desiccant dryer, or a vacuum oven prior to use in a conversion process. The downstream process, as well as the application, dictates the residual moisture content of the masterbatch. After the masterbatch is compounded, the CD moisture content can be varied to accomplish various aspects of the disclosure. Surprisingly, the barrier properties of a material made of a functionalized polyolefin/CD masterbatch letdown into virgin matrix material are not maximized if dry cyclodextrin material is used. The absence of cyclodextrin moisture leads to greater complexation of residual impurities inherent in all thermoplastic resins. The presence of some moisture in the cyclodextrin reduces complexation during the compounding and conversion processing steps. Cyclodextrin moisture levels between 0.5% and 2% in the masterbatch will generally minimize or substantially prevent residual resin impurity complexation. Further, these levels of cyclodextrin moisture do not adversely affect polymer morphology or cause other adverse barrier affect such as matrix pinholes, microscopic voids, etc. The presence of some moisture in the cyclodextrin does not impede or reduce inclusion complex formation with diffusing permeants.

Chemically grafting CD molecules onto functionalized polyolefin polymers economically produces a barrier or selective barrier structure with tailorable properties based upon the CD pore size ($\alpha$, $\beta$, $\gamma$), whether the CD is unmodified or modified, and the proportion of CD in the grafted polymer as well as the portion of grafted to ungrafted polymer in the final mixture. These unique properties include reducing the transport of low molecular weight impurities, especially degradation products of thermal processing. By scavenging low molecular weight organic materials, the CD moieties impart improved intrinsic organic vapor barrier properties to the polymer, change the surface energy of the polymer and thereby change polar and nonpolar organic partitioning at the interface, and increase polymer crystallinity of the polyolefins where they are incorporated. These property improvements can significantly add value to resins. These improvements come with additional benefits not achievable with compatible cyclodextrin derivatives known in the art (U.S. Pat. Nos. 5,492,947, 5,603,974, 5,837,339 and 5,928,745) which are pendent moieties or substituents that render the CD material compatible with the thermoplastic polymer, and which also achieve reduced migration and superior barrier properties. Thus, the present CD grafted polymers have additional benefits that arise from the attribute of having the CD molecules grafted to a polymer backbone, because the CD molecules are effectively prevented from migrating within, or out of, the polymer network. Thus, the CD moieties are able to provide scavenging properties to the polymer materials in which they are incorporated, but are not able to leave the polymeric network in which they are incorporated. CD molecules are not able to migrate into food, water sources, etc., even when the CD containing materials are in direct contact with them. This is a particularly important aspect of the present invention, particularly after a CD moiety has scavenged a deleterious compound which is situated in the central pore of the CD.

Useful CD compounds for the grafting reaction in the present invention contain at least one pendant group, such as an hydroxyl (—OH), that can react with, for example, an anhydride or epoxide functionalized polyolefin. Additionally, the CD material can be uniformly dispersed into the melted functionalized polyolefin, can reside in the polymer without reductions in the intrinsic barrier properties of the polyolefin, can retain the ability to trap or complex diffusing permeants or polymer migrant impurities, can change the surface energy of the polymer and organic molecule partitioning, and can improve polymer crystallinity.

In some embodiments, we have found that a polyolefin incompatible CD, such as unmodified α, β and γ-CD, can be dispersed into functionalized polyolefins, and covalently bonded to the functionalized polyolefin to form a compatible composition without microscopic particles or without decomposition of the unmodified CD during compounding or during subsequent conversion steps. Further, we have found that functionalized polyolefins with covalently bonded unmodified CD do not cause melt fracture as measured by visual inspection of the extrudate. Lastly, cross-sectioned polyolefin extrudate examined by optical microscopy was free of CD agglomerates.

In embodiments, the coupling of the unmodified cyclodextrin to the maleic anhydride pendant groups on the polyolefin can be accomplished cleanly in high yield, and without a catalyst or an initiator. Thus, the grafted CD polymer products and articles prepared there from are free of such small molecule contaminants, such as a catalyst, an initiator, or free cyclodextrin in the product. Such contaminants, if present, can undesirably leech from the product polymer, polymer blends, or useful articles.

The articles of the disclosure may suitably comprise, consist of, or consist essentially of, a film, a sheet, or a nonwoven web which includes a thermoplastic polymer composition having a blend of a polyolefin resin and a modified polyolefin resin, the modified polyolefin having randomly substituted and covalently bonded cyclodextrin groups. Thus, the invention illustratively disclosed herein suitably may be practiced in the absence of any element which is not specifically disclosed herein.

Cyclodextrin

Cyclodextrin is a cyclic oligosaccharide consisting of at least six glucopyranose units joined by α (1→4) linkages. Although cyclodextrin with up to twelve glucose residues are known, the three most common homologs (α cyclodextrin, β cyclodextrin and γ cyclodextrin) having 6, 7 and 8 residues have been used.

Cyclodextrin is produced by a highly selective enzymatic synthesis. It may consist of six, seven, or eight glucose monomers arranged in a donut-shaped ring, which are denoted α-, β-, or γ-CD respectively (See FIGS. 1A, 1B and 1C, respectively). Some properties of these three CD species are show in Table 3. The specific coupling of the glucose monomers gives the CD a rigid, truncated conical molecular structure with a hollow interior of a specific volume. This internal cavity, which is lipophilic, is attractive to hydrocarbon materials when compared to the exterior. This chemical compatibility is a key structural feature of the CD, and imparts the ability to complex organic molecules such as aromatics, alcohols, halides and hydrogen halides, carboxylic acids and their esters, and the like. The complexed molecule must satisfy the size criterion of fitting at least partially into the cyclodextrin internal cavity, resulting in an inclusion complex.

TABLE 3

Properties of α, β, and γ cyclodextrin.
CYCLODEXTRIN TYPICAL PROPERTIES

| CD PROPERTIES | α-CD | β-CD | γ-CD |
| --- | --- | --- | --- |
| Degree of polymerization (n =) | 6 | 7 | 8 |
| Molecular Size (A°) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[\alpha]^{25}_D$ | +150.5 | +162.5 | +177.4 |
| Color of iodine complex | Blue | Yellow | Yellowish Brown |
| Solubility in Distilled water (g/100 mL) 25° C. | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The parent CD molecule, and useful derivatives, can be represented by the following formula (the ring carbons showing conventional numbering) in which the vacant bonds represent the balance of the cyclic molecule:

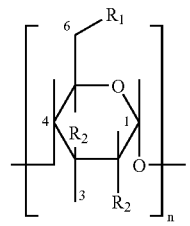

wherein $R_1$ and $R_2$ are primary or secondary hydroxyl as shown.

The CD's internal cavity size (i.e., α, β, γ) must be considered and the functional group modification must be suitable for changing the desired bulk polymer and surface polymer characteristics in addition to forming an inclusion complex with targeted volatiles or impurities. To achieve a specific result, more than one cavity size and functional group may be necessary. Thus, it may be advantageous to graft more than one species of CD to a polymer for a particular end use.

The disclosure is also directed to a novel process and resulting product whereby improved anhydride-functionalized polymers, most notably, polyolefins grafted with maleic anhydride, are produced. In the process of the invention, anhydride-functionalized polymer is modified by reacting with a CD under conditions that can convert all, when needed, or a portion of the anhydride groups to the corresponding half-ester. The product of this process is a polymer having surprisingly advantageous properties. While it is known to graft diesters and half-esters of dicarboxylic acids or their anhydrides, such as maleic acid or maleic anhydride, onto various polymer substrates, we have discovered that polyolefin polymer compositions obtained by grafting CD onto a functionalized polyolefin in accord with the present disclosure, in embodiments, exhibit a substantial increase in crystallinity. In addition, the polymers exhibit improved interfacial interaction when compared to conventional polyolefin polymers such as changing partition coefficients, changing surface energy, improving barrier properties, and providing a selective scavenging function. Cyclodextrin grafted polymers of the disclosure can be used in various structures and various types of food packaging to, for example, extend product shelf-life, in fiber to reduce malodors, and as a barrier to organic permeants in a variety of applications.

According to the disclosure, the CD is a compound substantially free of an inclusion complex. For this disclosure, the term "substantially free of an inclusion complex" means that at the time of manufacturing an article for an end use, the quantity of the CD contained within, and grafted to, the bulk polymer contains a substantial fraction of CD that is free of a contaminant in the central pore of the CD ring (see, e.g. FIG. 1A). The central pore is then free for use as a binding location for small molecule organic materials that are advantageous to entrap for some reason. For example, improving the barrier resistance of the package to atmospheric organic permeants during food distribution and storage is very important when packaged food products (e.g. snack foods) are stored or sold from convenience stores which also sell petroleum products (e.g. gasoline). Further, it may be advantageous to remove deleterious byproducts of thermal degradation, food oxidation, or toxins and the like, from food products, medical environs, or consumer goods, by improving packaging properties that exclude or sorb volatile contaminants, aromas, flavor altering compounds and the like. However, it will be understood by the skilled artisan that the invention also contemplates that some fraction of the CD central pores may become complexed during manufacture. Such complexing can occur as residual impurities and degradation materials arising from thermal processing of the polymer matrix become the inclusion compound in the CD inclusion complex. The skilled artisan will also understand that some fraction of CD central pores may comprise a minor fraction of water molecules at the time of manufacture, wherein the CD is not 100% dry.

CD molecules have available for reaction with a functionalized polyolefin the primary hydroxyl at the six position of the glucose moiety, and at the secondary hydroxyl in the two and three positions. Because of the geometry of the CD molecule, and the chemistry of the ring substituents, all hydroxyl groups are not equal in reactivity. However, with care and effective reaction conditions, substantially dry CD molecules can be reacted to obtain a grafted CD. A CD with selected substituents, i.e., substituted only on the primary hydroxyl or selectively substituted only at one or both the secondary hydroxyl groups can also be grafted if desired. Directed synthesis of a derivatized molecule with two different substituents or three different substituents is also possible. These substituents can be placed at random or directed to a specific hydroxyl. These substituents may be chosen such that they the site of the grafting reaction. For example, alcohol derivatives (e.g., hydroxyethyl and hydroxypropyl) and amino derivatives of CD can be reacted with a substituent on a polymer backbone to make a grafted CD.

A preferred preparatory scheme for producing a grafted CD polyolefin material having compatibility with polyolefin resin involves reactions at the primary or secondary hydroxyls of the CD molecule. It is meant that a hydroxyl functionality of the CD reacts with, for example, the anhydride or epoxide component of the functionalized polyolefin to form a reaction product. The formation of an ester or ether bond on either the primary or secondary ring hydroxyls of the CD molecule involve well-known reactions. Further, CD having less than all of available hydroxyls substituted with derivative groups can be grafted with one or more of the balance of the available hydroxyls. The primary —OH groups of the cyclodextrin molecules are more readily reacted than the secondary groups. However, the molecule can be substituted on virtually any position to form useful compositions. Broadly, we have found that a wide range of pendant substituent moieties can be used on the molecule. These derivatized cyclodextrin molecules can include, for example, alkylated cyclodextrin, hydrocarbyl-amino cyclodextrin, and like derivatives. The substituent moiety must include a region that provides compatibility to the derivatized material.

Amino and other azido cyclodextrin derivatives of pendant thermoplastic polymer of the disclosure can be used in the sheet, film, fiber, or container of the disclosure. A sulfonyl derivatized cyclodextrin can be used to generate the amino derivative from the sulfonyl group substituted cyclodextrin via nucleophilic displacement of the sulfonate group by an azide ($N_3^{-1}$) ion. The azido derivatives are subsequently converted into substituted amino compounds by reduction. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin. Due to the nucleophilic displacement reaction that produces the nitrogen containing groups, the primary hydroxyl group at the 6-carbon atom is the most likely site for introduction of a nitrogen-containing group. Examples of nitrogen containing groups that can be useful in the disclosure include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include, for example, dialkylamino such as dimethylamino, diethylamino, piperidino, piperizino, and like substituents.

The cyclodextrin molecule can be substituted with heterocyclic nuclei including, for example, pendant imidazole groups, histidine groups, imidazole groups, pyridino groups, and substituted pyridino groups.

Cyclodextrin derivatives can be modified with sulfur containing functional groups to introduce compatibilizing substituents onto the cyclodextrin. Sulfur containing groups can be manufactured based on sulfhydryl chemistry and can be used to derivatize cyclodextrin. Such sulfur containing groups include, for example, hydroxyethylthio (—S—$CH_2CH_2OH$), imidazolylmethylthio, aminoalkylthio, and like groups.

Applications and Uses

Food and Beverage Packaging

A food package article or food package component of the disclosure can be, for example, a tray, a packing liner, a barrier layer, a scavenger layer, and like components, or combinations thereof.

Long-established food packaging concepts are limited in their ability to extend the shelf-life of food products. Innovative food packaging concepts of the disclosure can, for example, interact with the environment inside the package and respond by changing their properties to maintain, adjust or improve the specific package headspace atmosphere or minimize food flavor loss to the package by "scalping" (i.e., uptake of volatile components by the polymeric package material from the food) thereby adding to product quality and extending shelf-life. The most notable group of technologies in use today for controlling package headspace oxygen is oxygen scavengers.

Multi-layer or composite packages, including gable top cartons, rely on essential layers of plastic that add strength, barrier to other materials in the structure, and sealability. By way of example, gable-top milk and juice cartons are specifically disclosed in U.S. Pat. Nos. 5,816,487, 5,508,075, 5,616,353, 6,193,827 and 6,372,317, as liquid tight containers. A representative structure for a juice carton product or like container is, for example, listed in Table 4.

TABLE 4

Representative layer composition structure for a juice carton product.

| Layer No. | Layer Composition |
|---|---|
| 1 | Linear, low density polyethylene (LLDPE) |
| 2 | Paperboard |
| 3 | Nylon |
| 4 | Tie layer |
| 5 | Ethylene-vinyl alcohol copolymer (EVOH) |
| 6 | Tie layer |
| 7 | Linear low density polyethylene (LLDPE) |

While these familiar gable-top cartons have been extensively used throughout the United States to contain juices, they are associated with some problems. Most interior polyolefin food contact or sealant layers scalp low molecular weight volatile organic aroma and flavor compounds from the food into the polymer, based on the sorption mechanism, which has been and continues to be the subject of considerable attention and concern. Sorption may result in the loss of aroma and flavor volatiles associated with product quality. Anhydride-functionalized polymers modified with cyclodextrin effectively address problems related to poor organic barrier, surface hydrophobicity, and food flavor scalping over blends of conventional polyolefin. The compositions described herein are particularly useful for container articles constructed from laminates having a heat sealable internal food contact surface which enables significant flavor retention in fruit juices contained therein over the shelf life of the product.

In a properly designed food package, polymers should sorb a minimum amount of the critical flavorings while meeting all other performance requirements. Flavor loss due to sorption into the packaging polymer is generally assumed to be detrimental to product quality. In contrast, the fruit juice industry has designed liquid packaging to take advantage of sorption losses by striving to eliminate off-flavor precursors. The present disclosure relates to the use of the packaged food contact polymer layer, as illustrated by the juice example, to selectively remove undesirable off-flavors from the packaged foods while minimizing the loss of important flavoring compounds. A food package contact layer can be constructed of, for example, anhydride-functionalized polymers modified with cyclodextrin to effectively address problems related to poor organic aroma/flavor barrier, unwanted food flavor scalping, and removal of offensive odors/aromas from the interior of food packages produced by, for example, lipid oxidation, lipid hydrolysis, protein/amino acid breakdown, and like changes or reactions of the packaged food. These active packaging polymer improvements of the disclosure are significant compared to conventional polyolefins and can considerably improve food taste over the shelf-life term of the product.

There have been many structures proposed for packaging juices in paperboard based containers, both the gable top style historically used for milk, and now including integral pour spouts, as well as brick style packages of the type fabricated in systems produced by Tetra Pak USA of Vernon Falls, Ill.; Combibloc, a subsidiary of SIG Holdings AG of Neuhausen am Rheinfall, Switzerland, and others. Initially, these packages used coatings on the food contact side of the paperboard that included combinations of aluminum foil and polyolefins. The foil provided oxygen barrier while the polyolefin provided tight seals, both of which are required to form containers capable of providing extended shelf life for either refrigerated or ambient distribution.

While these packages provided convenience and a perception of freshness to consumers when compared to frozen concentrated juice, migration and scalping of the "essential oils" which are important for flavor and odor perception and scalping of nutrients, particularly Vitamin C, became problems which the juice packers wanted addressed. Improvements in both of these areas would improve product quality and permit even longer shelf lives for these products. The foil layer was also prone to cracking in the folding and sealing operations, reducing the oxygen barrier of the overall packages.

Starting in the late 1980's, claims in US patents began to describe the use of EVOH as a barrier layer alternative to foil. In other structures, nylon was included for oxygen barrier, mechanical stiffness, and sometimes used in combination with EVOH to protect it from moisture, which reduces EVOH's oxygen barrier properties. Loss of essential oils and vitamin C were also objects of many of these patents. The first route taken was to reduce migration through the structure of these components; later approaches attempted to minimize absorption of these components by reducing the amount of polyolefin sealant in contact with the juice.

The following is a brief summary of the structures claimed in a selection of important US patents for packages of this type.

Brown et al., U.S. Pat. No. 4,753,832 discloses glycol modified PET as the product contact surface to minimize absorption. Thompson et al., U.S. Pat. No. 4,777,088 discloses paperboard having a layer of LDPE on one side and a multilayer of nylon, Surlyn® and LDPE on the other side, wherein LDPE of the multilayer contacts the food product. These structures are produced by lamination. In a later application by the same authors, U.S. Pat. No. 4,835,025 discloses the same layers at U.S. Pat. No. 4,777,088, but nylon layer is directly extruded instead of laminated.

A list of patents assigned to International Paper Company of Purchase, N.Y. disclose and claim multilayers on substrates (such as paperboard) that are particularly suited for use in cartons to contain food products. Unless otherwise noted in patents generally assigned to International Paper Company, the "abuse resistant layer" is preferably nylon, but other materials with tensile strength of greater than 10,000 psi are also claimed. "Oxygen barrier material" is preferably a metal foil, but other materials, including EVOH, are claimed. "Caulk" is preferably Surlyn® ionomer (available from the DuPont Company of Wilmington, Del.), but can also be ethylene-acrylic acid copolymer, ethylene methacrylic acid copolymer, ethylene methacrylate copolymer, ethylene-vinyl acetate copolymer, ethylene-α-octene copolymer, ethylene-butene copolymer, or ethylene based graft copolymers. "Heat seal layers" means LDPE, LLDPE, MDPE and blends. Unless otherwise disclosed, all the constructions assigned to International Paper Company are paperboard or "substrate" having LDPE on the outside surface of the substrate, and a multilayer construction on the inner surface such that the multilayer is in contact with the food product such as fruit juice.

Among these patents, Gibbons et al., U.S. Pat. No. 4,789,575 discloses non-foil composite structures for packaging juice having a multilayered construction having a tie layer, EVOH, a second tie layer, and LDPE in contact with the food product. The same authors disclose in U.S. Pat. No. 4,859,513 an oxygen impermeable leak free container having a multi-layer structure with an abuse resistant layer, a tie layer, an oxygen barrier layer, a second tie layer, a caulk, and LDPE in contact with the food product. Gibbons et al., U.S. Pat. No. 4,880,701 discloses an oxygen impermeable leak free container having a multilayer of caulk in contact with the substrate, an oxygen barrier layer, a tie layer, an abuse resistant layer, a second tie layer, and LDPE that is in contact with the food product. Gibbons et al., U.S. Pat. No. 4,888,222, discloses an oxygen impermeable leak free container having a multilayer structure wherein a caulk is in contact with the substrate, an oxygen barrier layer, a second layer of caulk, two layers of LDPE, a tie layer, EVOH, a second tie layer, and two additional layers of LDPE. Gibbons et al., U.S. Pat. No. 4,921,733 discloses an oxygen impermeable leak free container having a multilayer structure wherein an abuse resistant layer is in contact with the substrate, then a caulk layer, tie layer, oxygen barrier layer, a second tie layer, a second layer of caulk, and LDPE in contact with the food product. Gibbons et al., U.S. Pat. Nos. 4,929,476; 4,981,739; and 4,983,431 discloses an oxygen impermeable leak free container having a heat seal layer on the outside surface of the substrate, and a multilayer structure on the inside surface of the substrate that is a tie layer, an oxygen barrier layer, a second tie layer, a caulk, an abuse resistant layer, a second layer of caulk, and a heat seal layer in contact with the food product. Gibbons et al., U.S. Pat. No. 4,940,612 disclose an oxygen impermeable leak free container having a multilayer of an abuse resistant layer in contact with the substrate, a caulk layer, an oxygen barrier layer, a second caulk layer, and LDPE in contact with the food product. Gibbons et al., U.S. Pat. No. 4,981,739 disclose an oxygen impermeable leak free container having a heat seal layer in contact with the outer surface of the substrate, and a multilayer structure on the inside surface wherein Surlyn® is in contact with the substrate, an oxygen barrier layer, a second layer of Surlyn®, an abuse resistant layer, a third layer of Surlyn®, and a heat seal layer in contact with the food product. Gibbons et al., U.S. Pat. No. 4,983,431 disclose an oxygen impermeable leak free container having a heat seal layer in contact with the outer surface of the substrate, and a multilayer structure on the inside surface wherein a caulk layer contacts the substrate, an abuse resistant layer, an oxygen barrier layer, a second abuse resistant layer, a second layer of caulk, and a heat seal layer in contact with the food product.

Other patents assigned to International Paper Co. include Kinsey, U.S. Pat. No. 6,110,548, which discloses an extended long life juice carton structure and method of construction having a heat seal polymer on the outside surface of the substrate, and a multilayer structure on the inner surface of the substrate having a polyamide in contact with the substrate, an optional tie layer, one or two optional polyolefin layers, an optional tie layer, a high barrier property EVOH, a thin tie layer, and a thin heat seal layer in contact with the food product. In this patent, the EVOH is placed as near to the product contact layer as possible by keeping the tie layer and heat seal layer very thin. Reighard et al., U.S. Patent Pub. No. 2004/0037983 disclose non-foil barrier laminates having a polyolefin on the outer surface of a board substrate, and an inner multilayer structure having a polyamide layer in contact with the board, an EVOH layer, a second layer of polyamide, an optional tie layer, an optional polyethylene layer, a tie layer, an oxygen barrier layer, a second tie layer, and a polyolefin layer in contact with the food product. The oxygen barrier layer includes EVOH, polyvinyl alcohols, polyamides, polyesters, PET, polyolefins, cyclic olefin copolymers, polycarbonates, liquid crystal polymers and blends thereof and blends of any of the foregoing with at least one of desiccants, molecular sieves and cyclodextrins.

Another company having a plurality of patents on multilayer constructions for food containing cartons having paperboard substrates is Westvaco Corp., now MeadWestvaco Company of Richmond, Va. Among these, Massouda, U.S. Pat. No. 4,950,510 discloses a multiple layer paperboard laminate having a modified ethylene-vinyl acetate copolymer (EVA) in contact with the outer surface of the paperboard substrate, and a multilayer construction on the inner layer of the carton having LDPE in contact with the board, and a barrier layer; in a second embodiment there is also disclosed further layers of a tie layer, a second LDPE layer, a second tie layer, and a second barrier layer in contact with the food product. The barrier material is preferably EVOH, but others are specified. Barrier layer as product contact layer is designed to minimize absorption of essential oils. The modified EVA layer is made compatible with heat sealing to barrier layer. Parks, U.S. Pat. No. 5,725,917 discloses a barrier laminate with improved interlayer adhesion, having a heat seal polyolefin on the outside surface of the paperboard substrate, and a multi layer structure on the inner surface of the paperboard substrate having an optional LDPE layer, a tie layer, an amorphous nylon, a second tie layer, a second optional LDPE layer, and a heat seal layer to contact the food product. A key aspect of this patent is that tie layers are specified to be anhydride modified LLDPE instead of previously used anhydride modified LDPE. Parks et al., U.S. Pat. No. 6,149,993 discloses an oxygen and flavor barrier laminate including amorphous nylon, having a heat seal polyolefin layer on the outside surface of the paperboard substrate, and a multilayer structure on the inner surface of the substrate having an optional LDPE layer, a tie layer, an amorphous nylon layer, a second tie layer, a second optional layer of LDPE, and a heat seal polyolefin to contact the food product. This patent claims structures similar to U.S. Pat. No. 5,725,917, but without the limitation of the tie layer being anhydride modified LLDPE.

Percec, et al., U.S. Pat. No. 5,084,352 assigned to Standard Oil Co., disclose multilayered barrier structures for packaging having LDPE on the outer surface of a board substrate, and an inner multilayer structure having LDPE contacting the board, and EVOH layer, a tie layer, and a second layer of LDPE in contact with the food product. Robichaud, U.S. Pat. No. 5,306,533, assigned to Combibloc, Inc., discloses an oxygen barrier container having LDPE on the outer layer of a substrate, and an inner multilayer structure having an optional LDPE layer, a tie layer, an oxygen barrier layer, a second tie layer, and an LDPE layer of at least 35 μm thickness in contact with the food product. Claims for this patent are specific to aseptic packages and the specification acknowledges that this structure does not minimize absorption of essential oils. EVOH is the only oxygen barrier material discussed and is specifically claimed in dependent claims.

Yamada et al., U.S. Pat. No. 5,433,982, assigned to Dai Nippon Printing Co., Ltd. disclose a composite container having barrier properties wherein an LDPE layer is on the outer surface of a "base material layer", and a single layer of semi-aromatic polyamide is disposed on the inner surface of the base material layer. Novamid X 21, available from Mitsubishi Kasei Kogyo of Japan, is the preferred polyamide. The claims describe a copolymer of an aromatic polyamide forming component and an aliphatic polyamide forming component. Claims are specific to ranges of the co-monomers used and their precursors. Claims are also specific to a container having an opening and pouring member inserted through a hole and heat sealed to semi-aromatic polyamide layer. Yamada et al., U.S. Pat. No. 5,695,839, assigned to Dai Nippon Printing Co., Inc., disclose a composite container having a barrier property wherein a polyolefin is disposed on the outer surface of a base material layer, and the inner surface of the base material layer has a multilayer structure of an optional adhesive layer, an optional polyolefin, a barrier layer, a second optional adhesive layer, and a polyolefin in contact with the food product. A division of this patent claims the layers that are disclosed in U.S. Pat. No. 5,433,982 as optional, and has no limitation as to the requirement of an opening and pouring member.

In some embodiments, the present disclosure provides a packaging solution, for example, in high barrier packages for foods that are susceptible to, for example, flavor, odor, or nutrient loss attributable to migration through or absorption by the packaging materials. Packaging structures of the disclosure provide reduced flavor scalping among other desirable performance properties. Representative structures for a high barrier package or like containers are, for example, listed in Table 5, where "Polyolefin-CD" refers to a polyolefin having grafted or covalently bonded CD in accordance with the present disclosure, wherein the other terms are as described herein or are known in the art.

layer between the board and nylon layers are also contemplated to be within the scope of this invention.

Referring to Table 5, more specifically to Barrier Layer Composition 2, the embodiment is made using coextrusion techniques. In one methodology useful to make the barrier layer composition 2 of Table 5, the following steps are carried out:

1. Extrusion coat heat seal layer 1 onto the surface of board 2 that will become the exterior of the package,
2. Coextrusion coat nylon layer 3, EVOH layer 4, nylon layer 5, and tie layer 6 on to the side of the board 2 which will face the interior of the package,
3. Coextrusion coat bulk polyolefin layer 7 and polyolefin-CD heat seal layer 8 onto the coextruded layers of step 2.

Although specific coating techniques have been described, any appropriate technique for applying the layers onto the mechanically stable structure substrate can be suitably employed, such as extrusion coating, coextrusion coating, extrusion lamination, coextrusion lamination and/or adhesive lamination of single layer and/or multilayer films to the mechanically stable structural substrate to achieve the stated inventions.

The resulting polyolefin-CD grafted materials are very effective, for example, even at low concentrations, in changing partition coefficients of the surface of the packaging polymers, films, or like package components incorporating the polyolefin-CD materials and can thus reduce essential oil and vitamin C scalping from foods they contact. Other arrangements of bulk, tie, barrier and heat seal layers are contemplated and are within the scope as comprising the overall construction of layers having at least one layer that includes polyolefin-CD.

The polyolefin and the polyolefin-CD modification can be tailored to match the specific functional needs of the particular layer(s). Significant flexibility can be achieved with the use of different polyolefin-CD modifications in different layers. For example, HDPE optimized with polyolefin-CD for improved moisture barrier in a bulk layer can be combined with a heat seal layer optimized with polyolefin-CD to have a partition coefficient which reduces scalping of the particular

TABLE 5

Representative embodiments of barrier layers of the current invention.

| Layer No. | Barrier Layer 1 Composition | Barrier Layer 2 Composition | Barrier Layer 3 Composition |
|---|---|---|---|
| 1 | Heat seal | Heat seal | Heat seal |
| 2 | Board | Board | Board |
| 3 | Nylon | Nylon | Nylon |
| 4 | EVOH | EVOH | EVOH |
| 5 | Nylon | Nylon | Tie layer |
| 6 | Tie layer | Tie layer | Polyolefin-CD + polyolefin bulk layer |
| 7 | Polyolefin-CD heat seal layer | Bulk polyolefin | Polyolefin-CD heat seal layer |
| 8 | — | Polyolefin-CD heat seal layer | — |

Table 5 refers to polymers modified by grafting alpha, beta or gamma cyclodextrin on the backbone of the polymer. The resulting materials have been shown to be very effective at low concentrations in changing partition coefficients of the surface of polymers and can thus reduce essential oil and vitamin C scalping from foods with which they are in contact. Barrier layers other than the Nylon/EVOH/Nylon sandwich are possible and would benefit from the grafted cyclodextrin of the invention as well. Other optional layers, such as a tie food component(s) of concern. For certain foods and polyolefin-CD package structure incorporation, there can also be accomplished improved absorption of certain food degradation products in either a surface or a bulk layer.

In some embodiments of the disclosure, a blend of polyolefin-CD polymer with EVOH for some foods may also improve the barrier of EVOH for flavors and can improve EVOH's barrier at elevated relative humidity. In other embodiments of the disclosure, layer combinations are contemplated that exploit the performance enhancements of polyolefin-CD materials for scalping reduction, moisture barrier enhancement, and capturing fugitive degradation products of the food, while also permitting the isolation of typical barrier materials from the food contact surface.

The polyolefin-CD materials of the disclosure alone or in combination with other polymers provide other advantages or opportunities, for example, they process well on conventional hardware, permit burying of an EVOH layer between two layers of Nylon thereby protecting the EVOH from moisture and thus maintaining its high oxygen barrier properties, protect the EVOH layer sufficiently well to permit elimination of a layer of protective nylon, thereby reducing cost and structure complexity, permit a thicker heat seal layer on the inside of a structure to improve sealing of the package, and like advantages, or combinations thereof. Since channel leaks and other defects in sealing can be attributed to too thin a heat seal layer, a broader operating window results from the use of a thicker inside heat seal layer. The scalping of essential oils and nutrients by, for example, packaging closures can be minimized by making a food contact layer that incorporates a polyolefin-CD modified polymer. In some embodiments, known packaging structure performance can also be improved by incorporating a polyolefin-CD modified polymer of the disclosure into the packaging structure. Additionally, in some embodiments, known packaging structures heretofore deemed unacceptable for certain applications due to unacceptable performance can be improved and rendered acceptable by incorporating a polyolefin-CD modified polymer of the disclosure into the packaging structure.

Packaging laminates have been used for many years for packaging food products. A widely known and used container is a paperboard-based structure, which is coated with various barrier and sealant materials. The contact layer for the food package of the disclosure is heat sealable, thus providing a useful barrier structure for converting a stock material into cartons and similar food retaining packages which require heat sealing. The barrier structure of the disclosure is particularly useful in packaging orange juice and similar citrus products. Anhydride-functionalized polymers modified with cyclodextrin lead to the improved interfacial interaction of conventional polyolefin polymers such as changing partition coefficients, polymer solubility coefficients due to hydrophobicity, greater crystallinity, and providing a selective scavenging function.

As the plastics industry has matured, it has developed numerous specialty packaging applications. A large number of single and multi-layer structures are available to store liquid or solid, food or non-food products. There continues to be a need for high performance, value-added packaging that is capable of maintaining or improving a specific internal package environment to assure improved quality, safety, and shelf-life, while also achieving this objective from progressively thinner films. Current low oxygen-barrier packaging methods do not eliminate all the deteriorative chemical reactions produced by the stored foods or the packaging, so undesirable chemical by-products such as odor and taste taints continue to be produced in trace amounts, and these are effectively retained in the headspace of the package and the product thereby reducing product flavor quality and shelf-life. When the ratio (proportion) or the total concentration of these compounds gets too high, they can contribute to food off-flavor.

Low and intermediate moisture level foods comprise a large part of the shelf-stable foods such as cereals, crackers, cookies, salted snacks, etc. They contain fat, protein, and starches, and are subject to many deteriorative chemical reactions. The most important chemical changes are associated with hydrolytic reactions, enzymatic action, oxidative reactions, particularly lipid oxidation that alters the flavor of many lipid containing foods, and non-enzymatic browning. The chemical compounds produced from these reactions vary widely in their chemical and physical properties. They also vary in their impact on flavor. Some produce offensive odors and flavors, often causing major problems in the storage of foods.

In breakfast cereal, for example, accelerated shelf life studies using elevated temperature and low humidity produce a number of deteriorative chemical compounds. Cyclodextrins can minimize the headspace accumulation of volatile chemical family compounds (i.e., aromatics, alkanes, alkenes and ketones) by entrapping such compounds in the central pore of the CD ring. CD is also capable of entrapping aldehydes which cannot be removed by traditional antioxidants or oxygen and aldehyde scavengers. CD can trap hydroperoxides and other compounds that are produced by oxidation of the packaging sealant polymer during extrusion and are known to be detrimental to flavor quality. Further, grafted polyolefin-CD and blends thereof can selectively partition specific unwanted off-flavor compounds from the headspace surrounding the stored food into the sealant polymer layer without significantly affecting preferred desirable flavors and thereby simultaneously preventing flavor contamination and flavor fade. The CD pore is an effective trap for a broad spectrum of undesirable odors known to cause flavor defects in packaged foods.

A large proportion of fresh fruits, vegetables, and cut flowers harvested are lost due to spoilage resulting from increased levels of ethylene gas in the package headspace. One of the ways to retard the ripening of fruits, vegetables, and fresh flowers is to reduce the ethylene gas present in the headspace. The ethylene absorbing capacity of a LDPE film can be improved by having a thin contact inner layer with a functionalized LDPE grafted to cyclodextrin. Cyclodextrin grafted polymers can be used as the food contact layer in a multilayer structure to extend product shelf-life by reducing ethylene gas in the headspace surrounding the product and maintaining the appropriate humidity (generally greater than about 80% RH) so undesirable wilting and shriveling doesn't take place. If the produce is sealed in an impermeable film, headspace $O_2$ levels will fall to low levels where anaerobic respiration takes place forming undesirable odor and flavor compounds such as ethanol, acetaldehyde and organic acids. One advantage of grafting cyclodextrin onto the polyolefin is that a high concentration of CD can be used in the LDPE skin layer to improve the partitioning of ethylene gas and other organoleptic precursors from the headspace without degrading the intrinsic olefin barrier properties to moisture and gasses.

In another embodiment of the invention, a multilayer film can be used as a food packaging film, wherein one layer has CD grafted to a polymer incorporated as part or all of the layer. In these embodiments, coextrusion is one method whereby CD grafted to a polymer can be incorporated into one of two or more layers in a packaging film. Another method to provide such an embodiment is coating, wherein a packaging film is provided with a solvent borne or extrusion coated polymer. Some portion or all of the coated polymer can have CD grafted to it.

Where CD grafted polymers or copolymers are integrated into packaging for fresh produce such as fruits, vegetables, and flowers, it will be appreciated by one of skill in the art that the CD can be present on only a minor portion of the packaging and still be effective in scavenging ethylene or other noxious vapor phase materials. Large amounts of CD are not required in most applications, though a thin layer provided by coating or coextrusion can have a greater CD content in order to provide a sufficient concentration of CD to the package.

In yet another embodiment of the invention, CD grafted polymers of the invention can be provided as a web of nonwoven fibers, wherein a piece of web is simply added to a package that is then filled with fresh fruits, vegetables, or flowers. In such an embodiment, the packaging material used can be any suitable material and is not limited in any way. Commonly used packaging materials such as polyethylene, PLA or another polyester, and the like can be used without any limitation, as the CD grafted polymer of the invention is simply added to the finished packaging along with the fresh produce to be packaged. Since the grafted CD is present in a separate material, it can be added to any package where undesirable vapor phase materials are desirably scavenged.

In embodiments where CD grafted to a polymer is used to scavenge undesirable materials from foodstuffs, it will be recognized by one of skill in the art that an advantage of the current invention is that the CD containing layer may be a contact surface, wherein the CD groups are prevented from migrating from the layer by virtue of the covalent bond that comprises the grafting of CD to a polymer backbone. The CD is free to scavenge molecules but is itself anchored within the layer where it is deposited and cannot move within the layer, or out of that layer and either into other layers or into a foodstuff or other material placed inside a barrier construction for the purpose of benefiting from the barrier properties of the barrier layer.

Beverage sealing elements and plastic screw cap closure shells are another type of container that can benefit from incorporation of CD-grafted polymer. Such elements generally contain one or more of the following thermoplastic materials: low density polyethylene and linear low density polyethylene (LDPE and LLDPE), high density polyethylene (HDPE), polypropylene (PP), ethylene vinyl acetate (EVA), polyvinylchloride (PVC), and polyvinylidene chloride (PVDC). High barrier liner materials are usually compounded compositions containing a thermoplastic (typically an olefin) and dispersed into the thermoplastic are elastomeric materials (typically a butyl rubber, a styrene butadiene rubber or an acrylic rubber) forming a thermoplastic elastomer material composition. These thermoplastic compositions are manufactured into shapes that allow them to function as a closure element, for example, for a standup pouch, jar or bottle of metal, glass or plastic, and like containers. Screw cap plastic closure shells used to seal carbonated soft drinks, carbonated waters, etc., contain a two-component system comprising a PP screw cap shell and a monolayer liner usually produced from LDPE and EVA to provide a positive seal. Closure shells for non-carbonated beverages (e.g., still water) are manufactured from PP as a single piece functioning both as a screw cap and liner. Closure shells and liner compositions contain a number of additional performance additives—lubricants, antistats, plasticizers, heat stabilizers, antioxidants and pigments. One additive in particular, a common polymer lubricant called erucamide, improves the melt flow properties and reduces the adherence of the liner and shell to the bottle by decreasing release torque. Additives which function at the surface of the polymer are traditionally migratory and migration occurs over time. The surface of the polymeric shells and liners of the container can become sources of chemical precursors susceptible to ozonolysis from residual ozone.

Ozonation is commonly used worldwide for disinfecting drinking water stored in bottles. Residual ozone, typically ppb levels, remains in the water after bottling. Ozone reacts with unsaturated compounds forming unstable organic ozonides, which decompose rapidly into oxygen compounds, such as aldehydes, ketones, and peroxides, or react rapidly with oxidizing or reducing agents. The unsaturated chemical bonds in erucamide and oleamides, which migrates to the surface of the closure polymer and to a lesser extent unsaturated olefin monomers and oligomers exposed on the surface, produce an organoleptic defect often described as a "plastic" taste. The plastic off-taste can be associated with the presence of part per billion (ppb) levels of low human threshold organoleptic compounds, particularly $C_{1-30}$ aldehydes such as hexanal, heptanal, octanal, nonanal and decanal. Residual organoleptic volatiles, which are produced either from chemical oxidation by ozone or through thermo-oxidation or photo-oxidation of the liner or closure, can be effectively complexed by dispersing a functionalized polyolefin/CD composition within the liner or closure composition preventing their migration into the beverage. The disclosure relates to container liner and shell compositions for retaining a foodstuff, beverage or pharmaceutical containing grafted cyclodextrin to reduce off-taste and odor organoleptic migrant and ingress permeants, thus maintaining or improving taste of the stored product.

Packaging Structures

Thermoplastics are highly versatile materials which can be processed into a wide variety of package and structure types. Principal manufacturing processes used in producing packaging materials include, for example, cast-film extrusion, blown-film extrusion (tubular), extrusion coating, extrusion lamination, adhesive laminations, oriented extruded films, blow molding, injection molding, and compression molding.

For packaging purposes, thermoplastics can usually be processed into one of the following structural categories.

1. Flexible Films.

These films are typically melt extruded through a straight or circular die and can have thickness of, for example, from about 4 micrometers (μm) to about 200 μm. The films may be extruded at much greater thickness, then stretched in one or two directions to a thin, uniform film. Post-extrusion stretching, uniaxial or biaxial, can also provide orientation of the molecular structure that can further enhance strength and barrier properties of the film. Processes for extrusion and laminating thermoplastic materials are described in U.S. Pat. Nos. 3,400,190; 3,440,686; 3,477,099; 3,479,425; 3,476,627; 3,524,795; 3,557,265; 3,583,032; and 3,365,750.

Many coextruded structures are made up of polyolefins such as polyethylene and polypropylene. These polyolefins are useful for dispersing polyolefin grafted cyclodextrin. Low density polyethylene (LDPE) and linear low density polyethylene (LLDPE) resins have been used extensively in coextruded structures for their toughness and sealability. High density polyethylene (HDPE) resins are selected for their moisture barrier, stiffness and machineability characteristics. Polypropylene (PP) is chosen for its ability, through orientation, to provide clear machineable films with high impact and stiffness properties.

Polyolefins can be combined with other resins to achieve multilayer functionality. Copolymers of ethylene-vinyl acetate (EVA), ethylene-acrylic acid (EAA), and ethylene-methacrylic acid (EMA) are regularly used as skin layers for their low-temperature sealing characteristics. Heat sealing layers made from cast polypropylene and some polypropylene copolymers can withstand retort sterilization conditions. When oxygen, aroma, or flavor protection is necessary, polymers such as polyvinylidene chloride (PVdC), nylon, and ethylene-vinyl alcohol (EVOH) for clarity are used. Illustrative high barrier prior art structures are described in U.S. Pat. Nos. 4,407,897; 5,106,562; 5,108,844; 5,190,711; and 5,236,642. Nylon and EVOH do not readily adhere to polyolefins, so an adhesive or tie layer is used between incompatible resins to hold the coextruded structure together. Other polymers such as polycarbonate or polyester may be used as skin layers to provide unusual thermal integrity for retort packaging, hot fill packaging or packaging able to withstand cooking temperatures for semi-cooked foods. Retort pouch structures may be made by various methods of adhering the layers to each other by adhesive lamination processes. Illustrative prior art is described in U.S. Pat. Nos. 4,190,477; 4,405,667; 4,407,873; 4,407,874; and 6,846,532. In some packaging applications, it is important that metal foil be excluded from the structure so that the package contents can be heated by microwave energy.

Figure 2:
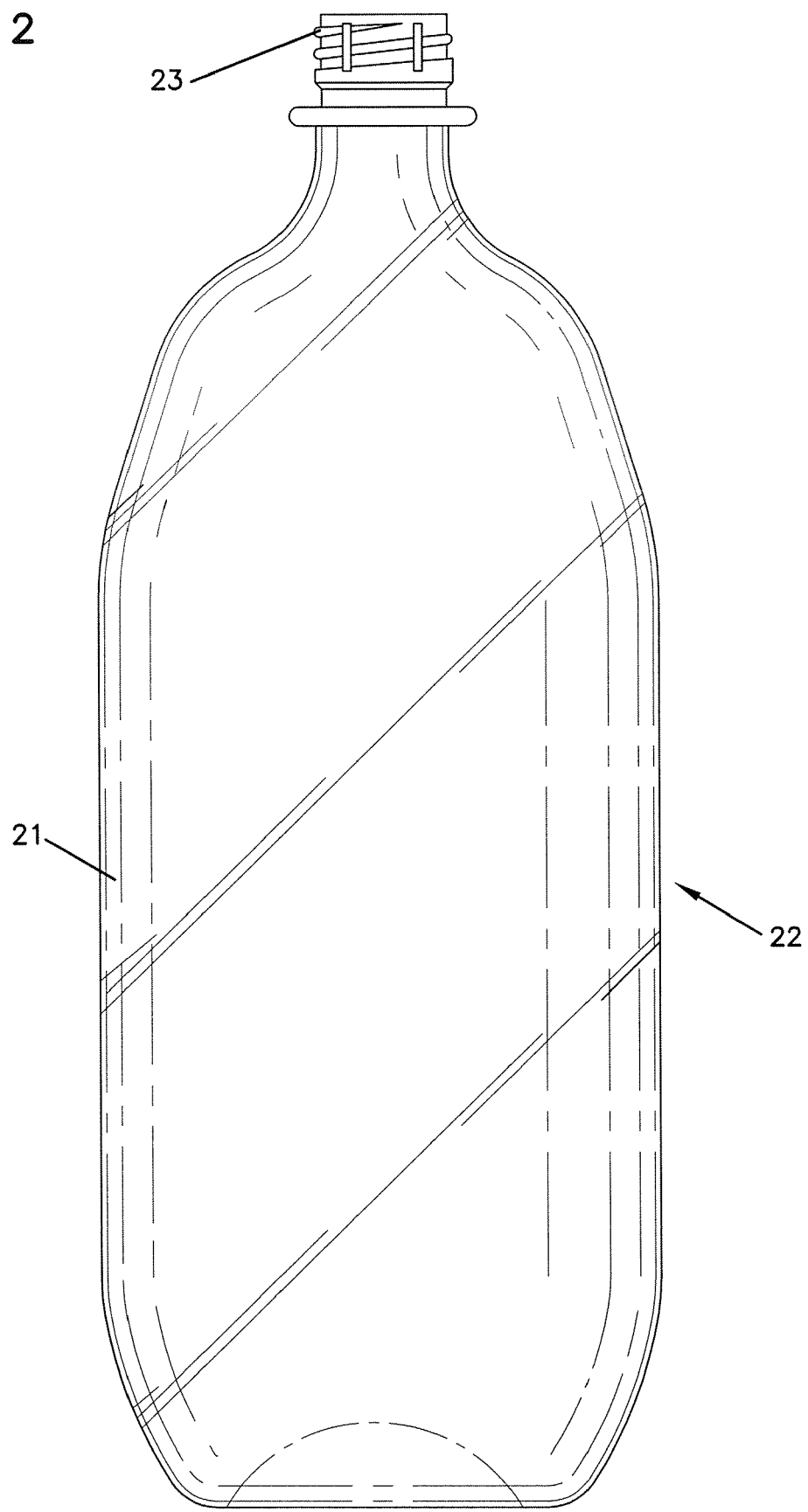
FIG. 2 is a drawing of an article of the invention made from a semi-rigid film.

One embodiment of a flexible film embodiment is a beverage bottle. Such a bottle is shown in FIG. 2. The grafted polyolefins of the invention may be disposed on inner surface 21 of bottle 20, on outer surface 22, only on or near the threaded closure portion 23, or dispersed substantially throughout bottle member 20.

2. Semi-Rigid Films.

These films are produced by straight die melt extrusion or calendaring. Multilayer structures can be, for example, a coextrusion or an adhesive lamination. Typical thermoforming grade films can have thickness of, for example, from about 200 microns to about 1 millimeter. The coextruded sheet structures may be high-barrier packages.

Polystyrene, polyester, polypropylene, and the polyethylenes are the predominant structural materials used in coextrusions for semi-rigid packaging applications. Known coextrusion structures for semi-rigid packaging is described in U.S. Pat. Nos. 3,479,425 and 3,557,265. Structural resin selection is dependent on use requirements, coextrusion processability, and container-forming considerations. Such films can be heat softened and vacuum formed into tubs, pots, blisters, trays and punnets.

3. Rigid Structures.

Rigid films can be made by, for example, extrusion, coextrusion, profile extrusion, injection molding, compression molding, reaction injection molding, injection blow molding, or any other thermal processes known in the art. Rigid structures typically have thicknesses greater than 1 millimeter, and may have thickness of up to 2.0 cm or even greater thicknesses. Bottles and jars, for example, can be blow molded, such as with a melt extruded tube or from a pre-(injection) molded parison. Many of these containers are of a monolayer structure as the large wall thickness provides for an adequate barrier. Where a high barrier is required, multilayer structure techniques can be used. A concept similar to semi-rigid films has been used to produce high barrier plastic bottles, except that the bottles are formed from coextruded multilayer tubes instead of flat sheet. Plastic closures for bottles and jars can be injection molded, although some closures and liners can be compression molded.

Included in the classification of rigid structures are monolithic structures such as I-beams, poles, planks, and the like. The shapes and thicknesses of such items are limited only by the capability of thermoplastic molding technology. Such structures may also be comprised of multiple layers e.g. by coextrusion, such that only part of the monolithic structure comprises a polyolefin-CD material. In other cases the entire structure can have polyolefin-CD dispersed throughout.

One such rigid structure is a storage unit, such as for storing food, clothing, soiled items, liquid formulations such as household solvents or flammable liquids, and the like. Such structures can be, for example, a diaper pail, a vegetable bin for a refrigerator, a reusable food container, a general storage bin, a garbage container, or a fuel tank.

Figure 4:
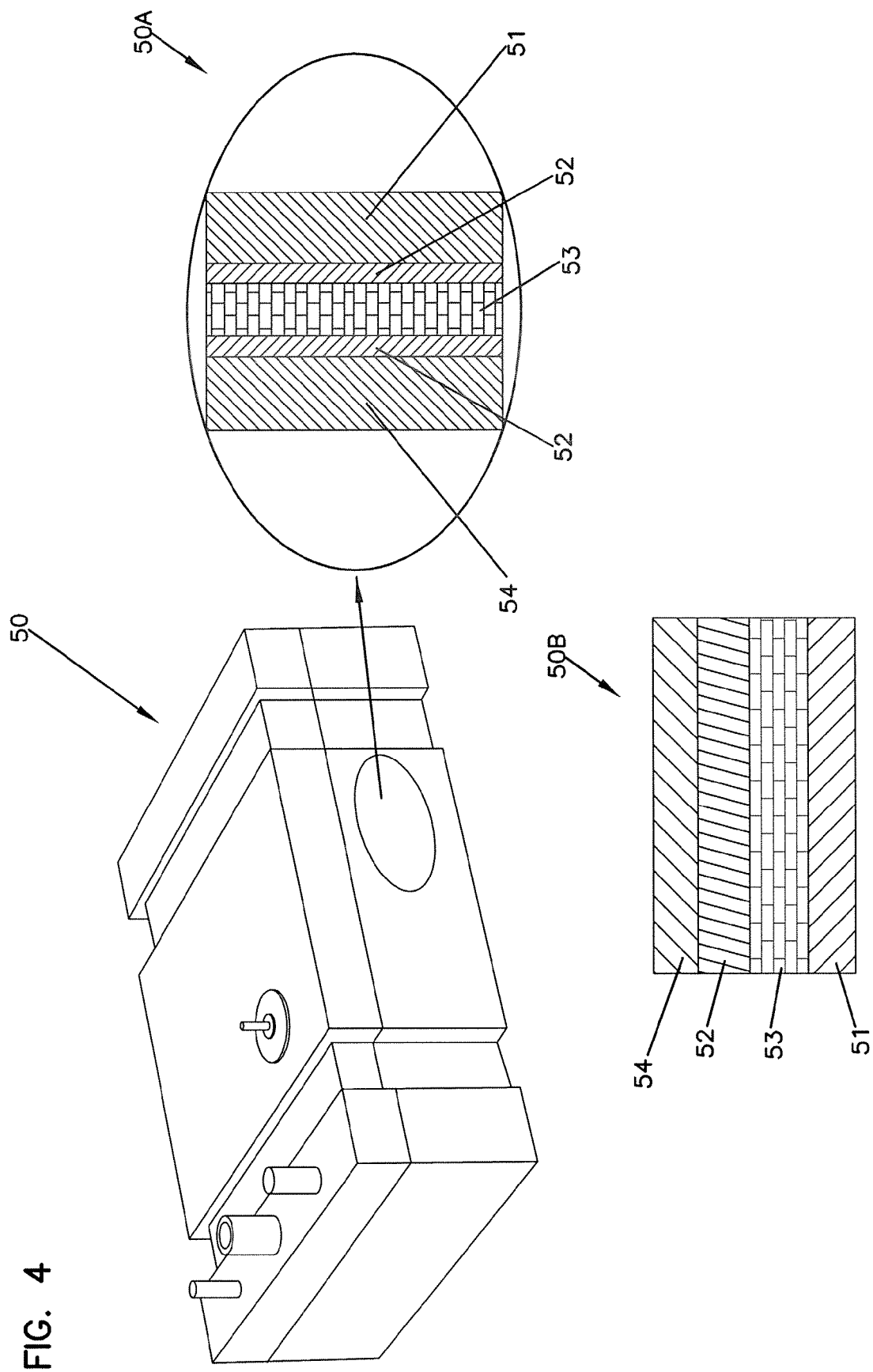
FIG. 4 shows a fuel tank having layered structure components in embodiments of the disclosure.

A fuel tank is a particularly useful rigid structure that can employ polyolefin-CD polymers of the present invention. The five-layer coextruded fuel tank is the de facto industry standard in North America. One embodiment of a fuel tank is shown in FIG. 4. Coextruded tanks are designed to meet strict evaporative fuel standards and consist of an inner layer of HDPE joined by a tie layer and barrier layer of polyimide (nylon) or ethylene-vinyl alcohol (EVOH) copolymer. The tie layer is an adhesive resin formed by the copolymerization or graft polymerization of HDPE with maleic acid, and has a functional group which adheres to a polyethylene chain polymer. An additional tie layer can be joined by a layer of "regrind" and an outer layer of HDPE. The use of the "regrind" layer adds an additional layer for a six-layer tank wall. In one embodiment of the invention, the polymers and articles of the disclosure can be used to substantially improve the barrier properties of commercial thermoplastic fuel tanks by adding a functionalized HDPE resin grafted with CD to the inner or optionally the outer HDPE layer composition of the fuel tank to, for example, reduce gasoline vapor permeation. An illustrative balanced four layered structure is shown in Table 6, where an asterisk (*) indicates a layer containing polymer grafted CD, in embodiments.

TABLE 6

Representative five-layer structure of a fuel tank of the present invention.

| Layer No. | Layer Composition |
|---|---|
| 1 | HDPE Layer (outside) |
| 2 | Tie layer |
| 3 | Barrier Resin Layer (Nylon, EVOH) |
| 4 | Adhesive Resin Layer |
| 5 | HDPE Layer* (inside - fuel contact) |

Thus, in embodiments the present disclosure provides an organic liquid and vapor impermeable vessel comprising a rigid structure having layers in the following order:

an outer polymer layer, such as a HDPE layer;

a tie layer, such as an maleic anhydride functionalized polyolefins, glycidyl methacrylate functionalized polyolefins, or ethylene vinyl acetate having maleic anhydride functionality;

a barrier resin layer, such as Nylon or EVOH;

an adhesive resin layer; and an inner polymer layer comprising a blend of a polyolefin and a modified polyolefin, the modified polyolefin having a polymethylene backbone having randomly covalently bonded groups comprising a cyclodextrin, the cyclodextrin being substantially free of a compound in its central pore, for example, a HDPE layer in admixture with a functionalized polymer resin grafted with CD, such as HDPE, having CD grafted through maleic anhydride residues.

FIG. 4 shows a multilayered fuel tank construction 50 commonly used in the industry. Schematic diagram of one embodiment of the multilayered construction, 50A, shows outside HDPE layer 51, adhesive resin layer 52, barrier resin layer 53, another adhesive layer 52, and an inside HDPE layer 54. A second embodiment of the multilayered construction, 50B, shows outside HDPE layer 51, adhesive resin layer 52, barrier resin layer 53, an inside HDPE layer 54. The barrier resin layer is most commonly ethylene-vinyl alcohol copolymer or nylon. In any of these layers, a grafted cyclodextrin composition of the invention may be incorporated. For example, one or both HDPE layers may be grafted with cyclodextrin. Alternatively, a barrier or adhesive layer can incorporate grafted cyclodextrin. Inclusion of the compositions of the invention are advantageous to prevent fuel fumes from breaching the tank and creating a flammability hazard.

4. Composite Materials

Multilayer plastic structures can be further extended with the inclusion of one or more plastic or nonplastic materials. Materials that can be combined with plastics to form composites can be, for example, thermoset resin, aluminum, paper, felt, paperboard, nonwovens and like materials. The combination of paper, paperboard, foil, and thermoplastic polymers, can provide, for example, a sealable high-barrier structure. Multilayer metalized packaging structures are described in U.S. Pat. Nos. 6,722,106; and 7,032,362.

Combining thermoplastics with paperboard can provide rigid structures, such as liquid tight cups, pots, and cartons. Common uses of such structures are, for example, yogurt containers, and milk and juice in cartons. In such applications, the reduced flavor scalping and other performance attributes of the grafted cyclodextrin technology provide new packaging options for high barrier packages, particularly when used for foods that are susceptible to flavor, odor and nutrient loss from migration through or absorption by the packaging materials themselves. Embodiments of the invention contemplating combinations with paperboard are described in the section above entitled "Food and Beverage Packaging."

Further, it is contemplated that containers employing paperboard can be assembled to provide superior moisture barrier properties. Such assemblies are shown in Table 7.

TABLE 7

Moisture barrier composite films for food cartons

| Layer No. | Moisture barrier layer embodiment 1 | Moisture barrier layer embodiment 2 |
|---|---|---|
| 1 | Heat seal | Heat seal |
| 2 | Board | Board |
| 3 | EVOH | Nylon |
| 4 | Tie layer | EVOH |
| 5 | Polyolefin-CD | Polyolefin-CD tie layer |
| 6 | Polyolefin-CD heat seal layer | Polyolefin-CD |
| 7 | — | Polyolefin-CD heat seal layer |

In a moisture barrier application, significant flexibility can be achieved with the use of different cyclodextrin grafted polymers in different layers. For example, HDPE optimized with grafted CD for improved moisture barrier in the bulk layer can be combined with a heat seal layer optimized with grafted CD to have a partition coefficient which reduces scalping of the particular food components of concern. For the right foods and grafted CD incorporation, this can also be accomplished with improved absorption of certain food degradation products in either a surface or bulk layer.

5. Multilayer Constructions

Multifunctional packaging resins can be combined into one manufacturing step using, for example, coextrusion technology. Multilayer structures are distinct coextruded layers of different polymers formed by a simultaneous extrusion of the polymers through a single die. Multilayer films produced by lamination or coextrusion can offer an enhancement of many or all performance properties compared to monolayer films. Typically, a multilayer plastic film can incorporate CD grafted polymers into one or more layers, depending on the desired functionality.

In some embodiments, CD grafted polymer is advantageously situated in the inner layer of a multilayer film. Heat sealable polyolefin layer where grafted CD interacts with the environment inside the sealed layer and maintains, adjusts, or improves the headspace atmosphere or by minimizing loss of volatiles from inside the package, e.g. food flavor loss to the package by scalping. In other embodiments, CD grafted polymers may be incorporated in an interior layer in a multilayer film, e.g. as the center layer of a three layer assembly. Here, the CD containing layer acts as a gas and organic vapor barrier layer where grafted CD provides substantial organic vapor barrier properties by trapping mobile permeants. In still other embodiments, CD grafted polymers may be situated on the outside layer of a multilayer film where it protects the barrier layer or is sandwiched within the structure. In these embodiments, grafted CD plays a role similar to the middle layer trapping migrant chemical precursors in the packaging surface originating from e.g. ozone sterilization or exposure to UV irradiation.

Coextruded multilayer structures can be divided into three categories: single-resin, unbalanced, and balanced. There can be, for example, multilayer films using only one polymer (AAA), unbalanced coextruded films with combinations of two or more polymers (ABC), and balanced multilayer structures with combinations of two or more polymers (A/B/C/B/A). Unbalanced structures typically combine a functional layer with a heat-seal resin. Balanced structures generally have the same heat-sealable resin on both the outside and inside surface of the film.

Single-resin films can be coextruded for a variety of reasons. Many commodity film applications may not appear to be multilayer films, yet they actually have three or more distinct layers. The use of multiple layers allows for e.g. using recycled material or minimal use of additives such as colorants, antibacterial compounds, and the like. Bakery, produce, and trash-bag films, for example, are often three-layer structures as shown in the second embodiment of Table 8.

TABLE 8

Embodiments of single-resin multilayer constructions of the current invention. Layers containing a grafted CD polymer are indicated with an asterisk (*).

| Layer No. | Single-resin multilayer embodiment 1 | Single-resin multilayer embodiment 2 |
|---|---|---|
| 1 | Virgin PE/PP + Recycled PE/PP Resin Layer* | Virgin PE/PP Resin Layer* |
| 2 | Virgin Resin Layer* | Virgin PE/PP + Recycled PE/PP + Pigment Layer* |
| 3 | — | Virgin Resin Layer* |

Examples of the unbalanced structures include films designed for vertical form/fill applications such as for breakfast cereals. A base resin such as HDPE can be augmented by an LDPE or EVA skin layer for sealability. Additional layers, such as nylon, EVOH, polyethylene terephthalate (PET), can be joined to the HDPE layer via a second adhesive/tie layer to add additional gas and organic vapor barrier properties. For horizontal wrappers, a polypropylene skin layer can be selected for its higher thermal resistance. In another unbalanced application, cast polypropylene (CPP), which has a limited sealing range, can be combined with more sealable polyethylene in, for example, single-slice cheese wrappers. As can be appreciated by one of skill in the art, multilayer films are not limited to a five layer structure. For example, films having a fewer or a greater number of layers than five can be included within the scope of the disclosure. An example of an article with greater than five layers, is a retort pouch having a heat sealing LDPE or PP layer and a second, third, and fourth layer of nylon, EVOH, and nylon, respectively. The entire multiple layer structure can be adhered together with, for example, adhesive/tie layers. Various embodiments of unbalanced multi-layered structures are shown in Table 9.

TABLE 9

Unbalanced multilayered embodiments of the current invention. An asterisk (*) indicates a layer contemplated to contain at least one grafted CD polymer of the disclosure.

| Layer No. | Unbalanced multilayer embodiment 1 | Unbalanced multilayer embodiment 2 | Unbalanced multilayer embodiment 3 |
|---|---|---|---|
| 1 | HDPE Layer | PET Layer | PET Layer |
| 2 | Adhesive/Tie Layer | Adhesive/Tie Layer | Adhesive/Tie Layer |
| 3 | Nylon or EVOH Layer | Aluminum Layer | Aluminum Layer |
| 4 | Adhesive/Tie Layer | Adhesive/Tie Layer | Adhesive/Tie Layer |
| 5 | LDPE Layer* | Nylon Layer | PP Layer* |
| 6 | — | Adhesive/Tie Layer | LLDPE Layer* |
| 7 | — | LLDPE Layer* | — |

| Layer No. | Unbalanced multilayer embodiment 4 | Unbalanced multilayer embodiment 5 | Unbalanced multilayer embodiment 6 |
|---|---|---|---|
| 1 | PET Layer | PET Layer | CPP Layer |
| 2 | Adhesive/Tie Layer | Adhesive/Tie Layer | Adhesive/Tie Layer |
| 3 | Nylon Layer | CPP* | LDPE Layer* |
| 4 | Adhesive/Tie Layer | | |
| 5 | CPP Layer* | | |

In contrast, a balanced coextruded structure can have, for example, a core resin selected for its functionality plus two skin layer resins that are heat-sealable. Vertical form, fill, and seal packaging for the snack food industry can typically comprise an oriented polypropylene (OPP), a polyethylene extrusion, and a reverse print graphics layer which can be viewed through a transparent outer OPP layer. Variations can include, for example, polyethylene terphthalate (PET) in place of OPP and additionally metalized OPP and PET on the inside layer or an interior EVOH oxygen barrier and outer layers of moisture barrier polymers such as polyethylene, polypropylene, and like polymers, or mixtures thereof. Heavy-wall bags are regularly coextruded with LLDPE cores for (impact strength) and LDPE skins (to limit the film's elongation under load). Meats can be packaged, for example, in PVdC shrink film with EVA skins for seal integrity. Illustrative balanced structures are shown in Table 10.

TABLE 10

Representative balanced multilayered structures of the current invention. An asterisk (*) indicates in embodiments contemplated to contain a layer of at least one polymer grafted CD.

| Layer No. | Balanced multilayer embodiment 1 | Balanced multilayer embodiment 2 |
|---|---|---|
| 1 | OPP Layer with graphics* | Virgin PE/PP Resin Layer |
| 2 | Adhesive/Tie Layer | Virgin PE/PP + Recycled PE/PP + Pigment Layer* |
| 3 | PE Layer | Virgin Resin Layer* |
| 4 | Adhesive/Tie Layer | — |
| 5 | OPP Layer* | — |

Breathable Films and Nonwoven Structures

The "breathability" range of a hygiene or healthcare material refers to its ability to allow water vapor to pass outward, from a body covered by or inside the material and through the material (breathable), while simultaneously preventing the penetration of moisture from the inside or from the outside of the material (i.e., waterproof). In embodiments, breathability can be an important property in the selection, design, and functional performance of articles of the disclosure. Table 11 lists representative or typical breathability values.

TABLE 11

Moisture vapor transmission rates for typical breathable films.
Breathability

| Moisture Vapor Transmission Rate | grams/m$^2$/day |
|---|---|
| Low | <3,000 |
| Medium | 3,000-7,000 |
| High | >7,000 |

1. Backsheet Hygiene Applications.

In some embodiments of the present invention, a baby diaper backsheet (i.e. the portion of the product near or at the outside of the product) may have, for example, low breathability for stand-alone use or for in-line lamination manufacture, whereas in other embodiments, a feminine hygiene backsheet may have, for example, medium or high breathability for stand-alone use.

In some embodiments of the present invention, the backsheet is positioned adjacent to the garment outer surface and the functional structure may include, for example, a breathable barrier, elastic waistband and side-panel systems and breathable cloth-like laminates for disposable baby diapers, adult incontinence devices and feminine hygiene pads, and panty liners. The backsheet in embodiments may comprise, for example, a woven or nonwoven material, a polymeric film such as thermoplastic films of polyethylene or polypropylene, composite materials such as a film-coated nonwoven material (e.g., having an inner film layer and an outer nonwoven layer), or combinations thereof. A suitable backsheet can be, for example, a polyethylene film having a thickness of, for example, from about 0.012 mm (0.5 mils) to about 0.051 mm (2.0 mils).

In other embodiments of the present invention, the backsheet is preferably impervious to liquids, especially bodily fluids, and is preferably manufactured from a thin plastic film. The backsheet of the article or garment, in embodiments, preferably conforms to the general shape and contours of, for example, a human body and prevents fluids absorbed and contained in the absorbent core from wetting another article which contacts the absorbent article, such as bed sheets, pants, pajamas and undergarments. If desired, the backsheet can be, in embodiments, embossed, matte-finished, or both to provide a more cloth-like appearance and texture. Further, such finishes can permit vapors to escape from the absorbent core (i.e., the backsheet is breathable) while still preventing fluids from passing through the backsheet.

2. Topsheet Hygiene Applications.

In some embodiments of the present invention, a topsheet (i.e. the portion of the product near to the wearer) is preferably liquid pervious. For example, a diaper or a feminine hygiene topsheet is preferably liquid pervious. In some embodiments of the present invention, the topsheet is preferably compliant, soft feeling, and non-irritating to the wearer's skin. The topsheet can be elastically stretchable, for example, in one or two directions. The topsheet may be preferably liquid pervious, permitting liquids to readily penetrate through its thickness. A topsheet can be manufactured from any suitable material, such as woven and nonwoven materials, apertured or hydroformed thermoplastic films, porous foams, reticulated thermoplastic films, thermoplastic scrims, or combinations thereof. Nonwoven materials may comprise, for example, natural fibers such as wood or cotton fibers, synthetic fibers such as polyester, polypropylene, or polyethylene fibers, or combinations thereof. If the topsheet includes fibers, the fibers can be, for example, spunbond, carded, air-laid, wet-laid, meltblown, hydroentangled, or processed by any suitable method.

Absorbent Articles

"Absorbent article" includes disposable diapers, training pants, absorbent underpants, adult incontinence products, feminine hygiene products including sanitary tampons, pads and napkins, absorbent food pads, wipes, tissues, bandages, dressings, surgical sponges, surgical gowns and drapes, mattress and pillow covers, bed pads, industrial work wear, animal bedding, cage liners, and like articles. Absorbent articles for human or animal use of the present disclosure can include, for example, an incontinent under garment such as an adult diaper, a sanitary napkin, a wipe sheet, a tissue sheet, absorbent underpants, training pants, an absorbent wipe, a tissue, an underarm shield, and like absorbent articles, or combinations thereof. In embodiments, depending upon the application, the absorbent article can absorb, for example, bodily fluids or excretions and odors there from, in any of various absorbable forms. Such forms include sprays, coatings, suspensions, dispersions, spills, leaks, and like absorbable targets. The absorbent articles can be used in human or animal care applications including, for example, sterile medical articles or processes, such as medical treatment including healing or disease prevention.

The absorbent articles of the disclosure in embodiments are generally made up of, for example, at least three components: a body facing layer; an absorbent layer; and a backsheet layer. Depending on the use and degree of sophistication of the absorbent article they can also contain, for example, a fastening or closure system, such as a loop-like fastening system with landing zones for barb or mushroom-like closure devices, or alternatively can be permanently or optionally temporarily prefastened into three dimensional body fitting shapes (e.g., with elastic side panels or other means of providing elasticity to enable pulling the absorbent article onto one's body). The articles can have, for example, cloth-like or reinforcing backsheets, breathable or nonbreathable backsheets, elastic or elasticated body facing and backsheet layers, leg and waist openings, elastic leg and waist openings, containment flaps inside of leg and waist openings, wrap material to contain absorbent material, acquisition layers for liquids, acquisition layers for solids containing viscous liquids, dampness inhibiting layer between the absorbent and the breathable backsheet, and like structural features.

Some portions of these features are further described in numerous patents, for example, Blaney et al., U.S. Pat. Nos. 6,177,607 and 6,663,611; Li et al., U.S. Pat. No. 6,608,237; McCormack, et al., U.S. Pat. No. 6,583,331; Bishop, et al., U.S. Pat. No. 5,486,166; Pesce, et al., U.S. Pat. No. 6,972, 010; Porsö, et al., U.S. Pat. No. 6,974,890; and Cree, et al., U.S. Pat. No. 6,720,279; the entire contents of the aforesaid references are incorporated herein by reference.

Thermoplastic polyolefins are known to be used as components of absorbent articles as described above and as shown in FIGS. 5-8. Where they are employed, polyolefin grafted cyclodextrin of the disclosure can be used to replace all or a portion of the polyolefin currently used with an effective amount of the polyolefin grafted cyclodextrin to scavenge undesirable odor-causing chemicals. By an effective amount it is meant, for example, that at least 10% of trained odor-sensing test subjects will notice a reduction in the odor emanating from the absorbent article or component of the absorbent article when compared to an article free of the polyolefin grafted with cyclodextrin, or at least 30%, or at least 50%, or even at least 70% of the trained test subjects. As more of the components of the absorbent article have a portion of the polyolefin replaced with polyolefin grafted cyclodextrin of this disclosure the malodors emanating from the absorbent article will be more effectively reduced.

For example, a cloth-like or reinforcing backsheet layer can be generally made up, for example, of polypropylene spunbond nonwoven produced in a manner known to those skilled in the art. By replacing a portion of the normal polypropylene polymer used in the spunbond process with an effective amount of the polypropylene grafted cyclodextrin of the disclosure, effective reduction of odors emanating from the absorbent article can be achieved. Alternatively, instead of polypropylene, the nonwoven can comprise copolymers of ethylene and α-octene, methyl acrylate, or ethyl acrylate. Alternatively, the cloth-like backsheet layer can be created with, for example, flocking techniques known to those skilled in the art or through the use of other fabrics or filamentatious webs. Any porous film, fiber, filament, or fabric containing thermoplastic polyolefins used for this purpose can have, for example, a portion of that material replaced with an effective amount of polyolefin grafted cyclodextrin of the disclosure.

Figure 5:
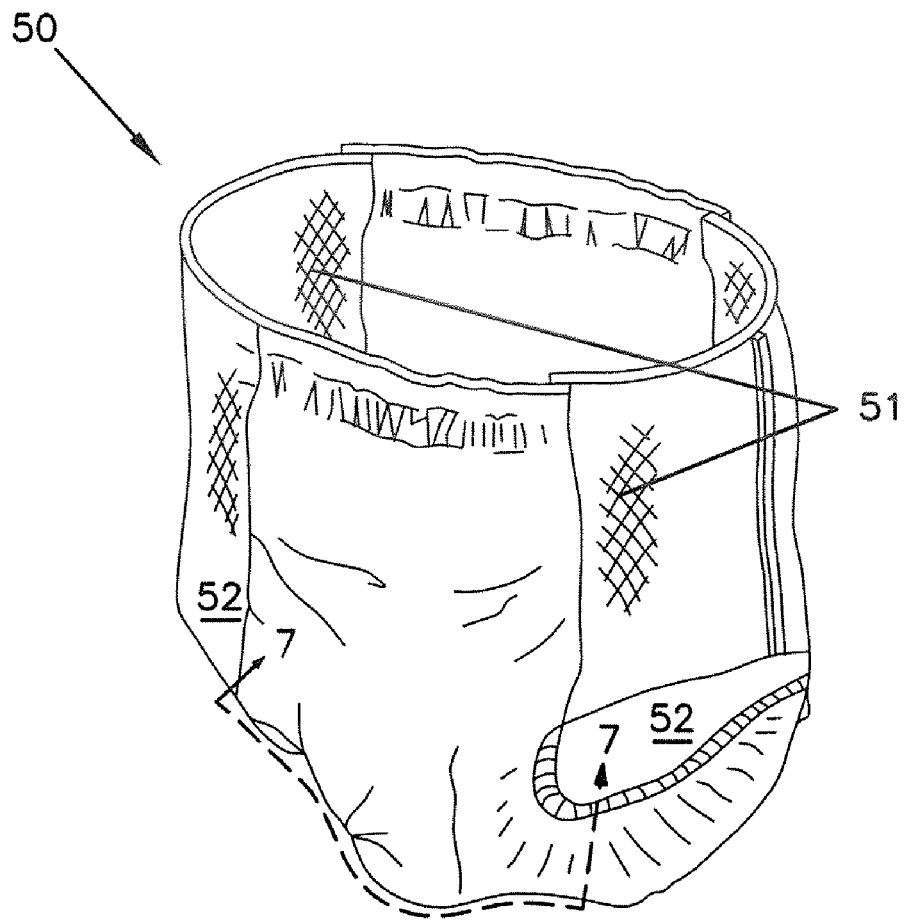
FIG. 5 shows a perspective view of an absorbent article in embodiments of the disclosure.

Referring to the figures, FIG. 5 shows a perspective view of an absorbent article 5, such as a pant or diaper, having elastic side panels 51.

Figure 6:
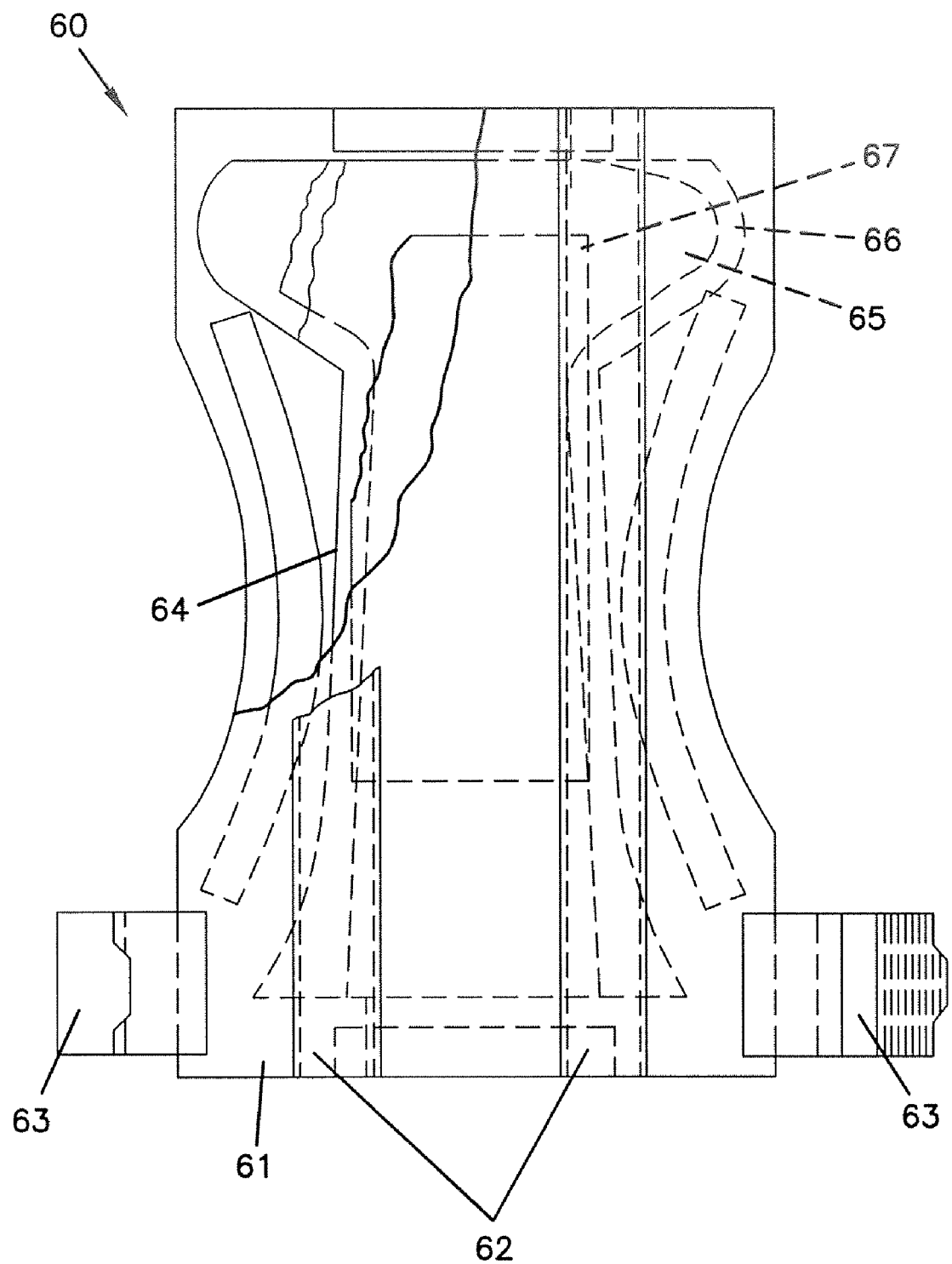
FIG. 6 shows a cross-section view of the absorbent article of FIG. 5 having layered structure components in embodiments of the disclosure.

FIG. 6 shows a cut-away plan view of a flattened absorbent article 60 shown in FIG. 5, having layered structure and components, including body facing layer 61, containment flap(s) 62, fastener tab(s) 63, dampness inhibitor under-absorbent layer 64, absorbent 65, absorbent wrap 66, and acquisition or surge management layer 67. Any of the components shown in FIG. 6 can comprise the grafted polyolefins of the present invention.

Figure 7:
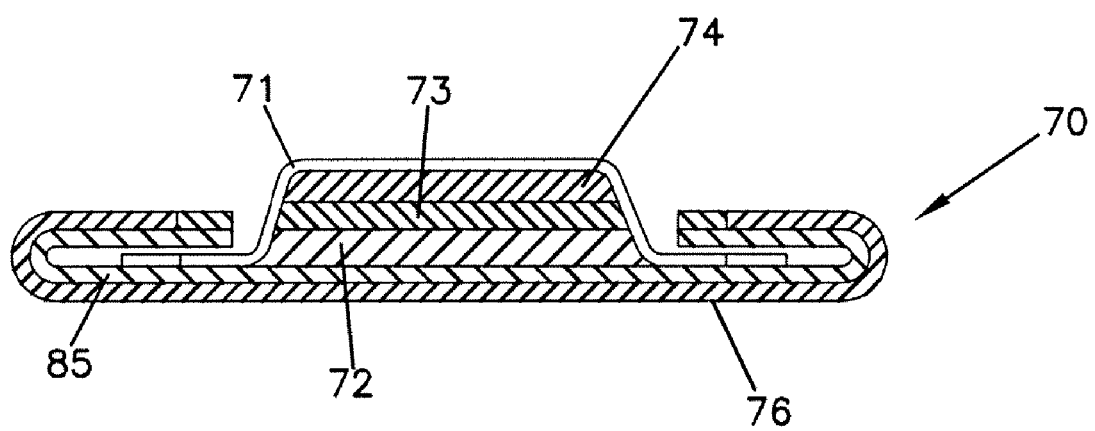
FIG. 7 shows a flattened plan view of the absorbent article of FIG. 5 having layered structure components in embodiments of the disclosure.

FIG. 7 shows a cross-section view 70 of the absorbent article of FIG. 5 at section 52 having layered structure components, including body facing layer 71, dampness inhibitor under-absorbent layer 72, absorbent layer 73, acquisition or surge management layer 74, breathable backsheet film 75, and a reinforcing cloth-like backsheet 76. Any of the components shown in FIG. 7 can comprise the grafted polyolefins of the present invention.

Figure 8:
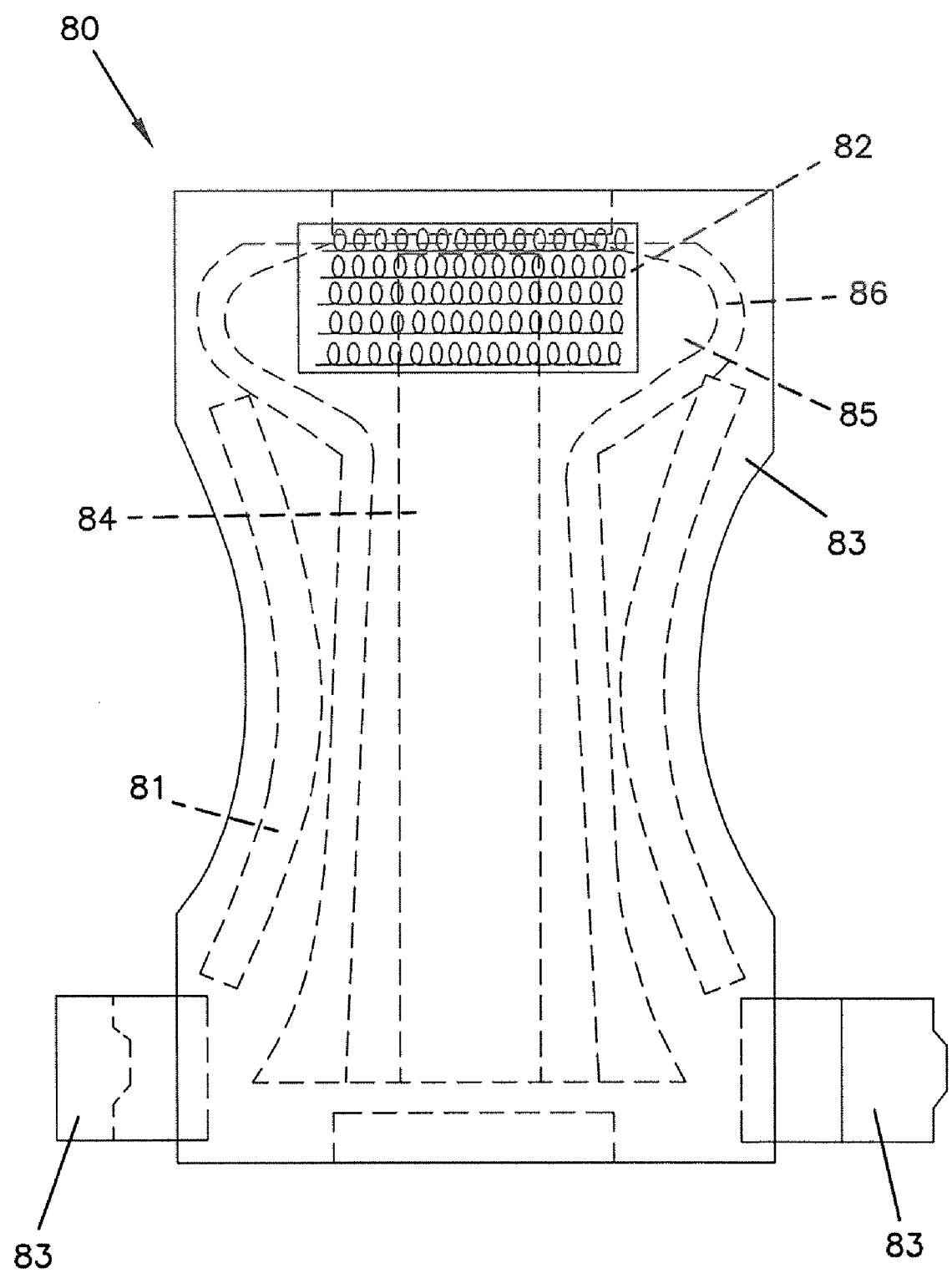
FIG. 8 shows a flattened view of the absorbent article of FIG. 5 showing features of the inner surface of the article.

FIG. 8 shows a plan view of a flattened absorbent article 80 as shown in FIG. 6 having layered structure components, including fastener tab(s) 63, dampness inhibitor layer 64, for example positioned between a backsheet and an absorbent wrap, absorbent 65, absorbent wrap 66, leg-opening elastic member(s) 81, loop- or like fastening system landing zone 82, and a reinforcing cloth-like backsheet 83. Any of the components shown in FIG. 8 can comprise the grafted polyolefin compositions of the present invention.

Breathable Monoliths

The "breathability" range of a hygiene or healthcare material refers to its ability to allow water vapor to pass outward, from the body through the material (breathable), while simultaneously preventing the penetration of moisture from the inside or from the outside of the material (waterproof). A baby diaper backsheet has a breathability of less than about 3,000 grams moisture/m$^2$/day, while a feminine hygiene backsheet has a breathability range from about 3,000 to more than about 7,000 grams moisture/m$^2$/day.

The breathable backsheet layer is generally either a monolithic porous polymer film or membrane or a microporous filled film. In the monolithic film, passages with cross-sectional sizes on a molecular scale formed by a polymerization process serve as conduits by which water (or other liquid) molecules can disseminate through the film. Vapor transmission occurs through a monolithic film as a result of a concentration gradient across the monolithic film. This process is referred to as activated diffusion. As water (or other liquid) evaporates on the body side of the film it collides with the film surface increasing concentration, in some cases condensing water vapor on the film, followed by sorption into the polymer on the surface of the body side of the film. The water molecules then diffuse through the monolithic film and desorb from the polymer into the air on the side having a lower water vapor concentration, completing the process. The process occurs to eliminate an existing water vapor concentration difference between the body side of the film and the outside of the film. This same process occurs simultaneously with malodor molecules. Use of this type film is described in Freiburger, et al., U.S. Statutory Invention Registration No. H2,011.

A portion or all of the polyolefin used in this type breathable material can be replaced with an effective amount of polyolefin grafted cyclodextrin which will capture an effective amount of malodor molecules passing through the breathable monolithic film thereby effectively reducing malodors emanating from the absorbent article.

Breathable Microporous Films

More popularly used breathable films are the more cost effective stretched microporous filled polyolefin films as described in "The Evolution of Microporous Film" by Leo Cancio, Rick Jezzi and P. C. Wu, *Nonwovens World*, October/November 2004, p. 65-70 and in Mackay, U.S. Pat. No. 6,264,864, Topolkaraev, et al., U.S. Pat. No. 6,348,258, and Mackay, et al., U.S. Pat. No. 6,953,510, the entire contents of the aforesaid references are incorporated herein by reference.

A portion or all of the polyolefin used in this type breathable material can be replaced with an effective amount of polyolefin grafted cyclodextrin to capture malodor molecules passing through the micropores thereby effectively reducing malodors emanating through the breathable film and/or from the absorbent article.

Elastic Breathable Backsheet

The above backsheet features can be combined with elasticity by, for example, the composite described in the above mentioned incorporated Cree, et al., U.S. Pat. No. 6,720,279, wherein the composite is formed by laminating an air and fluid impermeable elastic core layer between two layers of consolidated spunbond nonwovens, which layers are then point bonded or welded together forming thin inelastic membranes at each of the weld points. The weld membranes rupture when the composite is pre-stretched to create apertures making the composite permeable. In embodiments, all or a portion of the polyolefin used in the spunbond or other nonwoven web can be replaced with an effective amount of polyolefin grafted cyclodextrin of the disclosure, which can capture an effective amount of malodor emanating from the elastic breathable composite. In embodiments, the breathability feature can be bypassed and a nonbreathable elastic composite can be produced with an effective amount of polyolefin grafted cyclodextrin to capture malodors emanating from the elastic nonbreathable composite.

Elastic Side Panels

Many sophisticated absorbent articles employ a component that is an elastic porous material. Such components can and often do contain polyolefin polymers. For example, Van Gompel, et al., U.S. Pat. No. 4,940,464, describes elastic side panels and method of production. In some embodiments of the present invention, a porous elastomeric web in a stretched state is laminated to one or more nonwoven webs made using meltblown, spunbond, bonded carded web, or like methods. When the stretched laminate is relaxed, a stretchable nonwoven suitable for elastic panels in absorbent articles results. The polyolefin used in such materials of the prior art is replaced by an effective amount of polyolefin grafted cyclodextrin of the disclosure which can capture an effective amount of malodor emanating through the component or from the article containing the component.

Absorbent Materials

"Absorbent material" refers to any materials having fluid absorption properties. Although the absorbent layer or layers in many absorbent articles may only contain absorbent fibers such as rayon, cotton, or cellulose fluff fiber, others may contain superabsorbent polymer particles composed of, for example, crosslinked sodium polyacrylate. More sophisticated absorbent layers can also contain fibers, filaments or like materials comprising polyolefin. Abuto, U.S. Pat. No. 6,765,125, discloses a process wherein at least one meltblown diehead forming a polyolefin filament web is arranged near a chute through which other materials are added to the web while it is forming. Other materials can be, for example, pulp, superabsorbent particles or other like particles, a natural polymer, for example, rayon or cotton fibers, a synthetic polymer, or combinations thereof, for example, polypropylene or polyester fibers, which fibers may be of staple length. These processes and materials are further described in Lau, U.S. Pat. No. 4,818,464, and Anderson, et al., U.S. Pat. No. 4,100,324.

In other absorbent layers, bicomponent fibers of, for example, a polyethylene sheath and a polyester, or polypropylene core can be used to thermally bond, for example, fluff fiber and superabsorbent particles together as practiced in, for example, Erspamer, et al., U.S. Pat. No. 6,559,081 and Chimeilski, U.S. Pat. No. 6,632,209. It is anticipated in various embodiments of the invention that all the above polyolefin containing fiber can have the polyolefin replaced with an effective amount of polyolefin grafted cyclodextrin which will capture an effective amount of malodor emanating from the absorbent layer(s).

A particular advantageous way of incorporating the polyolefin grafted cyclodextrin is to only use it in the sheath or outer component of bicomponent fibers or filaments. For example, in the above cloth-like or reinforcing backsheet layer less quantity of the polyolefin grafted cyclodextrin will be required to be effective since more of the cyclodextrin will be on or very near the surface of the fibers or filaments used. This material can be produced as described for example in Bansal, et al., U.S. Pat. No. 7,008,207 and Newkirk, et al., U.S. Pat. No. 6,420,285. The entire contents of the aforesaid references are incorporated herein by reference.

Absorbent Wrap

To help contain, provide more integrity, or both to the material making up the absorbent layer, a low basis weight wrap or partial wrap material can be used. For example, Li, et al., U.S. Pat. No. 6,608,237, discloses a complete wrap sheet, or at least the body side layer of the wrap sheet that may comprise a meltblown web composed of meltblown fibers, such as meltblown polypropylene fibers. In some embodiments of the invention, a portion of the polyolefin used to meltblow the filaments can be replaced with an effective amount of polyolefin grafted cyclodextrin which will capture an effective amount of malodor emanating from or through the wrap.

Dampness Inhibitor

Another component which can be used in absorbent articles or like articles of the disclosure is a dampness inhibitor as described in, for example, Blaney et al., U.S. Pat. Nos.

6,177,607 and 6,663,61; and McCormack et al., U.S. Pat. No. 6,583,331 (previously incorporated by reference in their entirety). One aspect of the dampness inhibitor is an inner nonwoven filament layer located between the absorbent core layer(s) and the breathable outer cover. This can further be refined by having an additional permeable inner breathable layer located between the absorbent core and the outer breathable outer cover. These components generally contain mostly polyolefin polymer. In some embodiments of the present invention, the components of the prior art can be partially or totally replaced with an effective amount of polyolefin grafted cyclodextrin of the disclosure which can capture an effective amount of malodor emanating through the component or from the absorbent article containing the component.

Fasteners

Fastening or closure systems consisting of loop-like fastening system landing zones for barb or mushroom-like closure devices are generally referred to as hook and loop fasteners. Suitable loop materials can include, for example, woven, knitted, or nonwoven materials. Suitable nonwoven materials can be formed through a spunbond or meltblown process and the fibers of such nonwoven material are suitably formed from polymeric materials such as polyolefins, polyamides, polyesters, rayon, and like materials, and combinations thereof, as described in Roesler et al., U.S. Pat. No. 5,019,073 and Leak et al., U.S. Pat. No. 6,994,698. In some embodiments of the present invention, the polyolefin polymer employed in the prior art can be partially or totally replaced with an effective amount of polyolefin grafted cyclodextrin of the disclosure, which can capture an effective amount of malodor emanating through the component or from the absorbent article containing the component.

Acquisition or Surge Management Layers

Acquisition or surge management layers are sometimes used to enhance the intake of body fluids. These layers may be manufactured from a wide range of materials such as porous foams, reticulated foams, apertured plastic films, woven or nonwoven webs of natural fibers (e.g., wood or cotton fibers), synthetic fibers, for example, polyester or polypropylene fibers, or a combination of natural and synthetic fibers. Acquisition or surge management layers are described in, for example, Hanson et al., U.S. Pat. No. 5,509,915 and Tanaka et al., U.S. Pat. No. 7,056,310. In some embodiments of the present invention, the materials making up these components of the prior art containing polyolefin polymer can have a portion of the polyolefin replaced with an effective amount of polyolefin grafted cyclodextrin of the disclosure which can capture an effective amount of malodor emanating through the component or from the absorbent article containing the component.

Body Facing Layer

Body facing layers generally consist, for example, of nonwoven materials such as carded webs and spun-bonded meltblown webs but may also include woven or knitted webs, highly porous films or like structure, and may be elastic or inelastic. Body facing or body side layers are described in, for example, Uitenbroek, et al., U.S. Pat. No. 6,682,512. The fiber or filament components of these webs are often polyolefin based. In some embodiments of the present invention, a portion of the polyolefin as employed in the prior art can be replaced with an effective amount of polyolefin grafted cyclodextrin of the disclosure which can capture an effective amount of malodor emanating through the component or from the absorbent article containing the component.

Containment Flaps

Containment flaps are intended to help keep body fluids from running out of the absorbent article before the fluid can be absorbed by the absorbent. In embodiments, the containment flaps can be, for example, either aligned around the leg and/or the waist openings, but can also be used, for example, in absorbent bandages and like articles if desired. Containment flaps are, for example, described in Kielpikowski, U.S. Pat. No. 6,110,158. The containment flaps can be, for example, produced from porous or non porous material, may contain one or more elastic elements, and may be made from spunbond or meltblown, or composites of spunbond and meltblown or other fibrous webs. In some embodiments of the present invention, polyolefin material employed in the prior art to make containment flaps can be replaced with an effective amount of polyolefin grafted cyclodextrin of the disclosure which can capture an effective amount of malodor emanating through the component or from the absorbent article containing the component.

Absorbent Food Pads

Figure 3:
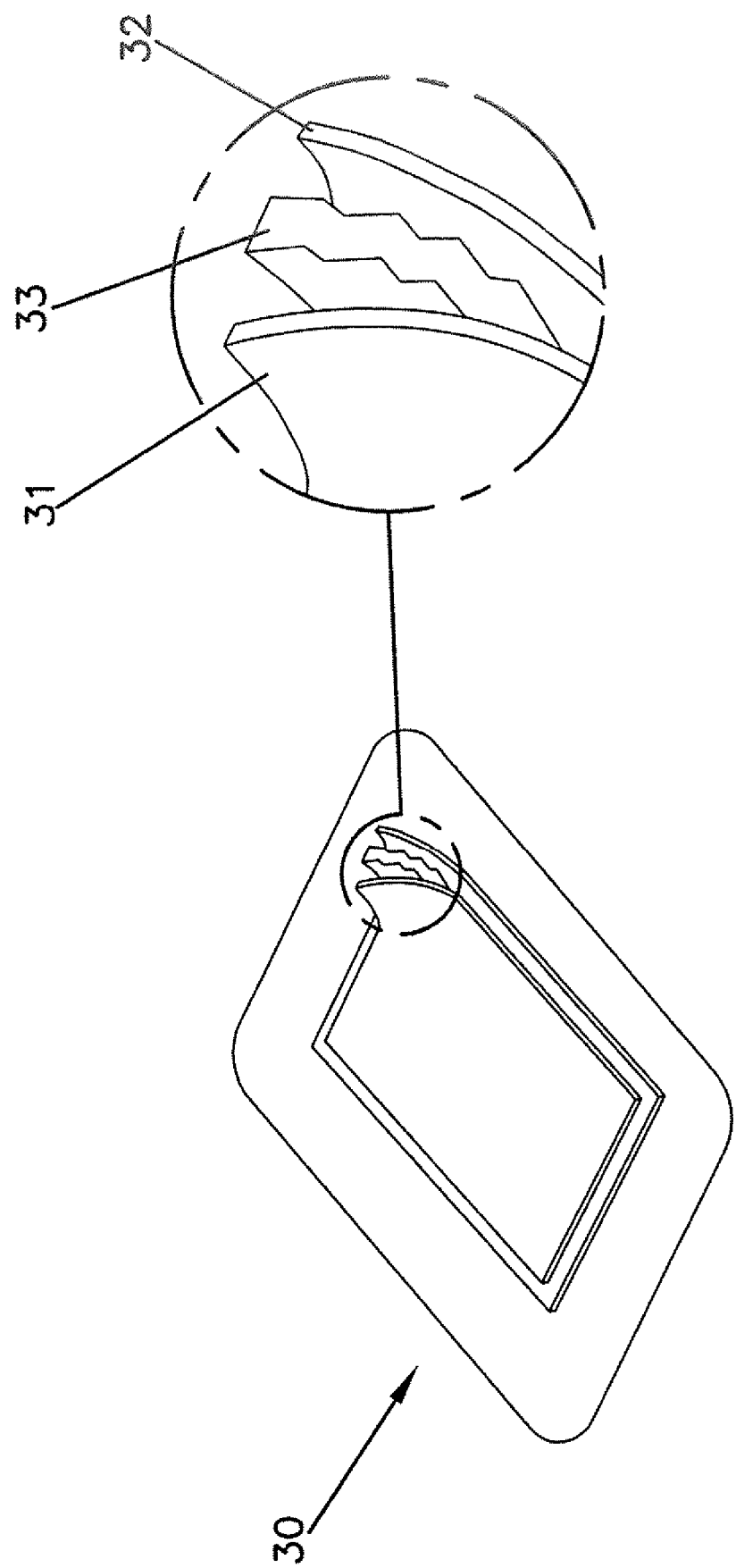
FIG. 3 shows a cut-away plan view of an absorbent article having layered structure and components in embodiments of the disclosure.

It is common for retail grocers to package meat and poultry or receive pre-packaged meat and poultry in a case-ready package ready to display. The case-ready package includes a sealed flat sheet or tray which contains the packaged food. An absorbent pad is typically placed between the sheet/tray and the food product to absorb any excess fluid from the meat product. The absorbent pad absorbs liquids at a controlled rate eliminating the presence of free liquid in the bottom of the package. FIG. 3 shows an expanded cutout view of the individual layers of the absorbent pad which may comprise three layers: an upper layer comprised of a spunbond fiber web or porous film; an intermediate layer comprising several absorbent materials such as meltblown fiber web, wood fiber/pulp, superabsorbent polymer (SAP), or a combination of materials forming a composite; and a lower layer comprised of a spunbond fiber web or porous film. The upper and lower layers are made of nonwoven webs and porous films of polyolefin, polyester, or polyamide thermoplastics. The upper and lower layers are permeable to liquids.

The three layer structure can be a construction of spunbond/meltblown/spunbond (S/M/S) in which the meltblown fiber (or alternatively wood fiber/pulp, SAP or other composition) is sandwiched in between two spunbond layers. The intermediate absorbent layer is capable of absorbing and retaining depending on design specifics water and other juices as well as hydrophobic fluids such as oils and fats. Examples of absorbent pads are described in Miller, U.S. Pat. Nos. 4,275,811, 4,382,507, and 4,410,578; Term, U.S. Pat. No. 4,321,977; and Rhodes et al., U.S. Pat. No. 4,940,621. A portion of the polyolefin used in the meltblown or spunbond fiber can be replaced with an effective amount of polyolefin grafted cyclodextrin which will scavenge malodors emanating from meat and poultry purge due to deteriorative chemical reactions and sorbed by the absorbent pad. This factor will increase the shelf life of fresh meat and poultry and, additionally, permit the use of higher barrier films which sometimes intensify off-odors generated by fluids in the purge control pad.

In other embodiments of the invention, a nonwoven web wherein some or all of the polymer making up the nonwoven fibers have CD grafted thereto, small or large sections of the nonwoven can be used without further modification as chemical scavengers in closed food systems. For example, a nonwoven pad of polyethylene or polypropylene, where some portion of the polymer is grafted with CD, can be placed inside a food package, such as a cracker bag, a fresh produce bag, a shrink wrapped food bag, or any other foodstuff storage system where the package or system is closed. The nonwoven pad serves to scavenge undesirable chemicals when enclosed therein. For example, the nonwoven pad having at least a portion of CD grafted polymer can scavenge off odors, decomposition byproducts, plasticizers or other chemicals found in packaging, ethylene, or any other undesirable chemical from the inside of the package.

In using the CD grafted polymers of the invention with foodstuffs, it will be appreciated by one of skill in the art that the grafted CD is immobilized on the polymer to which it is grafted. Thus, the CD grafted polymers of the invention will not transfer CD into the foodstuffs or the surrounding environs. Thus, the grafted polymers are ideally suited for use in direct contact with foodstuffs.

Medical Articles & Components

In the medical field there are many sources of unpleasant odors. Many of the articles used in this field; protective garments, masks, drapes, mattress covers, pillow covers, bed pads, wound dressings, surgical sponges and the like contain or could contain polyolefin polymers which polyolefins can be totally or partially replaced with an effective amount of polyolefin covalently bonded cyclodextrin such that the odor emanating through or out of the medical article components or out of the medical article can be effectively reduced. Following are examples of some of the ways the polyolefin covalently bonded cyclodextrin may effectively be used.

1. Protective Garments

Polymers are used as protective barriers against noxious and toxic chemicals. Greater than four billion tons of these chemicals are transported annually. HazMat (hazardous materials) suits provide protection for the handlers of these chemicals. First responders, for example fire-rescue personnel, require HazMat suits to respond to industrial accidents involving the aforementioned chemicals or due to the threat of terrorism, foreign or domestic. Both law enforcement and the military also use HazMat suits in case of chemical attacks. Breathable impervious protective garments employing a breathable structure that, for example, combines spunbond/meltblown/spunbond (SMS) nonwoven fabric results in excellent barrier performance while still providing the breathability necessary to provide for the comfort needs of a worker.

Nonwoven webs for use as barrier layers for fabric laminates are further described in, for example, Timmons, et al., U.S. Pat. No. 5,213,881. In some embodiments of the invention, all or a portion of the polyolefin used in the meltblown or spunbond fiber can be replaced with an effective amount of polyolefin grafted cyclodextrin which will serve as an active barrier against the infiltration of volatile airborne contaminants reducing the exposure to the worker wearing the garment.

2. Masks

Nonwoven fabrics that are used in the manufacture of vital protective gear such as face masks play a crucial role in establishing a basic level of protection. The combination of protection and comfort requires the optimum balance of performance in terms of the overall tactile feel, but also the breathability as measured by e.g. moisture vapor transmission and air permeability. Microfiber composites for facemask structures are described in Braun et al., U.S. Pat. No. 5,656,368. In some embodiments of the invention, a portion or all of the polyolefin used in this type breathable fabric can be replaced with an effective amount of polyolefin grafted cyclodextrin to provide good filtration performance by capturing gaseous chemical and malodor contaminants that pass through the breathable microfiber structure.

3. Drapes

Surgical drapes are intended to reduce, if not prevent, the transmission of liquids. In surgical procedure environments, such liquid sources include patient liquids such as blood, saliva and perspiration, and life support liquids such as plasma and saline. In earlier times, surgical drapes were made of cotton or linen. Surgical drapes fashioned from these materials, however, permitted transmission or "strike-through" of various liquids encountered in surgical procedures. In these instances, a path was established for transmission of biological contaminants, either present in the liquid or subsequently contacting the liquid, through the surgical drape. Additionally, in many instances, surgical drapes fashioned from cotton or linen provided insufficient barrier protection from the transmission of airborne contaminates.

Today many drapes are made using nonwoven webs and films especially breathable films. An example of an advanced surgical drape, the material of which can also be used in patient prep pads, examination table covers, patient mattress bed covers or liners, and the like, and which employ polyolefin meltspun and microporous polyolefin film is described in Griesbach et. al., U.S. Pat. No. 6,764,566, which is incorporated herein by reference in its entirety. In some embodiments of the invention, some or all of the polyolefin meltspun or microporous film material is replaced with an effective amount of polyolefin grafted cyclodextrin of the disclosure which can capture an effective amount of malodor emanating from or through the drape.

4. Absorbent Bed Pads

Absorbent bed pads like absorbent articles discussed elsewhere generally contain a liquid impervious outer layer, an absorbent layer and a liquid pervious body side layer. The bed pad can be as simple as a polyethylene outer barrier layer, cellulose fluff absorbent layer and a nonwoven porous body side layer suitably bonded together, for example, at least around the edges.

In a more complicated construction, Mesek et al., U.S. Pat. No. 4,045,833, which is hereby incorporated by reference in its entirety, discloses long textile fibers running through the absorbent in the bed pad. The absorbent bed pads can also include polyolefin materials, for example, a breathable barrier, meltspun filaments or fibers, bicomponent bonding fiber, staple fiber and the like. In some embodiments of the invention, some or all of the polyolefin material can be replaced with an effective amount of polyolefin grafted cyclodextrin of the disclosure which can capture an effective amount of malodor emanating from the pad.

5. Wound Dressing

Wound dressings are used to clean, cover and protect wounds in order to facilitate the healing thereof. Absorbent wound dressings remove wound exudate, providing a clean, dry environment to promote healing while protecting the wound from the external environment. Dyer et al., U.S. Pat. No. 5,142,750, hereby incorporated by reference in its entirety, discloses an absorbent wound dressing that may also be used as a wipe or swab to cleanse skin, clean wounds or apply medicaments. One example of an absorbent dressing containing polyolefins is Krull, U.S. Pat. No. 4,203,435, which is hereby incorporated by reference in its entirety. Krull discloses an absorbent dressing containing polyolefins, wherein the outer layers comprise polypropylene, polyethylene, polyester or polyamide in the form of a fibrous nonwoven fleece which may be produced by mechanical needling technology well known to those skilled in the art. Another example is Griesbach, U.S. Pat. No. 6,663,584, hereby incorporated by reference in its entirety. Griesbach discloses a wound dressing that is a multi-layer elastic bandage that may be compressively wrapped around a wound and is capable of absorbing fluids and wound exudate while preventing the absorption of external liquids through the bandage. This wound dressing employs a composite elastic material which may be a multi-component material or a multilayer material wherein, for example, the multilayer material may have at least one elastic layer joined to at least one gatherable layer so that the gatherable layer is gathered between the locations where it is joined to the elastic layer which may be stretched to the extent that the nonelastic material gathered between the bond locations allows the elastic material to elongate.

Other multilayer composite elastic materials are disclosed, for example, by Vander Wielen et al., U.S. Pat. Nos. 4,720,415; Abuto et al., U.S. Pat. No. 6,096,668; and Heath et al., U.S. Pat. No. 5,964,973, all of which are hereby incorporated by reference in their entirety. The inelastic material cited is generally nonwoven webs made with a polyolefin polymer using meltspun technology which refers to a nonwoven web of filaments or fibers, which are formed by extruding a molten thermoplastic material, or coextruding more than one molten thermoplastic material, as filaments or fibers from a plurality of fine, often circular, capillaries in a spinneret with the diameter of the extruded filaments or fibers. Bonded carded webs of staple fiber are also mentioned. The meltspun fabrics suggested to be used for this product are spunbonded fabrics, meltblown fabrics or combinations of the two. One such substrate is designed to be placed proximal to the wound bed. This substrate should be absorbent and may be inherently absorbent or may be treated to create or enhance absorbency by such means as surfactant treatment of a naturally hydrophobic material. Additionally, this substrate may also comprise a nonadherent wound contacting layer so that the bandage does not adhere to the wound bed. Another substrate serves as a protective barrier to prevent the passage of external liquids through the bandage. Desirably the film barrier is attached to or incorporated within this substrate.

In the wound dressings described above, polyolefin containing fibers, filaments or films and the like can have polyolefin replaced with an effective amount of polyolefin covalently bonded cyclodextrin thereby effectively reducing the odor emanating through or from the wound dressing.

6. Surgical Sponges

Surgical sponges or pads are commonly used in surgical procedures where body organs and delicate membranes and tissues are exposed. Since exposure to air subjects the body members to radically different environmental conditions than encountered in the moist warmth of the body, it is considered good surgical procedure to simulate an environment more nearly approaching the natural environment. Surgical sponges, moistened with warm saline, are therefore inserted into a body cavity to protect and isolate those organs and tissues not directly involved in the operative procedure. In addition, such sponges or pads are commonly used to absorb surplus body fluids, to serve as aids in grasping and displacing living organs, and to drape exposed organs and tissues to protect them from dehydration. In Shiff, U.S. Pat. No. 4,068,666, incorporated herein by reference in its entirety, sponges containing, for example, a blend of rayon and polyolefin fibers is disclosed.

Polyolefin containing fibers, filaments or films and the like can have the polyolefin replaced with an effective amount of polyolefin covalently bonded cyclodextrin thereby effectively reducing the odor emanating through or from the surgical sponge.

Household and General Use Articles

The nonwoven sheets or films containing CD grafted polymers are also generally useful as standalone pads, sheets, or films that can easily be placed into any closed system to scavenge undesirable chemicals. For example, a nonwoven pad or a film made of polymeric material, wherein part of all of the polymer contains grafted CD, can be easily placed in, under, or around, for example, a storage bin, an automobile interior, a rug underlay, in a closet, a drawer, a vegetable bin or other compartment of a refrigerator, a boat or recreational vehicle interior or compartment, an anchor locker, a microwave oven, a tool box, a tackle box, a punnett, a gym bag, a shoe bag or box, a garment bag, a garbage can, a recycle bin, a basement crawl space, in a sump, a duct, and the like.

Any enclosed space where undesirable or toxic odors can accumulate can be a place where a nonwoven pad or film having at least some portion of CD grafted polymer can desirably be placed to scavenge the undesirable chemicals from the surrounding environs.

Additionally, many household articles can include, as all or some component of its construction, CD grafted polymers of the invention. A household article or household article component of the disclosure can be any article or article component that is useful in the home or like household or lodging environments, including hotels, inns, hospitals, furnished rental property, elder care housing, a dormitory, a restaurant, a dining hall, and like residential or institutional settings. Useful articles include a bedding material, a mattress cover, a pillow cover, a furniture liner, a furniture cover, a table cloth, a seat cover, draperies, a wall covering, a carpet backing, a vacuum cleaner bag, a refuse lid liner, a refuse container, a refuse container liner, and like articles or article components, or combinations thereof. In some embodiments of the present invention, polyolefin material employed in the prior art to make household articles or components thereof can be replaced with an effective amount of polyolefin grafted cyclodextrin of the disclosure which can capture an effective amount of malodor emanating through an article or a component thereof, or can prevent the diffusion of hazardous chemicals through the article or component.

It is notable that increasing scrutiny has been placed on VOCs that can emanate from thermoplastic household articles, exposing humans to irritating or even toxic substances. The source of VOCs may be, for example, plasticizer molecules, residual solvents, byproducts of thermal degradation from processing, or unreacted monomers. VOCs emanating from carpet backing, for example, have been implicated in allergic-type reactions in humans. As regulatory requirements to reduce or eliminate such VOC release become harsher, it is advantageous to provide a cost-effective means to scavenge these undesirable small molecules from any number of thermoplastic and thermoplastic containing articles. The invention contemplates the ease of incorporating cyclodextrin into a variety of thermoplastic household items for this purpose, among others as generally described elsewhere herein, either by replacing some or all of the thermoplastic article makeup with CD grafted polymer, or by incorporating a CD-grafted polymer surface film or internal film into the article.

1. Mattress & Pillow Covers

Beds in a home can be used by many visitors; children and sick adults can have accidents. Allergens and other irritants such as spores and dust mites can freely exist in mattresses, and can be the cause of allergic reactions to certain individuals. As such, it is often desirable to cover a mattress or a pillow to protect same from allergens, dust mites, fluids, and other undesirable materials. It is also desirable to protect mattresses from spills and other fluids, such as urine and blood. In locations where mattresses are frequently used, such covers are beneficial in preserving the life of the mattress by reducing odors that may result from use, particularly where accidents have occurred, and providing added safety and comfort for users. An example of a material for a suitable cover is contained in, for example Griesbach et. al., U.S. Pat. No.

6,764,566, previously incorporated by reference in its entirety. Polymer grafted CD may be advantageously incorporated into these covers to reduce malodors emanating from the pillows or mattresses.

2. Furniture Lining

Nonwovens are often used to hold the padding in place in furniture and in fact the padding used in furniture can at times contain polyolefin fiber, filaments or film. Daponte et al., U.S. Pat. No. 5,942,452, incorporated herein by reference in its entirety, disclose substantially continuous filament nonwovens made from polyolefins used to increase the anti-skid property of nonwoven webs used in furniture construction. The web comprises filaments of a multi-phase, elastomeric olefin polymer composition. Polymers of this type are known and are copolymeric compositions that generally comprise at least one substantially non-elastomeric, crystalline thermoplastic domain comprising polymerized olefin units and at least one elastomeric domain comprising polymerized olefin units. The polymeric compositions are multi-phase compositions in the sense that they comprise substantially large domains or segments of each of the elastomeric and non-elastomeric components as to exhibit both thermoplastic and elastomeric properties. These webs can be produced using, for example, meltblown or spunbond technology. Other processes can also be used to produce furniture lining including hydroentangling also called hydroknit, bonded carded web and the like. In some embodiments of the invention, a suitable amount of the polyolefin can be replaced with an effective amount of polyolefin covalently bonded cyclodextrin to effectively reduce the odor emanating from the furniture.

3. Carpet Backing

Carpet backing generally consists of the primary backing into which the tufts are inserted and may be made of jute, kraftcord, cotton, woven or nonwoven synthetics normally made using polypropylene. In addition to tufting, carpet may be made by weaving, knitting, needle punching, fusion bonding and flocking. After dyeing the secondary backing is applied and the surface is sheared smooth. The secondary backing is any material laminated to the primary backing for dimensional stability while locking individual tufts in place. Most secondary backing today is woven polypropylene, such as Amoco Chemicals' Action Bac®, which is a backing made of a leno weave of slit film and spun olefin yarns that forms a stretchable, all synthetic secondary backing fabric. It is shredded and spun into yarn, which is then used.

Hartgrove et al., U.S. Pat. No. 6,832,418, incorporated herein by reference in its entirety, disclose a polyolefin containing three-dimensional secondary carpet backing. Coolen et al., U.S. Pat. No. 6,207,599, hereby incorporated by reference in its entirety, discloses polyolefin binder fiber to fuse primary and secondary backing together. In all the above a suitable amount of the polyolefin can be replaced with an effective amount of polyolefin covalently bonded cyclodextrin to effectively reduce the odor emanating from the carpeting.

4. Liners

Many locations in the home generate odors that would be advantageous to contain. It is anticipated that low cost disposable nonwoven liner materials containing an effective amount of polyolefin covalently bonded cyclodextrin disclosed herein may be effectively used. For example, a nonwoven having an effective amount of polyolefin covalently bonded cyclodextrin can be attached to the inside of a garbage can lid or placed in the garbage can to effectively contain the odors generated therein. Other articles, such as a litter box, shoe box, food storage box or bin, laundry basket, or clothing box or bag may advantageously incorporate liners having cyclodextrin grafted polymers of the invention incorporated therein. Further, the polyolefin used in disposable plastic garbage bags, garment bags, diaper bags, vacuum cleaner bags, and the like can also be made using polymer with an effective amount of polyolefin having covalently bonded cyclodextrin.

Pet Care Articles

A pet care article or pet care article component of the disclosure can be, for example, a bedding material, a wipe or wipe sheet, a towel, a mat, a collar, a garment, a foot wear or paw wear liner, such as a "bootie" or sock which can be integral to or separable from a foot wear article, a cage liner, a hygiene article, and like articles, or combinations thereof. A pet care bedding material can include, for example, a mattress cover, mattress pad, pillow case, bed sheet, and like materials or articles. Other examples of a pet care article or pet care article component can include, for example, a garment liner, a garment accessory, a garment accessory liner, or combinations thereof. In some embodiments of the present invention, polyolefin material employed in the prior art to make pet care articles or components thereof can be replaced with an effective amount of polyolefin grafted cyclodextrin of the disclosure which can capture an effective amount of malodor emanating through an article or a component thereof, or can prevent the diffusion of hazardous chemicals through the article or component.

Filter Articles

A filter article or filter component of the disclosure can be, for example, a gaseous filter, a vacuum filter, a liquid filter, and like filter articles, which may filter fluids or particulate impurities from a fluid phase. Filters have a multitude of applications in various industrial and consumer areas including, for example, automotive, aerospace, hospital-medical, biotechnology such as biologics isolation and purification, industrial materials processing, food or beverage processing, water treatment, and the like. Examples of filters include an oil filter, a fuel filter, an air filter, a water filter, a furnace filter, a bodily fluid filter such as for blood dialysis, an aircraft cabin filter, a hospital mask filter, a water purification filter, a diafiltration membrane, an osmosis membrane, reverse osmosis membrane, an ultra-filter, a micro-filter, a dialysis membrane, a gas-mask filter, a pilot's mask filter, a vacuum cleaner filter, a bag house filter, an ozone filter, a clear room filter, and like applications.

In embodiments, any of the abovementioned articles or components can be prepared or processed with any of the abovementioned processes or any of the following melt based processes to form a desired article or component structure, and combinations thereof, including: spunbond, meltblown, nanofiber, porous film, or co-form. In embodiments, any of the abovementioned articles or components can also be prepared or processed with any of the following staple-based or natural fiber based processes or structures, and combinations thereof, including: hydroentanglement, bonded-carded, needle punched, airlaid, wetlaid, and like processes and structures, or combinations thereof.

Fibers used in the disclosure can include any polyolefin fibers known in the art. The thread-like fibers used in fashioning articles of the disclosure include a composition comprising a functionalized polyolefin and grafted CD and optionally blended with polyolefin, and can be used to construct a nonwoven web comprised of one or more overlapping or interconnected fibers in a nonwoven manner. The fibers can be, for example, in the form of a long filament produced by spun melt or melt blown processes. Any nonwoven polyolefin fibers known in the art may be used in embodiments of the disclosure. The nonwoven webs may be used, for example, to construct bandages, disposable diapers, incontinent products, and like articles, which have an improved odor control system to reduce or eliminate malodors caused by bodily fluids, such as blood, urine, menses, tears, and like fluids or discharge. In embodiments, the functionalized polyolefin having grafted CD can be homogeneously distributed throughout the fiber permitting malodor compounds to sorb into the fiber and then diffuse into the core of the fiber where they are complexed or effectively trapped by the CD throughout the entire fiber thereby substantially preventing their olfactory detection. In embodiments, the nonwoven webs produced from the functionalized polyolefin having grafted CD of the disclosure can change the fiber's wetting properties and can effectively absorb malodors and reduce olfactory detection.

EXPERIMENTAL SECTION

A further embodiment of the disclosure illustrates that chemically grafting cyclodextrin molecules onto functionalized polyolefin polymers produces a tailorable barrier having unique properties including, for example, reducing the mass transport of low molecular weight compounds, changing the surface energy of the polymer, effecting polar/nonpolar organic compound partitioning, and increasing polymer crystallinity.

The foregoing is applicable to various compositions and articles there from of the disclosure. The following examples and data further exemplify the invention.

1. Compatibility Testing

Qualitative Sample Preparation.

Five polyolefin samples were compounded with and without unmodified α-CD and β-CD and visually checked for CD compatibility using an optical microscopy method. Two test coupons containing stoichiometric weight loadings α-CD and β-CD (2.78 wt % and 3.20 wt %) were compounded into an ethylene-maleic anhydride copolymer/LDPE blend (Plexar 175, Equistar Chemicals L.P.) using a Brabender Plasticorder Mixing Bowl. A Brabender mixing bowl consists of two counter rotating roller blades in a number eight-shaped bowl. Two additional test coupons containing the same weight loading of α-CD and β-CD used in the Plexar samples were compounded with LDPE (NA-204, Equistar Chemicals L.P.), the same LDPE used in the Plexar blend. And, finally, a fifth control sample of NA-204 LDPE resin was also compounded on a Brabender Plasticorder Mixing Bowl but without CD. All resins were dried at 85° C. for 2 hours under vacuum (<0.1" of Hg) before compounding, while α-CD and β-CD cyclodextrins were dried in a circulating air oven at 105° C. for 30 minutes.

α-Cyclodextrin Compounding in Low Density Polyethylene (LDPE) and Ethylene-Maleic Anhydride Copolymer/LDPE Blend (EMA/LDPE).

Alpha-cyclodextrin (lot 60P122, Wacker Chemie), 1.11 g, was compounded into 39.89 gms of LDPE (NA204, lot ET626241, Equistar Chemicals, L.P.) or ethylene-maleic anhydride (EMA)/LDPE (Plexar PX 175, lot CL590803E1, Equistar Chemicals, L.P.) using a Brabender Plasticorder Mixing Bowl for 5 minutes at 130° C. and 80 rpm. The materials were molded into sample coupons 4.45 cm×1.59 cm×0.10 cm with an Atlas Laboratory Mixing Molder set at 140 rpm, 150° C. for 2 minutes, with a mold temperature of 90° C.

Beta Cyclodextrin Compounding in Low Density Polyethylene (LDPE) and Ethylene-Maleic Anhydride Copolymer/LDPE Blend (EMA/LDPE).

Beta cyclodextrin (lot 70P162, Wacker Chemie), 1.32 g, was compounded into 39.69 gms of LDPE (NA204, lot ET626241, Equistar Chemicals, L.P.) or EMA/LDPE (Plexar PX175, lot CL590803E1, Equistar Chemicals, L.P.) using a Brabender Plasticorder Mixing Bowl for 5 minutes at 130° C. and 80 rpm. This material was then molded into sample coupons 4.45 cm×1.59 cm×0.10 cm with an Atlas Laboratory Mixing Molder set at 140 rpm, 150° C. for 2 minutes, with a mold temperature of 90° C.

Photographic Procedure.

A stereomicroscope with camera (Polaroid Type 57 film), at ~10.6× magnification was used. Lighting was a halogen spot incident at approximately 45° to horizontal, of the surface of the plastic. A black piece of paper (Polaroid film sheath internal) was used as a backing, to control stray light. The photographs were scanned at 200 DPI, using the default brightness and contrast settings (i.e., no adjustment), and saved as JPEG's. Because the photographs were very flat in contrast, all the images were adjusted the same amount using GIMP: "−115" on brightness and "+65" on contrast. Dark artifacts in all photographs were from dust on the microscope optics.

The microscopic examination was used to visually check for compatibility between the polyethylene resin and cyclodextrin. Both alpha and beta cyclodextrin compounded into LDPE resin and molded into thin translucent coupons produce agglomerates and particles in the polymer matrix that are visible by microscopic examination when compared to LDPE having no additives. The microscopic results for alpha and beta cyclodextrin compounded on a stoichiometric weight basis into an anhydride functionalized LDPE resin and molded into thin translucent coupons produced no microscopic agglomerates or particles. The functionalized polyolefin/CD materials showed the same clarity as the LDPE resin.

Polyolefin Crystallinity and Surface Energy Testing

Degree of crystallinity affects the fundamental physical properties of the polymer. Crystallinity was measured by differential scanning calorimetry (DSC) by quantifying the heat associated with melting (fusion) of the polymer. Samples containing stoichiometric weight loadings β-CD were compounded in the Brabender Plasticorder Mixing Bow and were analyzed by DSC over a temperature range of −20° C. to 160° C. All of the samples were subjected to an initial thermal treatment from room temperature to 160° C. to impart equivalent thermal history to all samples. Following the thermal treatment, samples were then subjected to a controlled cooling program 160° C. to −20° C. followed by a controlled heating program from −20° C. to 160° C. The second heats of melting, ΔHm, and the cold crystallization, ΔHc, are determined by integrating the areas (J/g) under the peaks. The percent crystallinity was determined from the following equation:

% Crystallinity=[ΔHm−ΔHc]/ΔHm °ΔHm° for polyethylene is 293.6 J/g.

Two LDPE resins (NA 204 and NA 214, Equistar Chemicals, L.P.) and three maleic anhydride functionalized resins (Plexar resins PX 175, PX 5125, PX 1856 and PX 1857, Equistar Chemicals, L.P.) and the four Plexar resins compounded with a stoichiometric weight loading of β-CD (3.2 wt %, 3.2 wt %, 4.6 wt % and 2.3 wt %, respectively) were analyzed by DSC. All the samples were subjected to identical processing conditions (thermal history) to eliminate processing effects. The percent crystallinity results are provided in Table 12. The results clearly show that β-CD grafted maleic anhydride functionalized LDPE has significantly greater crystallinity than compounded maleic anhydride functionalized LDPE without CD.

Sorption and partition coefficients of various compounds are highly correlated to molecular structure. Polyethylene (PE) has a very high affinity for nonpolar flavor compounds, e.g., limonene, myrcene, pinene and valencene. Since beverages are water based, a situation is created where nonpolar flavor compounds, more miscible in PE, are preferentially absorbed from the beverage. Although not limited by theory, we hypothesize that by changing the surface energy of the polymer by grafting CD onto a functionalized polyolefin, the surface polarity increases, thereby lowering the equilibrium partition coefficient and increasing nonpolar flavor retention. To accomplish this, the contact food layer should selectively partition undesirable off-flavors from the packaged food while minimizing the loss of important flavoring compounds.

The surfaces of cyclodextrin-grafted polyolefins were measured using a variation of the Wilhelmy slide technique. In this test method, a liquid with a known surface tension is used to determine the contact angle of an uncharacterized material. The technique measures the force exerted on the material to be characterized, extrapolated to the moment of contact, the contact angle is used to derive the following equation force (F), surface tension ($\gamma$), and the perimeter of contact (p):

$$F = \gamma p \cos(\theta)$$

Two LDPE resins (NA 204 and NA 214, Equistar Chemicals, L.P.) and three maleic anhydride functionalized resins (Plexar resins PX 175, PX 5125 and PX 1856, Equistar Chemicals, L.P.) were used. The three Plexar resins compounded with a stoichiometric weight loadings α-CD and β-CD (2.78 wt % and 3.2 wt %) were analyzed for dynamic contact angle. All the samples were subjected to identical molding conditions to eliminate processing effects on surface conditions, i.e., contaminants and texture. The large area of the test sample coupons 4.45 cm×1.59 cm×0.10 cm is "averaged." Samples were tested in an Instron equipped with a 50 gmf load cell. The samples to be tested were lowered into a beaker of +18 Mohm water (polar liquid) and reagent grade toluene (nonpolar) and withdrawn. The liquid volume used was approximately 200 mL held at 24° C.±1° C. during the testing. The Instron cross-head travel was 2 mm/min. and the extent of travel was 12 mm. The data files where imported into EXCEL for data analysis and calculation of contact angle. Triplicate results were averaged and are provided in Table 12.

The results show a reduction in the contact angle of a CD grafted polyolefin compared to the same functionalized polyolefin without CD when tested in water. The decrease in the contact angle indicated a change in the surface energy of the CD grafted polyolefin making the material slightly more hydrophilic. Additionally, when the samples are tested in toluene, the surface tension of a CD grafted polyolefin compared to the same functionalized polyolefin without CD showed a decrease indicating a less hydrophobic surface. A summary of physical test data of low density polyethylene (LDPE), ethylene-maleic anhydride copolymer/LDPE blend, and β-CD grafted ethylene-maleic anhydride copolymer/LDPE blend is provided in Table 12.

TABLE 12

Results of compatibility testing

| Sample ID | Bulk Polymer Properties | | |
|---|---|---|---|
| | Melt Peak #1 % Crystallinity | Melt Peak #2 % Crystallinity | Total % Crystallinity |
| NA 204 | 25.0% | 3.8% | 28.8% |
| PX 175 | 31.7% | 9.5% | 41.2% |
| PX 175 + 3.2% β-CD Grafted | 33.1% | 8.7% | 41.8% |
| PX 5125 | 21.4% | 21.9% | 43.2% |
| PX 5125 + 3.2% β-CD Grafted | 21.7% | 23.4% | 45.1% |
| NA 214 | 38.6% | ND | 38.6% |
| PX 1856 | 23.3% | 7.7% | 31.0% |
| PX 1856 + 4.6% β-CD Grafted | 29.2% | 10.6% | 39.8% |

| Sample ID | Polymer Surface Properties | | |
|---|---|---|---|
| | $H_2O$ Advancing Contact Angle | $H_2O$ Retreating Contact Angle | Surface Tension Dynes/cm (Toluene) |
| NA 204 | 104.1 | 75.7 | 31.90 |
| PX 175 | 101.1 | 75.3 | 31.25 |
| PX 175 + 3.2% β-CD Grafted | 95.7 | 63.5 | 30.88 |
| PX 5125 | 97.5 | 76.8 | 31.52 |
| PX 5125 + 3.2% β-CD Grafted | 98.3 | 71.1 | 32.93 |
| NA 214 | 101.8 | 71.0 | 31.83 |
| PX 1856 | 99.7 | 72.3 | 30.54 |
| PX 1856 + 4.6% β-CD Grafted | 93.6 | 62.9 | 31.12 |

2. Equilibrium Partition Coefficients

Selective flavor compound sorption by package contact materials continues to be a problem especially in beverages packaged in contact with LDPE. Nonpolar compounds have a very high affinity for LDPE. The partition coefficient of various aroma/flavor compounds into PE are highly correlated to their molecular structure and greatly influenced by polymer type, degree of crystallinity as well as the structure of the solute, and chain length and polarity of solute. A commercial single-strength "not-from-concentrate" orange juice was used to measure flavor compound partitioning in CD grafted LDPE and LDPE without CD grafting.

1% Beta Grafted EMA/LDPE—Beta Cyclodextrin Compounding in Ethylene-Maleic Anhydride Copolymer/LDPE Blend.

Beta cyclodextrin (lot 70P162, Wacker Chemie) was compounded into EMA/LDPE (Plexar PX175, lot CL590803E1, Equistar Chemicals, L.P.) using 24 mm Haake co-rotating twin screw extruder to produce a 3.25% masterbatch. All resins were dried at 85° C. for 2 hours under vacuum (<0.1" of Hg) before use, while β-CD cyclodextrin was dried at 115° C. under vacuum (0.3" of Hg) for 24 hours. This masterbatch material was then let down at 1.3 parts masterbatch to 3 parts LDPE (1924P Westlake Chemical Corporation) in a Killion blown film line to produce a 1 mil mono-layer film.

The CD grafted LDPE and control LDPE films were placed into hermetically sealed 300-mL glass bottles with ground glass stopper containing single-strength "not from concentrate" commercial orange juice and blown test polymer films (1.4 $cm^2$/1 mL juice). The bottles where filled and sealed with the stopper to eliminate any headspace and allowed to remain at room temperature in the dark for 31 days. The CD grafted films, along with test films made from a reference polymer for comparison, and the orange juice in contact with the films were then analyzed for orange juice flavor compounds at the end of the test period. The fresh single strength orange juice was analyzed at the initial time of testing. The concentration of orange juice flavor compounds sorbed into the films was determined indirectly by subtracting the flavor concentrations at 31 days from juice at the start of testing.

Analytical Method.

An aliquot of orange juice was extracted with a 50:50 mixture of ethyl ether:pentane. The extraction solvent was volume reduced under a gentle stream of nitrogen gas and injected into the high-resolution gas chromatograph equipped with a flame ionization detector. An HP 5890 GC equipped with a 30 m×0.25 mm id DB5 capillary column (J&W Scientific) was used. Operating conditions were: column held at 32° C. for 3 min and then increased at 6° C./min to 200° C., helium carrier gas linear velocity 29 cm/sec. Analysis was conducted in a splitless mode. The unknown flavor peak area is integrated to quantitate the concentration, and then the unknown flavor concentration is calculated from a four-point standard calibration covering the concentration range of the samples. Sample concentrations are reported in ppm (μg/g-weight/weight). The flavor concentration is calculated from the calibration curve slope or response factor (RF).

$$\text{Concentration of Compound in ppm} = (\text{Peak Area} \times RF) \div \text{Sample } Wt.$$

$$\text{Concentration of Compound in ppm} = \frac{\text{Peak Area}}{\text{Calibration Curve Slope}} \div \text{Sample } Wt.$$

The partition coefficient ($K_e$) was calculated for the test flavor compounds and the orange juice-polymer contact coupon system. $K_e$ values were determined using the following equation:

$$K_e(\text{differential}) = [Cp]_{eq}/[COj]_{eq}$$

where $[COj]_{eq}$ is the concentration of the flavor compound in the juice at equilibrium and $[Cp]_{eq}$ is the concentration of the flavor compound in the polymer at equilibrium both in (μg/g) determined by analysis. The partition coefficients ($K_e$) are presented in Table 14. The smaller the $K_e$, the lower the affinity of the flavor compound for the polymer, while larger coefficients reflect more favorable partitioning into the polymer.

A large body of literature exists describing the important sensory flavor and aroma compounds in orange juice. Partition coefficients for thirteen key orange juice aroma/flavor compounds were determined. The orange juice flavor compounds were selected for their contribution to sensory quality. Compounds which contribute to orange juice aroma and off-aroma are also included. The following combinations are responsible for the highest sensory ratings: limonene/ethyl butyrate/neral/geranial; limonene/ethyl butyrate/neral/geranial/α-pinene. Compounds which contribute to off-aroma e.g. α-terpineol, hexanal and 4-vinyl guaiacol; scalping them from the orange juice would be beneficial. Less limonene sorption and greater α-terpineol sorption is also desirable. Limonene has a partition coefficient in the CD grafted LDPE resin that is 39% less than the control polymer, and neral and geranial have partition coefficients which are 45% and 15% less, respectively. The equilibrium partition coefficients for orange juice aroma and flavor compounds in CD grafted low density polyolefins and commercial contact layer LDPE following 31 days storage in commercial orange juice are provided in Table 13.

TABLE 13

Odor and flavor thresholds for compounds and results of partition coefficient testing.

|  | Odor Threshold[1] ppb in Water | Flavor Threshold[1] ppb in Water |
|---|---|---|
| Alcohols | | |
| Linalool | 5.3 | 3.8 |
| α-Terpineol | 280 | 300 |
| 4-Vinyl guaiacol | NA | 75 |
| Aldehydes | | |
| Hexanal | 9.18 | 3.66 |
| Octanal | 1.41 | 0.52 |
| Decanal | 0.53 | 1.07 |
| Neral | 85 | 41.4 |
| Geranial | NA | 40.0 |
| Esters | | |
| Ethyl butyrate | 0.13 | 0.13 |
| Hydrocarbons | | |
| α-Pinene | 9.5 | 1014 |
| β-Myrcene | 36 | 42 |
| Limonene | 60 | 210 |
| Valencene | NA | NA |

| | EQUILIBRIUM PARTITION COEFFICIENTS - $K_e$ Temp - 22° C. | |
|---|---|---|
| | 1% β Grafted EMA/LDPE $K_e$ | Control Resin $K_e$ |
| Alcohols Total | 289 | 495 |
| Linalool | 271 | 395 |
| 4-Vinyl guaiacol | 18 | 100 |
| Aldehydes Total | 2275 | 2937 |
| Hexanal | 586 | 658 |
| Decanal | 1242 | 1656 |
| Neral | 150 | 273 |
| Geranial | 297 | 350 |
| Esters Total | 221 | 299 |
| Ethyl butyrate | 221 | 299 |
| Hydrocarbons Total | 1228 | 2537 |
| α-Pinene | 444 | 651 |
| β-Myrcene | 366 | 578 |
| Limonene | 338 | 556 |
| Valencene | 80 | 752 |

[1]E. M. Ahmed, R. A. Dennison, R. H. Dougherty, P. E. Shaw, "Flavor and Odor Thresholds in Water of Selected Orange Juice Components, J. Agric. Food Chem., Vol. 25, No. 1, 1978.

3. Testing of Sealing Materials for Organoleptic Migrants

Low level volatiles (e.g., monomers, refinery contaminants, etc.) remain as a residue of the polymerization process or later thermo-oxidation products (e.g., aldehydes and ketones) may be produced during the conversion process. Dispersed in the polymer matrix, these components are able to migrate into food products in contact with the package by a process generally controlled by Fickian diffusion. These components are typically volatile and mobile enough to be detected by the human nose and give rise to an organoleptic defect often described as a "plastic" taste that is generally considered undesirable by many consumers. Polyolefins are widely used for sealing elements in carbonated water, beer and soft drinks, as well as in numerous sealant layers for shelf stable packages such as cereals, crackers, cookies, salted snacks, etc. Aldehydes are produced in small quantities when sealing materials are compounded and later converted to liners and shells. The testing shows that CD grafted polyolefins compounded into closure compositions acts to complex residual oxidation products, like aldehydes, in the thermoplastic resin during the compounding and molding process thereby preventing them from out-gassing or migrating from the composition.

Masterbatch Material.

CD grafted LDPE was first individually compounded into masterbatches. A final blend of CD grafted LDPE and closure liner composition (Polyliner 461, DS-Chemie, Bremen, Germany) was compounded to provide a CD loading of 0.50 wt % and 0.60 wt %.

Two ethylene-maleic anhydride copolymer/LDPE blends were compounded with a stoichiometric weight loading of unmodified β-CD (3.20 wt %) using a Brabender Plasticorder Mixing Bowl forming the masterbatches. A third control sample of the closure liner composition was also compounded on a Brabender Plasticorder Mixing Bowl but without CD. All resins were dried at 85° C. for 2 hours under vacuum (<0.1" of Hg) before use, while β-CD cyclodextrin was dried in a circulating air oven at 105° C. for 30 minutes. The following master batch compositions were compounded.

1. Beta Cyclodextrin Compounding in Low Density Polyethylene (LDPE) and Ethylene-Maleic Anhydride Copolymer/LDPE Blend (EMA/LDPE) Masterbatch.

Beta cyclodextrin (lot 70P162, Wacker Chemie), 1.31 g, was compounded into 31.75 gms of EMA/LDPE (Plexar PX5125, lot CL590803E1, Equistar Chemicals, L.P.) and 7.94 gms of EMA/LDPE (Plexar PX175, lot CL590803E1, Equistar Chemicals, L.P.) using a Brabender Plasticorder Mixing Bowl for 5 minutes at 130° C. and 80 rpm.

2. Alpha Cyclodextrin Compounding in Low Density Polyethylene (LDPE) and Ethylene-Maleic Anhydride Copolymer/LDPE Blend (EMA/LDPE) Masterbatch.

Alpha cyclodextrin (lot 60P122, Wacker Chemie), 1.11 g, was compounded into 31.75 gms of EMA/LDPE (Plexar PX5125, lot CL590803E1, Equistar Chemicals, L.P.) and 7.94 gms of EMA/LDPE (Plexar PX175, lot CL590803E1, Equistar Chemicals, L.P.) using a Brabender Plasticorder Mixing Bowl for 5 minutes at 130° C. and 80 rpm.

Test Compositions.

Test compositions of CD grafted master batch and closure liner compositions were made by compounding the materials in a Brabender Plasticorder Mixing Bowl. The wt % of the closure test compositions are provided in Table 14. CD grafted polyolefin and closure liner wt % compositions are compounded for organoleptic migrant testing.

TABLE 14

Compositions of test materials.

| Sample ID | Description | CD Graft α-CD | CD Graft β-CD | Wt % Composition PX 175 | Wt % Composition PX 5125 | Wt % Composition Polyliner |
|---|---|---|---|---|---|---|
| 2A | Control | | | | | 100 |
| 2B | 0.50% α-CD Grafted Blend | X | | 3.7 | 14.8 | 81.5 |
| 2C | 0.60% α-CD Grafted Blend | X | | 4.5 | 17.8 | 77.7 |
| 2D | 0.50% β-CD Grafted Blend | | X | 3.7 | 14.7 | 81.6 |
| 2E | 0.60% β-CD Grafted Blend | | X | 4.4 | 17.7 | 77.9 |

Laboratory Sample Preparation.

Granulated Polyliner 461 and CD grafted polyolefin masterbatch were dry-blend batch mixed on a weight basis. The dry-blended materials were dried in a vacuum oven at <0.1 mm Hg pressure for 2 hours at 85° C. to remove any residual water from both materials. A Brabender fusion bowl was used to compound the CD grafted masterbatch and closure liner composition mixtures. Replicate 41-gram batches of pre-dried resins without CD grafted admixes were run to flush out the fusion bowl. The fusion bowl temperature was set at 130° C. With the rpm of the blades set at 80, 41 grams of test material composition was dropped into the bowl. The material was fed into the bowl over a 30-second period. After another 5 minutes of processing, the screw speed was reduced to zero and the molten resin was removed and collected on aluminum foil. The bowl and the roller blades were thoroughly cleaned before starting the next run.

Compounded liner test materials were then milled into shavings having ~20 μm thickness for organoleptic resin volatiles testing Analytical Method.

The test samples prepared in the Brabender were allowed to out-gas aldehydes into the headspace of a vial during confinement at an elevated temperature. An aliquot of air taken from the headspace during the confinement period was analyzed by static headspace gas chromatography using flame ionization detection.

A 0.25±0.002 g sample of milled shavings was placed into a 22-mL glass vial. The vial was immediately capped using a Teflon® faced butyl rubber septa and aluminum crimp top. Volatiles were desorbed from the sample into the headspace by heating the vial at 85° C. for about 24-hours. The vial was transferred to a heated (85° C.) headspace sampler (Hewlett Packard model 19395A) attached to a Hewlett Packard Model HP-5880 II GC equipped with a flame ionization detector (FID), and computerized data collection. J&W Scientific capillary column (DB-5, 30 m×0.25 mm I.D., 1.0 μm film) with helium carrier flow set at a split ratio of 20:1. HRGC was used to measure the residual aldehydes concentration in the headspace of the vial. Aldehyde peak areas were integrated to quantitate the concentration, and then the concentration was calculated from a four-point standard calibration covering the concentration range of the samples. Sample concentrations are reported in ppm (μg/g-weight/weight). The aldehyde concentration was calculated from the calibration curve slope or response factor (RF) prepared for each aldehyde analyte.

$$\text{Concentration of Compound in } ppm = (\text{Peak Area } X\ RF) \div \text{Sample } Wt.$$

$$\text{Concentration of Compound in } ppm = \frac{\text{Peak Area}}{\text{Calibration Curve Slope}} \div \text{Sample } Wt.$$

Residual Aldehyde Test Results.

When heated in a confined space, the closure test compositions produce part per billion and sub-part per billion levels of $C_4$ to $C_{10}$ aldehydes. Compositions containing CD grafted polyethylene substantially reduce the aldehyde concentrations. Total $C_4$ to $C_{10}$ aliphatic aldehydes were reduced 38% and 44% for 0.50 wt % and 0.60 wt % α-CD grafted compositions, respectively. The related wt % loadings for β-CD grafted compositions reduced total aldehydes 31% and 22%, respectively. Table 15 shows a comparison of $C_4$ to $C_{10}$ saturated aldehydes in closure liner material with and without CD grafted polyolefin. Aldehyde concentrations are in ng/g, which is parts per billion.

TABLE 15

Comparison of saturated aldehyde scavenging by CD grafted polymer compounded into Polyliner 461.

| | Sample Numbers, from Table 14 Concentration, ppb (ng/g) | | | | |
|---|---|---|---|---|---|
| | 2A | 2B | 2C | 2D | 2E |
| Decanal | 4.81 | 2.43 | 2.06 | 3.54 | 2.72 |
| Nonanal | 5.18 | 5.18 | 5.15 | 5.04 | 5.26 |
| Octanal | 358 | 208 | 185 | 236 | 275 |
| Heptanal | 0.79 | ND | 0.66 | 0.60 | 0.57 |
| Hexanal | 19.2 | 18.8 | 18.1 | 16.9 | 16.7 |
| Butanal | 29.5 | 25.3 | 22.0 | 26.4 | 25.7 |
| Total Aldehydes | 417.48 | 259.71 | 232.97 | 288.48 | 325.95 |

4. Organoleptic Testing of Sealing Materials Exposed to Ozonated Water

Purified bottled water demand has increased sharply worldwide. The process known as ozonation is the commercial method for disinfecting bottled water in the North America. The most commonly used materials to manufacture bottles and closures are plastics such as polyethylene terephthalate (PET) for the bottle and polyolefins for liners and threaded closure shells. A "plastic-like" off-taste and off-odor is noticeable in water packaged in all plastic containers. This organoleptic defect is especially noticeable in water treated with ozone. Plastic off-taste in bottled water has been correlated with the presence of low level (typically part per billion) concentrations of aldehydes (e.g., hexanal, heptanal, octanal, nonanal, and decanal). Even before the liner or shell comes into contact with ozonated water, low aldehydes concentrations are inherent in the thermoplastic materials, as shown in Example 2, due to thermal oxidation degradation during processing. However, substantially greater aldehyde concentrations are measured in water which has been ozonated due to susceptible additives like erucamide, a common lubricant used in polyolefin sealing elements. Ozone chemically attacks unsaturated chemical bonds in additives and unsaturated olefin monomers (e.g., hexene, octene, decene) and oligomers. An accelerated storage testing method was used to measure aldehydes generated from liner compositions exposed to ozonated water. The test method with ozone treated water shows a further reduction in aldehydes can be achieved by incorporating CD grafted polyolefins into the closure composition.

Masterbatch Materials.

CD grafted LDPE was first individually compounded into masterbatches. A final blend of CD grafted LDPE and closure liner composition (Polyliner 461, DS-Chemie, Bremen, Germany) was compounded to provide a CD loading of 0.50 wt %.

Two ethylene-maleic anhydride copolymer/LDPE blends were compounded with a stoichiometric weight loading of unmodified β-CD (3.30 wt %) using a Brabender Plasticorder Mixing Bowl forming the masterbatches. A third control sample of LDPE resin was also compounded on a Brabender Plasticorder Mixing Bowl containing unmodified α- and β-CD. All resins were dried at 85° C. for 2 hours under vacuum (<0.1" of Hg) before use, while β-CD cyclodextrin was dried at 105° C. for 30 minutes. The following masterbatch compositions were compounded.

1. Beta Cyclodextrin Compounding in Ethylene-Maleic Anhydride Copolymer/LDPE Blend (EMA/LDPE) Masterbatch.

Beta cyclodextrin (lot 70P162, Wacker Chemie), 1.31 g, was compounded into 39.69 gms of EMA/LDPE (Plexar PX5125, lot CL590803E1, Equistar Chemicals, L.P.) or LDPE (NA204, lot ET626241, Equistar Chemicals, L.P.) using a Brabender Plasticorder Mixing Bowl for 5 minutes at 130° C. and 80 rpm.

Beta cyclodextrin (lot 70P162, Wacker Chemie), 1.31 g, was compounded into 39.69 gms of EMA/LDPE (Plexar PX5125, lot CL590803E1, Equistar Chemicals, L.P.) and 7.94 gms of EMA/LDPE (Plexar PX175, lot CL590803E1, Equistar Chemicals, L.P.) using a Brabender Plasticorder Mixing Bowl for 5 minutes at 130° C. and 80 rpm.

2. Alpha Cyclodextrin Compounding in Low Density Polyethylene (LDPE) and Ethylene Maleic Anhydride Copolymer/LDPE Blend (EMA/LDPE) Masterbatch.

Alpha cyclodextrin (lot 60P122, Wacker Chemie), 1.11 g, was compounded into 39.89 gms of EMA/LDPE (Plexar PX5125, lot CL590803E1, Equistar Chemicals, L.P.) or LDPE (NA204, lot ET626241, Equistar Chemicals, L.P.) using a Brabender Plasticorder Mixing Bowl for 5 minutes at 130° C. and 80 rpm.

3. Alpha Cyclodextrin Compounding in Low Density Polyethylene (LDPE) and Ethylene-Maleic Anhydride Copolymer/LDPE Blend (EMA/LDPE) Masterbatch.

Alpha cyclodextrin (lot 60P122, Wacker Chemie), 1.11 g, was compounded into 31.75 gms of EMA/LDPE (Plexar PX5125, lot CL590803E1, Equistar Chemicals, L.P.) and 7.94 gms of EMA/LDPE (Plexar PX175, lot CL590803E1, Equistar Chemicals, L.P.) using a Brabender Plasticorder Mixing Bowl for 5 minutes at 130° C. and 80 rpm.

Closure Test Compositions.

Test compositions of CD grafted master batch and closure liner compositions were made compounding the materials in a Brabender Plasticorder Mixing Bowl for 5 minutes at 130° C. and 80 rpm. The CD grafted polyolefin, LDPE containing CD, and closure liner wt % compositions of the closure test are provided in Table 16. This material was then molded into sample coupons 4.45 cm×1.59 cm×0.10 cm with an Atlas Laboratory Mixing Molder set at 140 rpm, 150° C. for 2 minutes, with a mold temperature of 90° C.

TABLE 16

Compositions of test materials

| | | | | | CD Grafted LDPE Masterbatch | | | | |
|---|---|---|---|---|---|---|---|---|---|
| | | LDPE | | | α-CD | β-CD | α-CD | β-CD | |
| Sample ID | Description | Masterbatch Polyliner | α-CD | β-CD | PX 175 | PX 175 | PX 5125 | PX 5125 | TOTAL |
| 3A | Control | 100 | | | | | | | 100 |
| 3B | 0.50% α-CD | 81.5 | 18.5 | | | | | | 100 |
| 3C | 0.50% α-CD Grafted | 81.5 | | | | | 18.5 | | 100 |

TABLE 16-continued

Compositions of test materials

| | | Weight Percent | | | | | |
|---|---|---|---|---|---|---|---|
| | | LDPE Masterbatch | | CD Grafted LDPE Masterbatch | | | |
| Sample | | | | α-CD | β-CD | α-CD | β-CD |
| ID | Description | Polyliner | α-CD β-CD | PX 175 | PX 175 | PX 5125 | PX 5125 | TOTAL |
| 3D | 0.50% α-CD Grafted Blend | 81.5 | | 3.7 | | 14.8 | | 100 |
| 3E | 0.50% β-CD | 81.5 | 18.5 | | | | | 100 |
| 3F | 0.50% β-CD Grafted | 81.6 | | | | | 18.4 | 100 |
| 3G | 0.50% β-CD Grafted Blend | 81.6 | | | 3.7 | | 14.7 | 100 |

Sample Preparation.

A laboratory system to generate ozone includes passing pure oxygen from a feed gas (5.5 liters/min) into a corona discharge ozone generator producing high purity ozone. A continuous ozone monitor records the ozone generator output. Ozone is absorbed into the water yielding a substantial level of dissolved ozone gas in a given volume of water (approximately 800 ppb ozone). The ozone containing water is suitable for use in testing sealing element materials.

The test involves liner material test coupons containing the compositions provided in Table 17, which are exposed to water sterilized with 800 ppb ozone and stored in 500 mL glass bottles with 475 mL of ozonated DI water, metal screw caps with aluminum-faced liners. A 4.45 cm×1.59 cm×0.10 cm in test coupon is wedged into the mouth of the bottle. Bottles are stored on their sides where the ozone treated water is in direct contact with the test coupon for seven days at 40° C.

Analytical Method.

Following the storage period, the aqueous contents are extracted 3 times with 30 mL methylene chloride, the methylene chloride extracts are dried through sodium sulfate drying columns, and the volume reduced to 0.5 mL using Kuderna-Danish evaporator. The internal standard acenaphthene (2 μg) was added to the reduced extract and, finally, the extracts are analyzed by high resolution gas chromatography using flame ionization detection. A comparison of aldehyde concentrations measured in ozone treated water in contact with closure liner compositions containing CD grafted LDPE and non-CD grafted LDPE is provided in Table 17. The test results show that closure material compositions containing grafted cyclodextrin can reduce the transfer of aldehydes, some of which may be formed from contacting the liner martial with ozonated water, from the closure material into the contents of the bottle. Grafted a cyclodextrin showed better aldehyde reduction than grafted β cyclodextrin and parent α and β cyclodextrin.

TABLE 17

Results of ozonated water testing the compositions shown in Table 16.

| | ALDEHYDE CONCENTRATIONS IN OZONATED WATER Concentration in ppb - μg/L | | | | | | |
|---|---|---|---|---|---|---|---|
| | 3A | 3B | 3C | 3D | 3E | 3F | 3G |
| tr-2-Decenal | 0.256 | 0.095 | 0.136 | 0.093 | 0.123 | 0.148 | 0.121 |
| Decanal | 0.105 | 0.012 | 0.070 | ND | 0.043 | 0.131 | 0.022 |

TABLE 17-continued

Results of ozonated water testing the compositions shown in Table 16.

| | ALDEHYDE CONCENTRATIONS IN OZONATED WATER Concentration in ppb - μg/L | | | | | | |
|---|---|---|---|---|---|---|---|
| | 3A | 3B | 3C | 3D | 3E | 3F | 3G |
| Nonanal | 2.822 | 1.806 | ND | 1.655 | 3.268 | 2.175 | 2.467 |
| Octanal | 0.192 | ND | ND | ND | 0.017 | 0.082 | ND |

5. Testing of Sealing Materials for Organoleptic Barrier

A potent musty taint causing off-odor and off-flavor in beer, water and wine has been traced to an environmental contaminant called trichloroanisole (TCA). Sources of TCA have been traced to containers of ships, wooden pallets, kraft paper bags and cardboard boxes. TCA is formed from chlorophenols, used in wood preserving, by fungal methylation. Concentrations of TCA as low as 5-10 ppt have been detected in aqueous solutions by trained panels and 20-30 ppt in untrained panels.

Organic Vapor Transport.

Permeation across a barrier can be explained where the membrane at time ($t_0$) is initially free from permeant vapor. The penetrant pressure $p_2$ at the upstream face of the membrane is increased giving a concentration in the surface layer $c_2$. Diffusion is a measure of how quickly permeants move in a membrane across the concentration gradient and the time it takes to reach steady state. The downstream pressure, $p_1$, while measurable, is negligible at small times relative to the upstream pressure $p_2$. The amount of vapor permeating the film increases linearly with time once steady state has been reached. At large times, the upstream pressure $p_2$ will equal the downstream pressure $p_1$.

A compatible cyclodextrin dispersed into PE then formed into a membrane retards organic vapor transport and reduces mass flux as measured in the static test cell. Two experimental membranes are tested. The effect of cyclodextrin is measured in a monolayer liner composition membrane at diffusion time (t) when $p_2=p_1$ with TCA.

Masterbatch Materials.

CD grafted LDPE was first individually compounded into masterbatches. A final blend of CD grafted LDPE and closure liner composition (Svelon 477, DS-Chemie, Bremen, Germany) was compounded to provide a CD loading of 0.50 wt % and 0.60 wt %. The final let down liner compositions with CD grafted polyolefin were further prepared prior to analysis for residual volatiles.

Two ethylene-maleic anhydride copolymer/LDPE blends (Plexar 1856, Equistar Chemicals, L.P.) were compounded with a stoichiometric weight loading of unmodified α-CD (3.91 wt %) and unmodified γ-CD (5.21 wt %) using a Brabender Plasticorder Mixing Bowl forming the masterbatches. All resins were dried at 85° C. for 2 hours under vacuum (<0.1" of Hg) before use, while the cyclodextrins were dried at 105° C. for 30 minutes.

1. Alpha Cyclodextrin Compounding in Ethylene-Maleic Anhydride Copolymer/LDPE Blend (EMA/LDPE).

Alpha cyclodextrin (lot 60P122, Wacker Chemie), 1.60 g, was compounded into 39.4 gms of EMA/LDPE (Plexar PX1856, lot 51080101, Equistar Chemicals, L.P.) using a Brabender Plasticorder Mixing Bowl for 5 minutes at 150° C. and 80 rpm.

2. Gamma Cyclodextrin Compounding in Ethylene-Maleic Anhydride Copolymer/LDPE Blend (EMA/LDPE).

2.14 gms of gamma cyclodextrin (lot 80P080, Wacker Chemie) was compounded into 38.86 gms of EMA/LDPE (Plexar PX1856, lot 51080101, Equistar Chemicals, L.P.) using a Brabender Plasticorder Mixing Bowl for 5 minutes at 150° C. and 80 rpm.

Test Compositions.

Test compositions of CD grafted master batch and closure liner compositions were made by compounding the materials in a Brabender Plasticorder Mixing Bowl for 5 minutes at 130° C. and 80 rpm. This material was then molded into sample coupons 4.45 cm×1.59 cm×0.10 cm with an Atlas Laboratory Mixing Molder set at 140 rpm, 150° C. for 2 minutes, with a mold temperature of 90° C. The CD grafted polyolefin and closure liner wt % compositions for the closure test are provided in Table 18.

TABLE 18

Compositions of test materials.

| Sample | | CD Graft | | Wt % Composition | |
|---|---|---|---|---|---|
| ID | Description | α-CD | γ-CD | PX 1856 | Liner |
| 4A | Control | | | | 100 |
| 4B | 0.50% α-CD Grafted | X | | 12.8 | 87.2 |
| 4C | 0.40% γ-CD Grafted | | X | 7.7 | 92.3 |
| 4D | 0.50% γ-CD Grafted | | X | 9.6 | 90.4 |

Mono-Layer Disc Preparation.

A 1.27 cm diameter punch is used to cut two discs from the 4.45 cm×1.59 cm×0.10 cm coupons for static permeation testing. Replicate sample thickness must be +/−5%.

Analytical Method for Organic Vapor Permeation

The permeation method involves experimental techniques to measure organic molecule transport through a polymer packaging structure, using a static concentration gradient. High-resolution gas chromatography (HRGC) operated with electron capture detection (ECD) is used to measure the cumulative downstream penetrant concentration.

Apparatus.

Disc samples (0.10 cm thick×1.27 cm diameter and weighing 128 mg) are tested in a closed-volume vapor permeation device (refer to FIG. 7). The experimental aluminum measurement cell has two compartments (i.e., cells) separated by the disc under study (effective disc area=5.3 cm²) and capped at both ends using Teflon® faced butyl rubber septa and aluminum crimp-tops.

The test disc is placed into the upper cell; the cell is assembled using an o-ring to firmly seal the test disc and screws to pull upper and lower cells together. Next, the upper cell is capped with a Teflon® faced butyl rubber septa and aluminum crimp-top. Two permeation standards are prepared. The permeant standard contains 2,4,6-trichloroanisole. The permeant is dispersed in a deionized water/surfactant mixture. The permeant water/surfactant mixture is injected into the lower cell providing a concentration $c_2$ at $t_0$ shown in Table 20. TCA concentrations $p_2$ in the lower cell is expressed in parts per billion, as nL/L (vol./vol.), using gas laws. Then the lower cell is immediately capped with a Teflon® faced butyl rubber septa and aluminum crimp-top.

The standard concentrations of TCA were prepared by diluting a stock solution of TCA prepared in methanol at 50 mg/mL and then diluted in a 1% Triton X100 aqueous solution. The dilutions were prepared so that 5 μL additions of the diluted stock provided the masses (pg) to the test 20 mL headspace vials. The following SPME GC/ECD instrument conditions were used in the TCA analysis.

| | |
|---|---|
| Column: | DB-5 (40 meter by 0.18 mm id, 0.18 μm film) |
| Carrier: | Hydrogen |
| Headpressure: | 22 psi (1 mL/min) |
| Inj. Mode: | Splitless (1 min) |
| Inj. Temp: | 270° C. |
| ECD Total Flow: | 60 mL/min |
| ECD Temp: | 275° C. |
| GC Oven Temp: | 50° C. for 2 min |
| | 10° C./min to 225° C. for 0.5 min |
| SPME Conditions: | Heat @ 50° C. for 30 min |
| | Insert SPME for 30 min @ 50° C. |

SPME Fiber (Blue, PDMS/DVB)

Trichloroanisole.

HRGC operated with an ECD was used to measure the change in the cumulative trichloroanisole concentration at time $t_{1/2}$ in the upstream cell. At the end of 6-hours, a sample was collected by solid phase microextraction (SPME) from the upper cell and analyzed by HRGC/ECD. The trichloroanisole concentration was determined from calibration standards and measured in pL/L or parts per trillion (vol./vol.) using gas laws. Test cells were prepared and analyzed in triplicate. Table 19 contains the concentration $c_2$ of TCA in the lower cell at t=0, and the concentration $p_1$ of TCA in the upper cell at time $t_{1/2}$ or 6-hours in the control and the triacetyl gamma cyclodextrin (TA-γ-CD) sample at two loadings. The concentration of trichloroanisole was measured by static permeation using headspace HRGC/ECD in a control closure composition containing CD grafted materials with the permeation cell temperature maintained at 50° C.

TABLE 19

Results of testing the compositions as shown in Table 18.

| | Conc. $c_2$ @ Time = 0 All Samples μL/L | Concentration-$c_1$ @ Time = 6 Hours | | | |
|---|---|---|---|---|---|
| Permeant | | 4A pL/L | 4B pL/L | 4C pL/L | 4D pL/L |
| 2,4,6-Trichloroanisole | 1310 | 210 | 169 | 136 | 148 |
| Total | 1310 | 210 | 169 | 136 | 148 |

μL/L = Parts Per Million (ppm)
pL/L = Parts Per Trillion (ppt)

Closure compositions containing CD grafted material substantially reduced TCA mass transfer. TCA mass transfer was reduced 19.5% and 35.2% in liner composition compounded with 0.50 wt % α-CD grafted LDPE and 0.40 wt % γ-CD grafted LDPE, respectively. γ-CD grafted LDPE at 0.50 wt % reduced TCA mass transfer 29.5%. TCA reduction is both a function of CD isomer (α or γ) and concentration. γ-CD grafted LDPE is more effective at trapping TCA than α-CD grafted LDPE.

6. Testing of Film Materials for Moisture Vapor Transport or Barrier Properties For a specific package application or package design, it may be important to decrease water transport because of the sensitivity of the contents or to reduce film gauge for environmental reasons. High-density polyethylene (HDPE) films are commonly used in conjunction with bag-in-box food packaging applications to package cereals, crackers and snack foods. Moisture barrier in the flexible polyolefin structure plays an important role protecting these products from moisture ingress that can lead to sensory changes such as staling and loss of crispness, which shortens product shelf life. An improved moisture vapor barrier composition can comprise a thermoplastic web comprising a polyolefin polymer and a dispersed functional polyolefin that contains pendant cyclodextrin molecules.

Masterbatch Materials.

An ethylene-maleic anhydride (EMA) copolymer (melt index 7.4 g/10 min, maleic anhydride functionality of 0.86 wt %) was compounded with a stoichiometric weight loading (5.0 wt %) of unmodified β-CD using a co-rotating compounding extruder (Warner Pfleiderer Corporation ZSK-30 mm). It was configured with an upstream feed zone for the EMA and β-CD, followed by a mixing section, a feed zone for the HDPE, another mixing section with a melt seal, followed by a vacuum section and finally a conveying section and strand die. The EMA copolymer was dried for 6 hours at 95° C., at a pressure of <0.1 inches of Hg. The cyclodextrin was dried for 28 hours at 115° C., at a pressure of <0.1 inches of Hg. Weight loss feeders were used to deliver all materials. The cyclodextrin was kept under a nitrogen blanket to prevent moisture pickup.

The feed zone was at ambient temperature (i.e.) about 22° C., first mixing zone was 150° C. the other zones were set at 125° C. The melt temperature at the die was 204° C. The extruder was operated at 300 rpm, and 61% of max torque. The output rate was 22.7 kg per hour. The β-CD was fed at 1.18 kg per hour, the EMA was fed at 10.18 kg per hour, and the HDPE was fed at 11.37 kg per hour. The cyclodextrin also contained a mixture of 3.1% Dynamar 5929 and 0.38% each of Irganox 1010 and Irgaphos 168. The EMA copolymer and the HDPE (Petrothene LM 6007) were obtained from Equistar; Irganox and Irgaphos antioxidants were obtained from Ciba Specialty Chemicals Corporation; Dynamar lubricant was obtained from the 3M Company, and the beta cyclodextrin was obtained from Wacker Biochem Corporation.

Film Preparation.

HDPE (LM 6007) and the masterbatch formulation were converted into three films by blown film extrusion. The films were blown on a Killion laboratory scale blown film line. The extruder is equipped with a 25 mm diameter (24:1 L/D ratio) screw operated at 122 rpm with an output of 3.6 Kg/hour and pulled at two different speeds producing two different film gauges of 1.4 and 2.2 mil. The extruder is flood feed operated with virgin HDPE only as a control, and with the masterbatch formulation which was pre-blended with virgin HDPE resin by mechanical tumbling to provide two final CD weight compositions of 0.50 wt % and 0.35 wt %.

The blown film line annular film die has a 31.75 mm diameter and is operated at 211° C. The extruded polymer tube bubble has a diameter of 14.6 cm for both film thicknesses. The two-extruder zones are operated at 226° C. and 227° C., respectively. The polymer melt temperature is 227° C. The extruder to film die adapter is operated at 227° C.

Water-Vapor Transmission.

Water vapor permeates through polymers much the same as other vapors. The efficacy of functionalized polyolefin containing pendent cyclodextrin molecules is determined by published ASTM methods (E 96 and F 1249) used to determine a rate of water vapor transmission, which is designated as the time rate of water vapor flow normal to surfaces, under steady-state conditions, through unit area, under the specified relative humidity and temperature conditions of test. The accepted units are grams per day per meter squared (g/(day·m$^2$) or grams per day per hundred square inches (g/(day·100 in$^2$). The test is conducted until a steady-state has been reached. Duplicate water vapor transmission rate (WVTR) test results are provided in Table 21 and 22. ASTM Method F 1249 was used to generated the WVTR test results in Table 21 and WVTR test results in Table 22 were generated according to ASTM Method E 96, Procedure B—Water Method at 23° C. The following table comprises a comparison of water vapor transmission rates (WVTR) for a control high-density polyethylene (HDPE) film and β-CD grafted polyethylene in HDPE film using ASTM Method F 1249.

The results in Table 20 show a substantial reduction in the WVTR of the CD grafted polyolefin (0.35% and 0.50% CD) in HDPE (LM 6007) compared to the same HDPE (LM 6007) control without grafted CD. The improved water vapor barrier in the CD grafted films of the disclosure using ASTM Test Method F 1249 is approximately 15% versus the control HDPE.

TABLE 20

Water vapor transmission rate as measured by ASTM Method F 1249.

| | Ave. Film Thickness (mils) ± 0.05 | WVTR (WV Transmission Rate) | |
| --- | --- | --- | --- |
| | | gm/m$^2$ · day | gm/100 inch$^2$ · day |
| Control #1 | 1.92 | 3.07 | 0.198 |
| Control #2 | 2.24 | 2.90 | 0.187 |
| 0.35% β-CD Graft, Rep. #1 | 2.27 | 2.52 | 0.163 |
| 0.35% β-CD Graft, Rep. #2 | 2.25 | 2.53 | 0.163 |
| 0.50% β-CD Graft, Rep. #1 | 2.31 | 2.61 | 0.168 |
| 0.50% β-CD Graft, Rep. #2 | 2.59 | 2.51 | 0.162 |

Test temperature: 37.8° C. ± 0.3° C.
Test R.H.: 90%
Sample test area: 50 cm$^2$
Test result accuracy: ±3%
Test results corrected to 760 mm Hg
Average thickness based on five points distributed over the entire test piece The data in Table 21 show a comparison of water vapor transmission rates (WVTR) for a control high density polyethylene (HDPE) film and β-CD grafted polyethylene in HDPE film using ASTM Method E 96, Procedure B—Water Method at 23° C.

TABLE 21

Water vapor transmission rate measured by ASTM Method E 96, Procedure B.

| | Ave. Film Thickness (mils) ± | WVTR (WV Transmission Rate) | |
|---|---|---|---|
| | 0.05 | gm/m² · day | gm/100 inch² · day |
| Control #1 | 1.39 | 0.484 | 0.031 |
| Control #2 | 1.40 | 0.496 | 0.032 |
| 0.50% β-CD Graft, Rep. #1 | 1.40 | 0.409 | 0.026 |
| 0.50% β-CD Graft, Rep. #2 | 1.40 | 0.393 | 0.025 |

Test temperature: 23° C. ± 0.5° C.
Test R.H.: 50%
Sample test area: 31.5 cm²
Average thickness based on five points distributed over the entire test piece Table 21 shows that a substantial reduction was observed in the WVTR of the 0.50% CD grafted polyolefin in HDPE (LM 6007) compared to the same HDPE (LM 6007) control without grafted CD. The improved water vapor barrier in the CD grafted films of the disclosure using ASTM Test Method E 96 (Procedure B—Water Method at 23° C.) is approximately 18% versus the control HDPE.

Table 22 provides illustrative structure and physical properties of web and fibers of the disclosure, representative composition and process information of the disclosure, and example use or applications of the resulting articles of the disclosure.

Table 23 provides illustrative packaging application details for flavor and odor control applications of the disclosure.

Table 24 provides illustrative structure and physical properties of fibers of the disclosure, representative composition and process information of the disclosure, and example use or applications of the resulting articles or article components of the disclosure.

TABLE 22

Examples of properties and potential uses of various compositions of the invention.

| Structure | Web Thickness (mm) | Fiber Diameter (μm) | Materials | Process(es) | Application(s) |
|---|---|---|---|---|---|
| Films | 0.01-20 | NA | PP, PE, PET, PLA, PS | cast, blown, extrusion coating, lamination & adhesive lamination | Food, electronic, medical and pharmaceutical packaging; Porous films for personal care, medical products and food packaging |
| Sheets | 0.3-250 | NA | PP, PE, PET, PS | cast, blown, extrusion coating, lamination & adhesive lamination | Thermoformed packaging and trays for food, medical and pharmaceutical packaging; Liners for bottle and jar seals |
| Liners (Sealant layers) | 0.01-0.35 | NA | PP, PE, PLA, PET, EVA | Coextrusion cast & blown | Multilayer flexible and rigid food, medical and pharmaceutical packaging where the inside layer is heat sealed acting like a glue to effect a seal |
| Bottles, Caps & Liners | 1-35 | NA | PP, PE, EVA, Nylon, PS | Blow molding, Injection molding & compression molding | Mono and multilayer bottles, plastic caps and cap liners |
| Fibers | NA | 0.01-40 | PP, PE, PET, PLA, EVOH, Nylon | SB, MB, SM, electrospinning, co-form | Industrial workwear, filter products, food packaging (meat tray pads), personal care and medical products, apparel, household and pet care |
| Fabrics | NA | 0.01-40 | PP, PE, PET, cotton, cellulose | SB, bonded-carded, needle-punched, airlaid, wetlaid | Apparel, furniture, automotive |

TABLE 22-continued

Examples of properties and potential uses of various compositions of the invention.

| Structure | Web Thickness (mm) | Fiber Diameter (μm) | Materials | Process(es) | Application(s) |
|---|---|---|---|---|---|
| Barrier film layers | 0.002-0.50 | NA | EVOH, Nylon, PVC, PVdC | cast, blown, solution coating, extrusion coating, lamination & adhesive lamination | Food, electronic, medical and pharmaceutical packaging |
| Barrier fiber layers | NA | 0.01-20 | PP, PE, PET, Nylon | SB, MB, SM, electrospin | Medical products, filter products, industrial workwear |

SB = spunbond;
MB = meltblown;
SM = spunmelt

TABLE 23

Illustrative packaging application details for flavor and odor control applications of the invention.

| Packaging Application | Effect | Structure | Application(s) |
|---|---|---|---|
| Flavor control | Reduce or eliminate the transfer of desirable odor/taste compounds from the stored food to the packaging or environment | Films, sheets, coated or laminated structures, sealant layers, and caps and liners used in shelf-stable food products and beverages | Shelf-stable food products and beverages |
| Odor control | Reduce or eliminate the transfer of unwanted odor/taste compounds | Films, sheets, coated or laminated structures, sealant layers, fibers, fabrics & barrier layers used in shelf-stable food products and beverages; Personal care, medical products, apparel, household, pet care, filter products | Shelf-stable food products and beverages; personal care, medical products, apparel, household, pet care, filter products |

TABLE 24

Examples of properties and potential uses of various fiber compositions of the invention.

| End Use | Fiber Diameter (μm) | Materials | Process(es) | Application(s) |
|---|---|---|---|---|
| Bandages | 0.5-25 | PP, PE, PET, EVOH, Nylon and cotton | Microfiber and nanofiber meltspun composites, hydro-entangled, wetlaid | Top sheets, acquisition layers and transfer layers for transdermal patches, wound closure, bandages, wound dressing, face masks, surgical drapes, medical gowns |
| Disposable diapers | 0.5-25 | PP, PE, PET, PLA | Microfiber meltspun composites, hydro-entangled, porous film, co-form, bonded-carded, airlaid, wetlaid | nonwoven fabrics for diaper top sheets, backsheets, leg cuffs, elastic waistbands, transfer layers, and absorbent cores |

TABLE 24-continued

Examples of properties and potential uses of various fiber compositions of the invention.

| End Use | Fiber Diameter (μm) | Materials | Process(es) | Application(s) |
|---|---|---|---|---|
| Incontinent products | 0.55-25 | PP, PE, PET, PLA | Microfiber meltspun composites, hydro-angled, porous film, co-form, bonded-carded, airlaid, wetlaid | nonwoven fabrics for incontinent product top sheets, backsheets, leg cuffs, elastic waistbands, transfer layers, and absorbent cores |

The specification, figures, examples and data provide a detailed explanation of the invention as it has been developed to date. The invention, however, can take the form of nonwovens, fibers, films, sheets, bottles, caps, and other embodiments without departing from the spirit or the intended scope of the invention. The invention therefore resides in the appended claims.

We claim:

1. An article comprising a thermoplastic polymer fiber comprising an acid anhydride modified polyolefin resin, the acid anhydride modified polyolefin resin comprising at least one pendant substituent derived from a cyclodextrin, wherein the cyclodextrin is bonded to the polyolefin resin by the reaction product of cyclodextrin with the acid anhydride, wherein the cyclodextrin is substantially free of a compound in its central pore, the fiber having a fiber diameter of 10 nm to 2000 nm.

2. The article of claim 1 wherein the thermoplastic polymer fiber comprises a woven web.

3. The article of claim 1 wherein the thermoplastic polymer fiber comprises a nonwoven web.

4. The article of claim 3 wherein the nonwoven web comprises a meltblown web, an electrospun web, a flash spun web, or a spunbond web.

5. The article of claim 3 wherein the nonwoven web is in the shape of a sheet or fabric, the sheet or fabric having a thickness of about 0.01 millimeter to 1 millimeter.

6. The article of claim 1 wherein the thermoplastic polymer fiber comprises a bicomponent fiber.

7. The article of claim 1 wherein the thermoplastic polymer fiber further comprises an unmodified thermoplastic resin comprising polyethylene, polypropylene, polybutene, poly(α-octene), a polyester, a polyamide, a polyurethane, a polyurea, a polycarbonate, a polyether, a polyketone, poly(vinyl chloride), a fluoropolymer, or a blend or copolymer thereof.

8. The article of claim 1 wherein the resin comprises a poly(ethylene-co-propylene), a poly(ethylene-co-methyl-acrylate), a poly(ethylene-co-ethyl-acrylate), a low-density polyethylene, a linear low-density polyethylene, or a high density polyethylene.

9. The article of claim 1 wherein the modified polyolefin resin is derived from a polyolefin having a melt index of 0.7 to 1500 g-10 min$^{-1}$.

10. The article of claim 1 wherein the modified polyolefin resin is derived from a polyolefin having a melt index of 1 to 1,200 g-10 min$^{-1}$.

11. The article of claim 1 comprising 0.1 to 10 weight percent of the thermoplastic polymer fiber based on the weight of the article.

12. The article of claim 1 comprising 0.1 to 8 weight percent of the thermoplastic polymer fiber based on the weight of the article.

13. The article of claim 1 wherein the modified polyolefin comprises polyethylene or polypropylene and the acid anhydride is maleic anhydride.

14. The article of claim 13 wherein the polyethylene comprises about 0.2 to 2.5 weight percent maleic anhydride groups.

15. The article of claim 1 wherein the modified polyolefin comprises polyethylene, polypropylene, or a copolymer of ethylene and propylene.

16. The article of claim 1 wherein the cyclodextrin is β-cyclodextrin.

17. The article of claim 1 wherein the polymer fiber comprises about 100 parts by weight of a thermoplastic resin comprising a polyolefin, about 0.50 to 25 parts by weight of the modified polyolefin, the thermoplastic resin has a melt index of about 0.5 to 1500 g-10 min$^{-1}$, and the modified polyolefin is derived from a polyolefin having a melt index of about 0.7 to 1,200 g-10 min$^{-1}$.

18. The article of claim 1 wherein the article is disposable.

19. The article of claim 1 wherein the article comprises a dusk mask or a surgical mask.

20. The article of claim 1 wherein the article is a wipe.

21. The article of claim 1 wherein the article is a tissue.

22. The article of claim 1 wherein the article is a garment comprising a medical drape, a medical gown, a garment accessory, a chemically resistant garment, or a protective work garment.

23. The article of claim 1 wherein the article comprises a meat tray pad, bedding, carpet backing, a storage container, a towel, a mat, a packing liner, a footwear liner, a refuse container liner; a refuse lid liner, a furniture liner, or an animal cage liner.

24. The article of claim 1 comprising one or more additional layers.

25. The article of claim 24 wherein the thermoplastic polymer fiber is used as a scavenger layer or a barrier layer.

26. The article of claim 24 wherein the at least one of the one or more additional layers is an absorbent layer.

27. The article of claim 26 wherein the article is a diaper, an incontinent under garment, a feminine sanitary napkin, a feminine sanitary tampon, an underarm shield, a bandage, or a wound dressing.

28. The article of claim 1 wherein the article comprises a filter.

29. The article of claim 28 wherein the filter comprises a gas filter or a liquid filter.

30. The article of claim 29 wherein the gas is air and the filter comprises a furnace filter or a vacuum cleaner filter.

31. The article of claim 29 wherein the liquid comprises gasoline, diesel fuel, motor oil, machine oil, a bodily fluid, or water.

32. An article comprising a thermoplastic polymer fiber comprising an acid anhydride modified polyolefin resin, the acid anhydride modified polyolefin resin comprising at least one pendant substituent derived from a cyclodextrin, wherein the cyclodextrin is bonded to the polyolefin resin by the reaction product of cyclodextrin with the acid anhydride, wherein the cyclodextrin is substantially free of a compound in its central pore, the fiber having a fiber diameter of 500 nm to 10 μm.

33. The article of claim 32 wherein the thermoplastic polymer fiber comprises a woven web.

34. The article of claim 32 wherein the thermoplastic polymer fiber comprises a nonwoven web.

35. The article of claim 34 wherein the nonwoven web comprises a meltblown web, an electrospun web, a flash spun web, or a spunbond web.

36. The article of claim 34 wherein the nonwoven web is in the shape of a sheet or fabric, the sheet or fabric having a thickness of about 0.01 millimeter to 1 millimeter.

37. The article of claim 32 wherein the thermoplastic polymer fiber comprises a bicomponent fiber.

38. The article of claim 32 wherein the thermoplastic polymer fiber further comprises an unmodified thermoplastic resin comprising polyethylene, polypropylene, polybutene, poly(α-octene), a polyester, a polyamide, a polyurethane, a polyurea, a polycarbonate, a polyether, a polyketone, poly(vinyl chloride), a fluoropolymer, or a blend or copolymer thereof.

39. The article of claim 32 wherein the resin comprises a poly(ethylene-co-propylene), a poly(ethylene-co-methyl-acrylate), a poly(ethylene-co-ethyl-acrylate), a low-density polyethylene, a linear low-density polyethylene, or a high density polyethylene.

40. The article of claim 32 wherein the modified polyolefin resin is derived from a polyolefin having a melt index of 0.7 to 1500 g-10 $\text{min}^{-1}$.

41. The article of claim 32 wherein the modified polyolefin resin is derived from a polyolefin having a melt index of 1 to 1,200 g-10 $\text{min}^{-1}$.

42. The article of claim 32 comprising 0.1 to 10 weight percent of the thermoplastic polymer fiber based on the weight of the article.

43. The article of claim 32 comprising 0.1 to 8 weight percent of the thermoplastic polymer fiber based on the weight of the article.

44. The article of claim 32 wherein the modified polyolefin comprises polyethylene or polypropylene and the acid anhydride is maleic anhydride.

45. The article of claim 44 wherein the polyethylene comprises about 0.2 to 2.5 weight percent maleic anhydride groups.

46. The article of claim 32 wherein the modified polyolefin comprises polyethylene, polypropylene, or a copolymer of ethylene and propylene.

47. The article of claim 32 wherein the cyclodextrin is β-cyclodextrin.

48. The article of claim 32 wherein the polymer fiber comprises about 100 parts by weight of a thermoplastic resin comprising a polyolefin, about 0.50 to 25 parts by weight of the modified polyolefin, the thermoplastic resin has a melt index of about 0.5 to 1500 g-10 $\text{min}^{-1}$, and the modified polyolefin is derived from a polyolefin having a melt index of about 0.7 to 1,200 g-10 $\text{min}^{-1}$.

49. The article of claim 32 wherein the article is disposable.

50. The article of claim 32 wherein the article comprises a dusk mask or a surgical mask.

51. The article of claim 32 wherein the article is a wipe.

52. The article of claim 32 wherein the article is a tissue.

53. The article of claim 32 wherein the article is a garment comprising a medical drape, a medical gown, a garment accessory, a chemically resistant garment, or a protective work garment.

54. The article of claim 32 wherein the article comprises a meat tray pad, bedding, carpet backing, a storage container, a towel, a mat, a packing liner, a footwear liner, a refuse container liner; a refuse lid liner, a furniture liner, or an animal cage liner.

55. The article of claim 32 comprising one or more additional layers.

56. The article of claim 55 wherein the thermoplastic polymer fiber is used as a scavenger layer or a barrier layer.

57. The article of claim 55 wherein the at least one of the one or more additional layers is an absorbent layer.

58. The article of claim 57 wherein the article is a diaper, an incontinent under garment, a feminine sanitary napkin, a feminine sanitary tampon, an underarm shield, a bandage, or a wound dressing.

59. The article of claim 32 wherein the article comprises a filter.

60. The article of claim 59 wherein the filter comprises a gas filter or a liquid filter.

61. The article of claim 60 wherein the gas is air and the filter comprises a furnace filter or a vacuum cleaner filter.

62. The article of claim 60 wherein the liquid comprises gasoline, diesel fuel, motor oil, machine oil, a bodily fluid, or water.

* * * * *